US010904927B2

(12) United States Patent
Ko et al.

(10) Patent No.: US 10,904,927 B2
(45) Date of Patent: Jan. 26, 2021

(54) WIRELESS COMMUNICATION METHOD USING OFDMA RANDOM ACCESS AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Geonjung Ko, Gyeonggi-do (KR); Juhyung Son, Gyeonggi-do (KR); Woojin Ahn, Gyeonggi-do (KR); Jinsam Kwak, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/693,203

(22) Filed: Nov. 22, 2019

(65) Prior Publication Data

US 2020/0163129 A1 May 21, 2020

Related U.S. Application Data

(63) Continuation of application No. 16/452,448, filed on Jun. 25, 2019, now Pat. No. 10,536,979, which is a
(Continued)

(30) Foreign Application Priority Data

Dec. 27, 2016 (KR) .................. 10-2016-0179781
Jan. 2, 2017 (KR) .................. 10-2017-0000020
(Continued)

(51) Int. Cl.
*H04W 74/08* (2009.01)
*H04L 5/00* (2006.01)
(Continued)

(52) U.S. Cl.
CPC .......... *H04W 74/0858* (2013.01); *H04L 1/00* (2013.01); *H04L 1/16* (2013.01); *H04L 5/0007* (2013.01);
(Continued)

(58) Field of Classification Search
CPC . H04W 74/0858; H04W 28/06; H04W 72/04; H04W 72/0446; H04W 72/048;
(Continued)

(56) References Cited

U.S. PATENT DOCUMENTS

2016/0227579 A1\* 8/2016 Stacey .............. H04W 74/0833
2016/0309508 A1   10/2016 Li et al.
(Continued)

FOREIGN PATENT DOCUMENTS

CN   101998646   3/2011
CN   104521290   4/2015
(Continued)

OTHER PUBLICATIONS

International Search Report for PCT/KR2017/015525 dated Apr. 6, 2018 and its English translation from WIPO (now published as WO 2018/124725). (Year: 2018).*
(Continued)

*Primary Examiner* — Afsar M Qureshi
(74) *Attorney, Agent, or Firm* — Ladas & Parry, LLP

(57) ABSTRACT

Provided is a wireless communication terminal that wirelessly communicates with a base wireless communication terminal. The wireless communication terminal includes a transceiver, and a processor. The processor is configured to set an integer selected from a range of 0 to a value equal to
(Continued)

or smaller than an OFDMA Contention Window (OCW) as a counter for random access, receive a trigger frame for triggering random access using one or more resource units (RUs) allocated for the random access from the base wireless communication terminal using the transceiver, decrement a value of the counter based on the one or more RUs allocated for the random access, randomly select one RU based on the one or more RUs allocated for the random access when the value of the counter is 0 or reaches 0, and attempt transmission to the base wireless communication terminal using the selected RU.

14 Claims, 36 Drawing Sheets

Related U.S. Application Data continuation of application No. PCT/KR2017/015535, filed on Dec. 27, 2017.

(30) Foreign Application Priority Data

| | | | |
|---|---|---|---|
| Jan. 2, 2017 | (KR) | ......................... | 10-2017-0000437 |
| Jan. 6, 2017 | (KR) | ......................... | 10-2017-0002195 |
| Jan. 9, 2017 | (KR) | ......................... | 10-2017-0002720 |

(51) Int. Cl.

| | |
|---|---|
| *H04L 27/26* | (2006.01) |
| *H04W 72/04* | (2009.01) |
| *H04L 1/00* | (2006.01) |
| *H04L 1/16* | (2006.01) |
| *H04W 28/06* | (2009.01) |
| *H04W 74/00* | (2009.01) |
| *H04W 84/12* | (2009.01) |

(52) U.S. Cl.
CPC ......... *H04L 27/2666* (2013.01); *H04W 28/06* (2013.01); *H04W 72/048* (2013.01); *H04W 72/0446* (2013.01); *H04W 74/00* (2013.01); *H04W 74/08* (2013.01); *H04W 84/12* (2013.01)

(58) Field of Classification Search
CPC ..... H04W 74/00; H04W 74/08; H04W 84/12; H04L 1/00; H04L 1/16; H04L 5/0007; H04L 27/2666
USPC .................................................. 370/310, 329
See application file for complete search history.

(56) References Cited

U.S. PATENT DOCUMENTS

| | | | |
|---|---|---|---|
| 2016/0330753 A1 | 11/2016 | Jauh et al. | |
| 2017/0079071 A1 | 3/2017 | Zhou et al. | |
| 2017/0230981 A1 | 8/2017 | Ryu et al. | |
| 2017/0257887 A1* | 9/2017 | Ghosh | H04W 72/0453 |
| 2018/0045821 A1* | 2/2018 | Lee | H04W 72/1278 |
| 2018/0092032 A1* | 3/2018 | Choi | H04L 5/0007 |
| 2018/0199271 A1 | 7/2018 | Viger et al. | |
| 2018/0302924 A1* | 10/2018 | Kim | H04W 74/085 |
| 2018/0368178 A1 | 12/2018 | Dong | |
| 2019/0182864 A1* | 6/2019 | Huang | H04W 74/004 |

FOREIGN PATENT DOCUMENTS

| | | |
|---|---|---|
| CN | 106233790 | 12/2016 |
| JP | 2017-85553 | 5/2017 |
| JP | 2019-512917 | 5/2019 |
| KR | 10-2011-0074747 | 7/2011 |
| KR | 10-2013-0090804 | 8/2013 |
| KR | 10-2014-0085380 | 7/2014 |
| KR | 10-2016-0045023 | 4/2016 |
| WO | 2016/069399 | 5/2016 |
| WO | 2016/163641 | 10/2016 | |
| WO | WO-2016163641 A1 * | 10/2016 | ............... H04L 5/00 |
| WO | 2016/198669 | 12/2016 |
| WO | 2018/124725 | 7/2018 |

OTHER PUBLICATIONS

Written Opinion of the International Searching Authority for PCT/KR2017/015535 dated Apr. 6, 2018 and its English translation by Google Translate (now published as WO 2018/124725) (Year: 2018).*

Intel et al., "Random Access with Trigger Frames Using OFDMA", doc.: IEEE 802.11-15/0875r1, slides 1-16, Jul. 13, 2015. See slides 9-10 (Year: 2015).*

Robert Stacey et al.: "IEEE P802.11 Wireless LANs Submission; doc.: IEEE 802.11-17/0010r0", Jan. 9, 2017. Comments on TGax/ D1.0, pp. 1-644 (Year: 2017).*

Office Action dated Mar. 25, 2020 for Korean Patent Application No. 10-2019-7018197 and its English translation provided by Applicant's foreign counsel.

Non-Final Office Action dated Apr. 16, 2020 for U.S. Appl. No. 16/188,274.

Office Action dated Jun. 2, 2020 for Chinese Patent Application No. 201780080498.9 and its English translation provided by the Applicant's foreign counsel.

Notice of Allowance dated Jul. 6, 2020 for Japanese Patent Application No. 2019-555549 and its English translation provided by the Applicant's foreign counsel.

Chittabrata Ghogh et al.; "Location Measurement Protocol for Unassociated STAs", IEEE 802.11-16/1260r0, Sep. 13, 2016, Slides 1-16.

Extended European Search Report dated Jul. 7, 2020 for European Patent Application No. 17889408.5.

LAN/MAN Standards Committee of The IEEE Computer Society: "Draft Standard for Information technology—Telecommunications and information exchange between systems Local and metropolitan area networks—Specific requirements, Part 11: Wireless LAN Medium Access Control (MAC) and Physical Layer (PHY) Specifications; Amendment 6: Enhancements for High", IEEE Draft P802.11AX_ D1-0, IEEE-SA, Piscataway, NJ, USA, vol. 802.11ax drafts, No. D1.0, Dec. 1, 2016, pp. 1-453. Retrieved from the Internet: URL:www. ieee802.org/11/private/Draft-Standards/11ax/DraftP802.11ax_D1.0. pdf.

Notice of Allowance dated Jul. 24, 2020 for Korean Patent Application No. 10-2019-7018197 and its English translation provided by the Applicant's foreign counsel.

Notice of Allowance dated Aug. 18, 2020 for U.S. Appl. No. 16/188,274.

International Search Report for PCT/KR2017/015535 dated Apr. 6, 2018 and its English translation from WIPO (now published as WO 2018/124725).

Written Opinion of the International Searching Authority for PCT/KR2017/015535 dated Apr. 6, 2018 and its English translation by Google Translate (now published as WO 2018/124725).

Intel, "UL OFDMA-based Random Access Procedure", doc.: IEEE 802.11-15/1105r0, slides 1-19, Sep. 13, 2015. See slides 11-14.

Intel et al., "Random Access with Trigger Frames Using OFDMA", doc.: IEEE 802.11-15/0875r1, slides 1-16, Jul. 13, 2015. See slides 9-10.

Khorov, Evgeny et al., "IEEE 802.11ax: How to Build High Efficiency WLANs", In: 2015 International Conference on Engineering and Telecommunication (EnT), pp. 14-19, Nov. 18-19, 2015. See pp. 17-18.

Stéphane Baron et al., "Proposed resolution for comments related to OFDMA random access procedure (RAPS element)", IEEE P802. 11 Wireless LANs; doc.: IEEE 802.11-17/0645r3, May 8, 2017. pp. 1-10.

(56) References Cited

OTHER PUBLICATIONS

Abhishet Patil, Qualcomm Inc., et al.: "Proposed resolution for comments related to CIDs in in 27.5.2.6 (Random Access)", IEEE P802.11 Wireless LANs; May 4, 2017. pp. 1-8.
Abhishet Patil, Qualcomm Inc., et al.: "CIDs related to Random Access", IEEE P802.11 Wireless LANs; Sep. 13, 2017. pp. 1-17.
Robert Stacey et al.: "IEEE P802.11 Wireless LANs Submission; doc.: IEEE 802.11-17/0010r0", Jan. 9, 2017. Comments on TGax/D1.0, pp. 1-644.
International Preliminary Report on Patentability (Chapter I) for PCT/KR2017/015535 dated Jul. 2, 2018 and its English translation from WIPO (now published as WO 2018/124725).
Notice of Allowance dated Aug. 28, 2019 for U.S. Appl. No. 15/452,448 (published as US 2019/0313466).

\* cited by examiner

| Frame Control | Duration | RA | TA | Common Info | User Info | ... | User Info | Padding | FCS |
|---|---|---|---|---|---|---|---|---|---|
| 2 | 2 | 6 | 6 | 8 or more | 5 or more | | 5 or more | variable | 4 |

Octets:

(a) Common Info

| Bits: | 4 | 12 | 1 | 1 | 2 | 2 | 1 | 3 | 1 |
|---|---|---|---|---|---|---|---|---|---|
| | Trigger Type | Length | Cascade Indication | CS Required | BW | GI and LTF Type | MU-MIMO LTF Mode | Number of HE-LTF Symbols | STBC |
| | B0 B3 | B4 B15 | B16 | B17 | B18 B19 | B20 B21 | B22 | B23 B25 | B26 |

| Bits: | 1 | 6 | 1 | 3 | 16 | 1 | 9 | 1 | variable |
|---|---|---|---|---|---|---|---|---|---|
| | LDPC Extra Symbol | AP TX Power | Packet Extension | Spatial Reuse | Doppler | HE-SIG-A Reserved | Reserved | Trigger Dependent Common Info |
| | B27 | B28 B33 | B34 B36 | B37 B52 | B53 | B54 B62 | B63 | |

(b) User Info

| Bits: | 12 | 8 | 1 | 4 | 1 | 6 | 7 | 1 | variable |
|---|---|---|---|---|---|---|---|---|---|
| | AID12 | RU Allocation | Coding Type | MCS | DCM | SS Allocation | Target RSSI | Reserved | Trigger Dependent User Info |
| | B0 B11 | B12 B19 | B20 | B21 B24 | B25 | B26 B31 | B32 B38 | B39 | |

| RU Type | | | | | |
|---|---|---|---|---|---|
| 26-tone RU | RU 1 [-121:-96] | RU 2 [-95:-70] | RU 3 [-68:-43] | RU 4 [-42:-17] | RU 5 [-16:-4, 4:16] |
| | RU 6 [17:42] | RU 7 [43:68] | RU 8 [70:95] | RU 9 [96:121] | |
| 52-tone RU | RU 1 [-121:-70] | RU 2 [-68:-17] | RU 3 [17:68] | RU 4 [70:121] | |
| 106-tone RU | RU 1 [-122:-17] | | RU 2 [17:122] | | |
| 242-tone RU | RU 1 [-122:-2, 2:122] | | | | |

*FIG. 14*

| RU Type | | | | | |
|---|---|---|---|---|---|
| 26-tone RU | RU 1 [-243:-218] | RU 2 [-217:-192] | RU 3 [-189:-164] | RU 4 [-163:-138] | RU 5 [-136:-111] |
| | RU 6 [-109:-84] | RU 7 [-83:-58] | RU 8 [-55:-30] | RU 9 [-29:-4] | |
| | RU 10 [4:29] | RU 11 [30:55] | RU 12 [58:83] | RU 13 [84:109] | RU 14 [111:136] |
| | RU 15 [138:163] | RU 16 [164:189] | RU 17 [192:217] | RU 18 [218:243] | |
| 52-tone RU | RU 1 [-243:-192] | RU 2 [-189:-138] | RU 3 [-109:-58] | RU 4 [-55:-4] | |
| | RU 5 [4:55] | RU 6 [58:109] | RU 7 [138:189] | RU 8 [192:243] | |
| 106-tone RU | RU 1 [-243:-138] | RU 2 [-109:-4] | RU 3 [4:109] | RU 4 [138:243] | |
| 242-tone RU | RU 1 [-244:-3] | | RU 2 [3:244] | | |
| 484-tone RU | RU 1 [-244:-3, 3:244] | | | | |

*FIG. 15*

| RU Type | | | | | |
|---|---|---|---|---|---|
| 26-tone RU | RU 1 [-499:-474] | RU 2 [-473:-448] | RU 3 [-445:-420] | RU 4 [-419:-394] | RU 5 [-392:-367] |
| | RU 6 [-365:-340] | RU 7 [-339:-314] | RU 8 [-311:-286] | RU 9 [-285:-260] | |
| | RU 10 [-257:-232] | RU 11 [-231:-206] | RU 12 [-203:-178] | RU 13 [-177:-152] | RU 14 [-150:-125] |
| | RU 15 [-123:-98] | RU 16 [-97:-72] | RU 17 [-69:-44] | RU 18 [-43:-18] | RU 19 [-16:-4, 4:16] |
| | RU 20 [18:43] | RU 21 [44:69] | RU 22 [72:97] | RU 23 [98:123] | RU 24 [125:150] |
| | RU 25 [152:177] | RU 26 [178:203] | RU 27 [206:231] | RU 28 [232:257] | |
| | RU 29 [260:285] | RU 30 [286:311] | RU 31 [314:339] | RU 32 [340:365] | RU 33 [367:392] |
| | RU 34 [394:419] | RU 35 [420:445] | RU 36 [448:473] | RU 37 [474:499] | |
| 52-tone RU | RU 1 [-499:-448] | RU 2 [-445:-394] | RU 3 [-365:-314] | RU 4 [-311:-260] | |
| | RU 5 [-257:-206] | RU 6 [-203:-152] | RU 7 [-123:-72] | RU 8 [-69:-18] | |
| | RU 9 [18:69] | RU 10 [72:123] | RU 11 [152:203] | RU 12 [206:257] | |
| | RU 13 [260:311] | RU 14 [314:365] | RU 15 [394:445] | RU 16 [448:499] | |
| 106-tone RU | RU 1 [-499:-394] | RU 2 [-365:-260] | RU 3 [-257:-152] | RU 4 [-123:-18] | |
| | RU 5 [18:123] | RU 6 [152:257] | RU 7 [260:365] | RU 8 [394:499] | |
| 242-tone RU | RU 1 [-500:-259] | RU 2 [-258:-17] | RU 3 [17:258] | RU 4 [259:500] | |
| 484-tone RU | RU 1 [-500:-17] | | RU 2 [17:500] | | |
| 996-tone RU | RU 1 [-500:-3, 3:500] | | | | |

*FIG. 16*

| B19-B13 | Description | Number of entries |
|---|---|---|
| 0000000 - 0100100 | Possible 26-tone RU cases in 80 MHz | 37 |
| 0100101 - 0110100 | Possible 52-tone RU cases in 80 MHz | 16 |
| 0110101 - 0111100 | Possible 106-tone RU cases in 80 MHz | 8 |
| 0111101 - 1000000 | Possible 242-tone RU cases in 80 MHz | 4 |
| 1000001 - 1000010 | Possible 484-tone RU cases in 80 MHz | 2 |
| 1000011 | 996-tone RU case in 80 MHz | 1 |
| 1000100 | 2*996-tone RU case | 1 |
| Total | | 69 |

*FIG. 17*

| Ack Type subfield value | TID subfield values | Presence of optional subfields in the Per STA Info field | | Context of a Per STA Info field in a Multi-STA BlockAck frame |
|---|---|---|---|---|
| 0 | 0-7 | Block Ack Starting Sequence Control | Present | Block acknowledgment context. Sent as a response to an A-MPDU that solicits an immediate block acknowledgement or to a BAR frame |
| | | Block Ack Bitmap | Present | |
| 1 | 0-7 | Block Ack Starting Sequence Control | Not present | Acknowledgment context. Sent as a response to an MPDU or VHT Single MPDU that solicits an immediate acknowledgment |
| | | Block Ack Bitmap | Not present | |
| 0 or 1 | 8 to 13 | N/A | N/A | Reserved |
| 0 | 14 | N/A | N/A | Reserved |
| 1 | 14 | Block Ack Starting Sequence Control | Not present | All block acknowledgment context. Sent as a response to an A-MPDU that solicits an immediate response and all MPDUs contained in the A-MPDU are received successfully. |
| | | Block Ack Bitmap | Not present | |
| 0 | 15 | N/A | N/A | Reserved |
| 1 | 15 | Block Ack Starting Sequence Control | Not present | Action Ack frame acknowledgment context. Sent as a response to an Action Ack frame carried in an A-MPDU that solicits an immediate acknowledgment |
| | | Block Ack Bitmap | Not present | |

*FIG. 38*

WIRELESS COMMUNICATION METHOD USING OFDMA RANDOM ACCESS AND WIRELESS COMMUNICATION TERMINAL USING SAME

CROSS-REFERENCE TO RELATED APPLICATIONS

This application is a continuation of U.S. patent application Ser. No. 16/452,448 filed on Jun. 25, 2019, which is a continuation of International Patent Application No. PCT/KR2017/015535 filed on Dec. 27, 2017, the entire contents of which are incorporated herein by reference.

TECHNICAL FIELD

The present invention relates to a wireless communication method and a wireless communication terminal using OFDMA random access.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel Therefore, required is a technology capable of efficiently using bandwidths by simultaneously transmitting data between a plurality of terminals and base terminals.

DISCLOSURE

Technical Problem

An object of an embodiment of the present invention is to provide a wireless communication terminal using OFDMA random access.

Technical Solution

According to an embodiment of the present invention, a wireless communication terminal that wirelessly communicates with a base wireless communication terminal includes a transceiver, and a processor. The processor is configured to set an integer selected from a range of 0 to a value equal to or smaller than an OFDMA Contention Window (OCW) as a counter for random access, receive a trigger frame for triggering random access using one or more resource units (RUs) allocated for random access from the base wireless communication terminal using the transceiver, decrement a value of the counter based on the one or more RUs allocated for the random access, randomly select one RU based on the one or more RUs allocated for the random access when the value of the counter is 0 or reaches 0, and attempt transmission to the base wireless communication terminal using the selected RU. In this case, the RU is a group of a plurality of subcarriers usable for uplink transmission and downlink transmission.

The processor may be configured to decrement the value of the counter based on the one or more RUs allocated for the random access and a capability of the wireless communication terminal.

The processor may be configured to decrement the value of the counter by the number of RUs through which the wireless communication terminal is capable of transmitting a TB PPDU according to the capability of the wireless communication terminal among the one or more RUs allocated for the random access.

When the value of the counter is 0 or reaches 0, the processor may be configured to randomly select any one of RUs that are allocated for the random access and through which the wireless communication terminal is capable of transmitting a TB PPDU according to the capability of the wireless communication terminal.

The capability of the wireless communication terminal includes a capability related to a bandwidth through which the wireless communication terminal is capable of performing transmission.

The capability of the wireless communication terminal may include a capability related to a length of a padding field included in the TB PPDU.

The capability of the wireless communication terminal may include a capability related to a modulation and coding scheme with which the wireless communication terminal is capable of performing transmission.

The wireless communication terminal may be a wireless communication terminal unassociated with the base wireless communication terminal. The processor may be configured to set an OCW minimum value, which is a parameter indicating a minimum value of an OCW, to a value predetermined as a default value of the OCW minimum value, and set an OCW maximum value, which is a parameter indicating a maximum value of an OCW, to a value predetermined as a default value of the OCW maximum value. In this case, the value predetermined as the default value of the OCW minimum value and the value predetermined as the default value of the OCW maximum value may not be values designated by the base wireless communication terminal.

The wireless communication terminal may be a wireless communication terminal unassociated with the base wireless communication terminal. When the wireless communication terminal communicates with a different base wireless communication terminal different from the base wireless communication terminal, the processor may be configured to initialize a parameter for random access to the different wireless communication terminal. In this case, the parameter for the random access may include the counter, an OCW minimum value, which is a parameter indicating a minimum value of the OCW, and an OCW maximum value, which is a parameter indicating a maximum value of the OCW.

When the wireless communication terminal communicates with the base wireless communication terminal, the processor may be configured to set the OCW minimum value and the OCW maximum value according to information received from the base wireless communication terminal. In this case, when the wireless communication terminal communicates with the different base wireless communication terminal, the processor may be configured to set the OCW minimum value and the OCW maximum value according to information received from the different base wireless communication terminal.

The wireless communication terminal is associated with the base wireless communication terminal. In this case, the processor may be configured to set an OCW minimum value, which is a parameter indicating the minimum value of the OCW, and an OCW maximum value, which is a parameter indicating the maximum value of the OCW, according to information received from a base wireless communication terminal different from the base wireless communication terminal. In addition, the different base wireless communication terminal may belong to a multiple Basic Service Set Identification (BSSID) set to which the base wireless communication terminal belongs.

The processor may be configure not to decrement the value of the counter based on a trigger frame transmitted from the different base wireless communication terminal.

The different base wireless communication terminal may be a base wireless communication terminal operating a BSS corresponding to a transmitted Basic Service Set Identification (BSSID) of the multiple BSSID set.

The information received from the different base wireless communication terminal may not be information indicated in a signaling field allocated for a BSS including the wireless communication terminal.

When the trigger frame indicates an uplink transmission of the wireless communication terminal, the processor may be configured not to decrement the value of the counter based on the trigger frame.

According to an embodiment of the present invention, a method of operating a wireless communication terminal wirelessly communicating with a base wireless communication terminal includes: setting an integer selected from a range of 0 to a value equal to or smaller than an OFDMA Contention Window (OCW) as a counter for random access, receiving a trigger frame for triggering random access using one or more resource units (RUs) allocated for the random access from the base wireless communication terminal, decrementing a value of the counter based on the one or more RUs allocated for the random access, randomly selecting one RU based on the one or more RUs allocated for the random access when the value of the counter is 0 or reaches 0, and attempting transmission to the base wireless communication terminal using the selected RU. In this case, the RU is a group of a plurality of subcarriers useable for OFDM communication.

The decrementing the value of the counter may include decrementing the value of the counter based on the one or more RUs allocated for the random access and the capability of the wireless communication terminal.

The decrementing the value of the counter based on the one or more RUs allocated for the random access and the capability of the wireless communication terminal may include decrementing the value of the counter by the number of RUs through which the wireless communication terminal is capable of transmitting a TB PPDU according to the capability of the wireless communication terminal among the one or more RUs allocated for the random access.

The randomly selecting the one or more RUs allocated for the random access may include randomly selecting any one of RUs, which are allocated for the random access and through which the wireless communication terminal is capable of transmitting a TB PPDU according the capability of the wireless communication terminal.

The wireless communication terminal may be a wireless communication terminal unassociated with the base wireless communication terminal. The operation method may further includes: setting an OCW minimum value, which is a parameter indicating a minimum value of the OCW, to a value predetermined as a default value of the OCW minimum value, and setting an OCW maximum value, which is a parameter indicating a maximum value of the OCW, to a value predetermined as a default value of the OCW maximum value. In addition, the value predetermined as the default value of the OCW minimum value and the value predetermined as the default value of the OCW maximum value may not be values designated by the base wireless communication terminal.

Advantageous Effects

An embodiment of the present invention provides a wireless communication method using OFDMA random access and a wireless communication terminal using the same.

DESCRIPTION OF DRAWINGS

FIG. 7 shows a specific trigger frame format according to an embodiment of the present invention.

FIG. 8 shows a specific format of the Common Info field and the User Info field of the trigger frame according to an embodiment of the present invention.

FIG. 14 shows types of RUs and subcarrier indexes that may be used when transmitting a PPDU having a 20 Mhz bandwidth according to an embodiment of the present invention.

FIG. 15 shows types of RUs and subcarrier indexes that may be used when transmitting a PPDU having a 40 Mhz bandwidth according to an embodiment of the present invention.

FIG. 16 shows types of RUs and subcarrier indexes that may be used when transmitting a PPDU having an 80 Mhz bandwidth according to an embodiment of the present invention.

FIG. 17 shows an encoding value used for indicating an RU in an RU Allocation subfield of a trigger frame according to an embodiment of the present invention.

FIG. 38 shows the context of a Per STA Info subfield according to an embodiment of the present invention.

MODE FOR CARRYING OUT THE INVENTION

Figure 1:
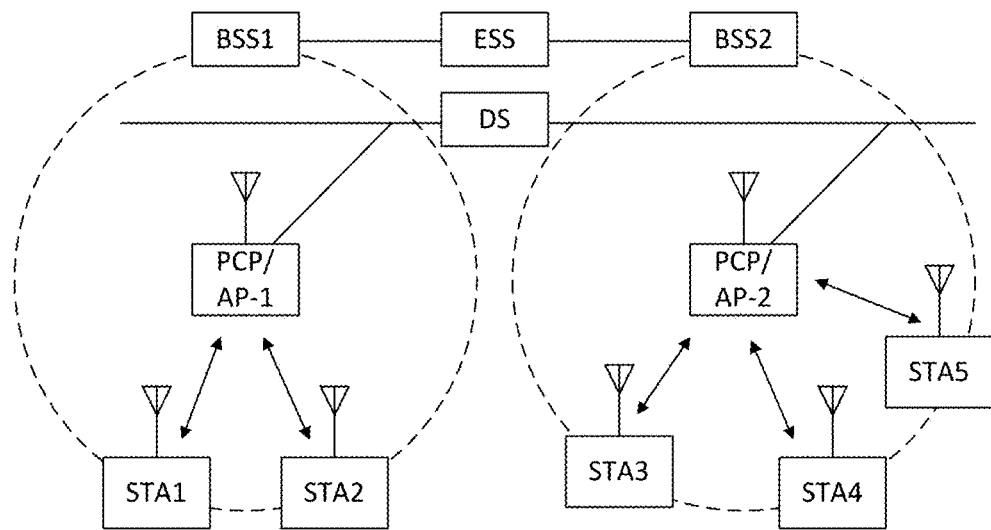
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2016-0179781 (2016.12.27), Nos. 10-2017-0000020 (2017.01.02), Nos. 10-2017-0000437 (2017.01.02), Nos. 10-2017-0002195 (2017.01.06), and Nos. 10-2017-0002720 (2017.01.09) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
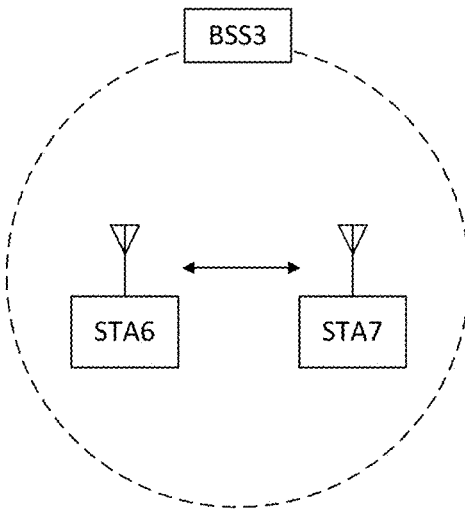
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
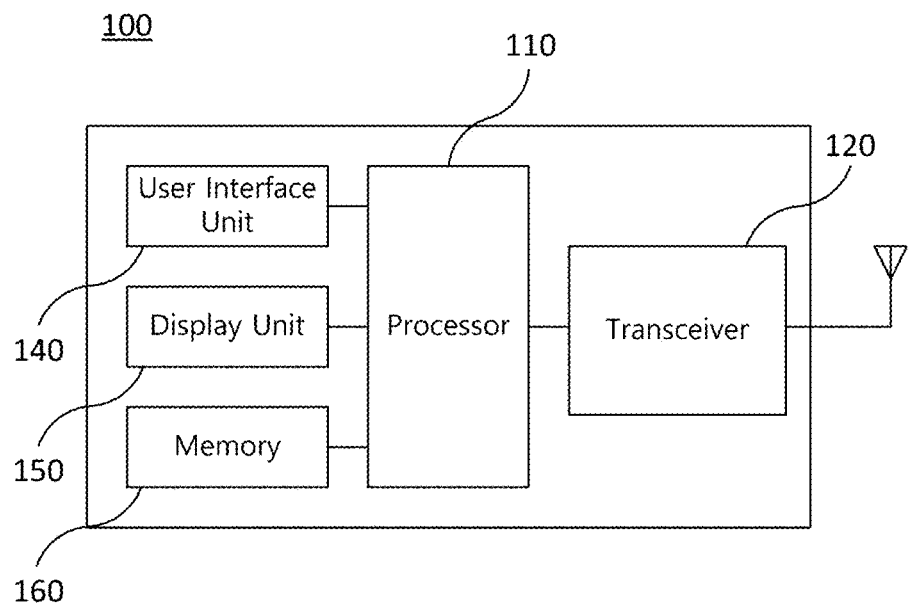
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
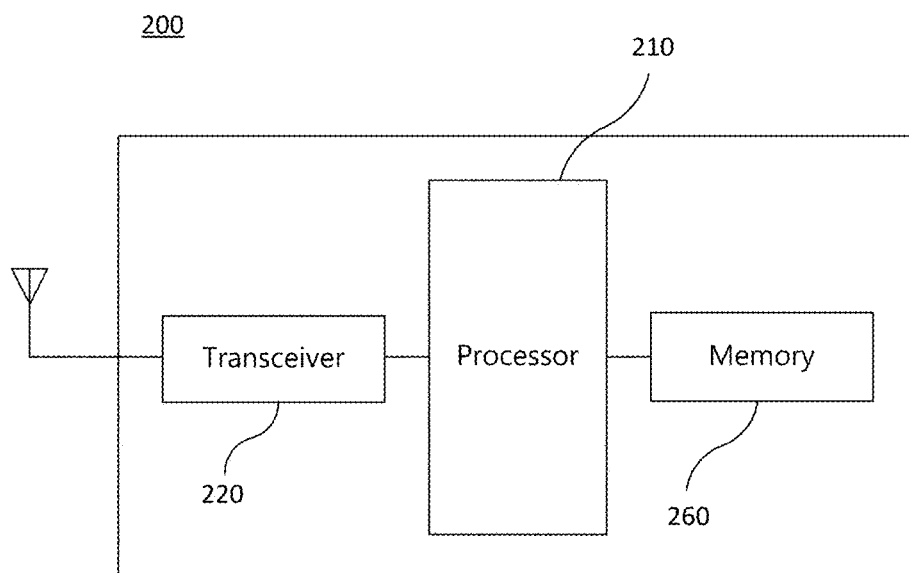
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
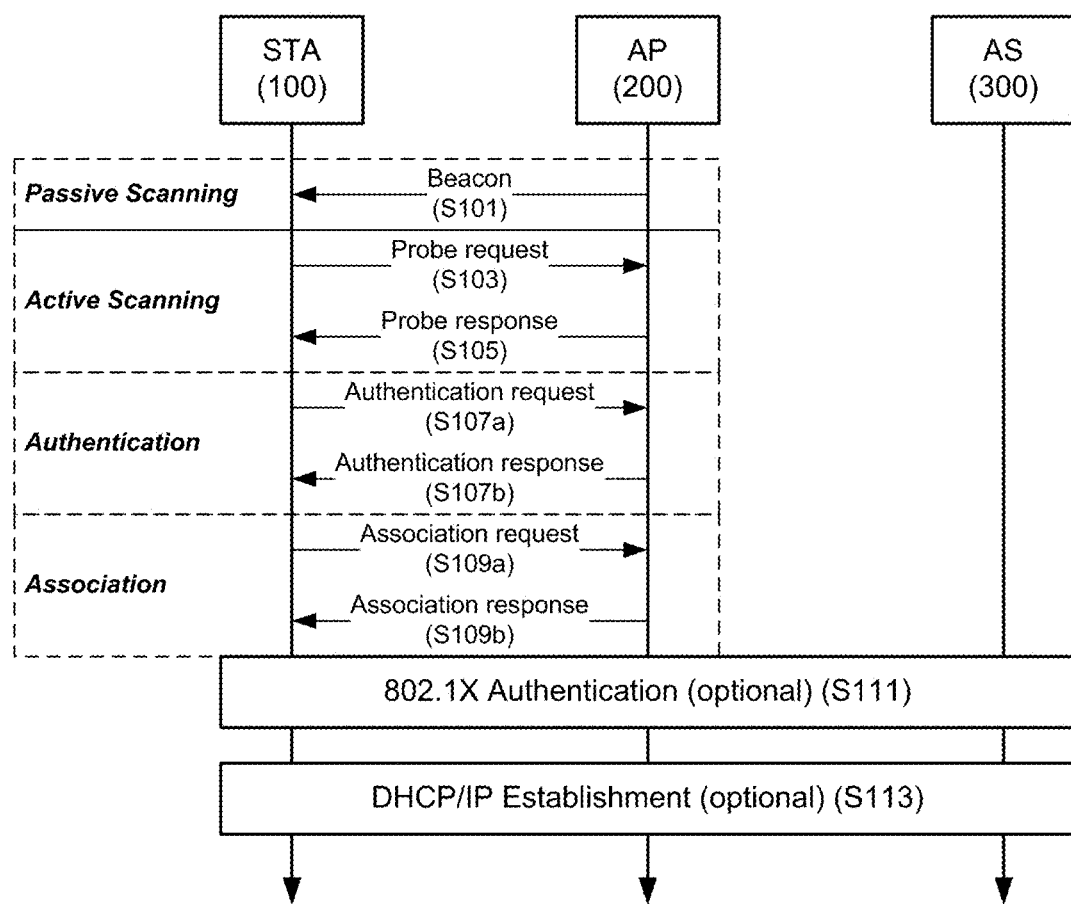
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

The base wireless communication terminal may be a wireless communication terminal that allocates and schedules medium resources in communication with a plurality of wireless communication terminals. Specifically, the base wireless communication terminal may serve as a cell coordinator. In a specific embodiment, the base wireless communication terminal may be a wireless communication terminal that allocates and schedules communication medium resources in an independent network, such as an ad-hoc network, that is not connected to an external distribution service.

The base wireless communication terminal may simultaneously communicate with a plurality of wireless communication terminals using Orthogonal Frequency Division Multiple Access (OFDMA) or Multi-user Multiple Input Multiple Output (MU-MIMO). In this case, the base wireless communication terminal may transmit trigger information to a plurality of wireless communication terminals to trigger uplink (UL) multi-user (MU) transmission using OFDMA of the plurality of wireless communication terminals. This will be described with reference to FIG. 6.

Figure 6:
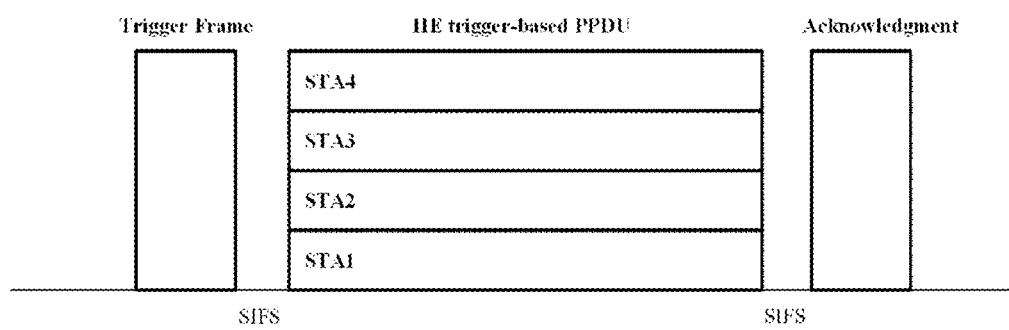
FIG. 6 shows UL MU transmission of a wireless communication terminal according to an embodiment of the present invention.

FIG. 6 shows UL MU transmission of a wireless communication terminal according to an embodiment of the present invention.

The base wireless communication terminal may transmit trigger information to a plurality of wireless communication terminals to trigger UL MU transmission of the plurality of wireless communication terminals. Specifically, the base wireless communication terminal may transmit trigger information to a plurality of wireless communication terminals to trigger the plurality of wireless communication terminals to simultaneously transmit an immediate response frame. In this case, the immediate response may indicate that the response frame is transmitted within a predetermined time from when the trigger information is received in the same Transmission Opportunity (TXOP). In this case, the predetermined time may be a Short Inter-Frame Space (SIFS) defined in the 802.11 standard. The base wireless communication terminal can transmit the trigger information using the trigger frame. Also, the base wireless communication terminal may transmit the trigger information using the MAC header.

A plurality of wireless communication terminals may transmit a response frame for trigger information using a trigger based (TB) PPDU. In this case, the plurality of wireless communication terminals may transmit the TB PPDU after a predetermined time from when the trigger information is received. In addition, the plurality of wireless communication terminals may transmit the TB PPDU using at least one of UL OFDMA and UL MU-MIMO. When the trigger type of the trigger information is transmitted through an MU-Request To Send (RTS) frame, a plurality of wireless communication terminals can transmit a response frame for an MU-RTS frame using a non-HT PPDU.

In the embodiment of FIG. 6, the AP transmits a trigger frame to the first station STA1, the second station STA2, the third station STA3, and the fourth station STA4. The first station STA1, the second station STA2, the third station STA3, and the fourth station STA4 receive a trigger frame. The first station STA1, the second station STA2, the third station STA3 and the fourth station STA4 transmit a HE trigger-based PPDU (TB PPDU) when the SIFS elapses from when the trigger frame is received. The AP receives the HE trigger-based PPDU (TB PPDU) and transmits an ACK to the first station STA1, the second station STA2, the third station STA3 and the fourth station STA4.

As described above, the base wireless communication terminal may transmit trigger information using a trigger frame or a MAC header. Specifically, the base wireless communication terminal may transmit the trigger information using the UL MU Response Scheduling (UMRS) A-Control subfield of the MAC header. In a specific embodiment, the wireless communication terminal receiving the MAC frame including the UMRS A-Control subfield transmits the TB PPDU in response to the UMRS A-Control subfield. Also, the wireless communication terminal indicated by the User Info field of the trigger frame may transmit the TB PPDU in response to the trigger frame. A specific format of the trigger frame will be described in detail with reference to FIG. 7.

FIG. 7 shows a specific trigger frame format according to an embodiment of the present invention.

The trigger frame may include at least one of a Frame Control field, a Duration field, an RA field, a TA field, a Common Info field, a User Info field, a Padding field, and an FCS field. Depending on the trigger type, the response which is requested by the trigger frame may vary. In addition, the field included in the trigger frame may vary depending on the trigger type.

The RA field indicates the receiver address of the trigger frame. When the trigger frame triggers the transmission of one wireless communication terminal, the RA field may indicate the MAC address of the corresponding wireless communication terminal. When the trigger frame triggers the transmission of two or more wireless communication terminals, the RA field may indicate a broadcast address. When the trigger type of the trigger frame is GCR MU-BAR, the RA field may indicate a group address corresponding to a plurality of wireless communication terminals triggered by the trigger frame.

The TA field indicates the transmitter address of the trigger frame. When the wireless communication terminal transmitting the trigger frame does not use the multiple BSSID, the TA field may indicate the MAC address of the wireless communication terminal transmitting the trigger frame. In addition, when a wireless communication terminal transmitting a trigger frame uses multiple BSSIDs and the trigger frame triggers a plurality of wireless communication terminals of a multiple BSSID set, the TA field may indicate the transmitted BSSID of the multiple BSSID set to which the wireless communication terminal transmitting the trigger frame belongs. In this case, the transmitted BSSID indicates a BSS that may signal information on other BSS included in the multiple BSSID set. The identifier of the BSS that does not correspond to the transmitted BSSID among the BSSs included in the multiple BSSID set is a nontransmitted BSSID. Specifically, the base wireless communication terminal operating the BSS corresponding to the transmitted BSSID may signal information on the BSS corresponding to the nontransmitted BSSID using the multiple BSSID elements. The management frame transmitted from the BSS corresponding to the transmitted BSSID may include multiple BSSID elements. In this case, the management frame may include a beacon frame and a probe response frame. In addition, the transmitted BSSID may be present for each multiple BSSID set. This will be described in more detail with reference to FIG. 11.

The Common Info field indicates information commonly required for at least one wireless communication terminal triggered by the trigger frame to transmit a response to the trigger frame. The User Info field individually indicates information required for each of the plurality of wireless communication terminals indicated by the trigger frame to transmit a response to the trigger frame. Specifically, the trigger frame may include a plurality of User Info fields. A specific format of the Common field and the User Info field will be described with reference to FIG. 8.

The Padding field includes a padding bit. Specifically, the Padding field may help secure a time for the wireless communication terminal transmitting the response frame to the trigger frame to prepare for the response frame transmission. Therefore, the length of the Padding field may be determined according to the capability of the wireless communication terminal transmitting the response frame to the trigger frame. Also, the trigger frame may not include the Padding field. The Padding field may indicate the start of the Padding field with a predetermined value. In this case, the predetermined value may be 0xFFF. In addition, the remaining fields of the Padding field other than the Padding field including the predetermined value may include a value other than the predetermined value or a predetermined value.

The specific format of the trigger frame may be the same as that of the embodiment of FIG. 7.

FIG. 8 shows a specific format of the Common Info field and the User Info field of the trigger frame according to an embodiment of the present invention.

Specifically, the format of the Common Info field and the format of the User Info field according to an embodiment of the present invention may be the same as those shown in FIGS. 8(a) and 8(b), respectively. The User Info field may indicate a wireless communication terminal triggered by the trigger frame. Specifically, when the User Info field includes the Association Identifier (AID) of the wireless communication terminal or a part of the AID, the wireless communication terminal corresponding to the AID may determine that the trigger frame triggers the wireless communication terminal. In a specific embodiment, the AID12 subfield in the User Info field may indicate 12 Least Significant Bits (LSBs) of the AID of the wireless communication terminal triggered by the trigger frame.

In addition, the User Info field may indicate a resource unit (RU) allocated to a wireless communication terminal triggered by the trigger frame. The RU may indicate that a plurality of subcarriers that may be useable for uplink and downlink transmission are grouped according to the size of the frequency band. In this case, in the uplink transmission and the downlink transmission, at least one of OFDM, OFDMA, and MU-MIMO may be used. Also, the grouping may be referred to as subchannelization. In a specific embodiment, the RU Allocation subfield may indicate an RU allocated to a wireless communication terminal indicated by the AID12 subfield.

The base wireless communication terminal may trigger the uplink transmission of an arbitrary wireless communication terminal using the trigger frame. Specifically, the base wireless communication terminal may trigger random access to the designated RU. In this case, the base wireless communication terminal may set the User Info field of the trigger frame to indicate a predetermined value instead of the AID of the specific wireless communication terminal. In a specific embodiment, the base wireless communication terminal may set the AID12 subfield of the User Info field of the trigger frame to a predetermined value. In addition, when the User Info field of the trigger frame indicates a predetermined value instead of the AID of the specific wireless communication terminal, the wireless communication terminal receiving the trigger frame can randomly access the RU indicated by the corresponding User Info field. In a specific embodiment, when the AID12 subfield of the User Info field of the trigger frame received by the wireless communication terminal indicates a predetermined value, the wireless communication terminal randomly accesses the RU indicated by the RU Allocation subfield of the corresponding User Info field. The predetermined value may be 0. In addition, the predetermined value may be 2045. A specific operation in which the wireless communication terminal performs random access based on the trigger frame will be described with reference to FIG. 9.

Figure 9:
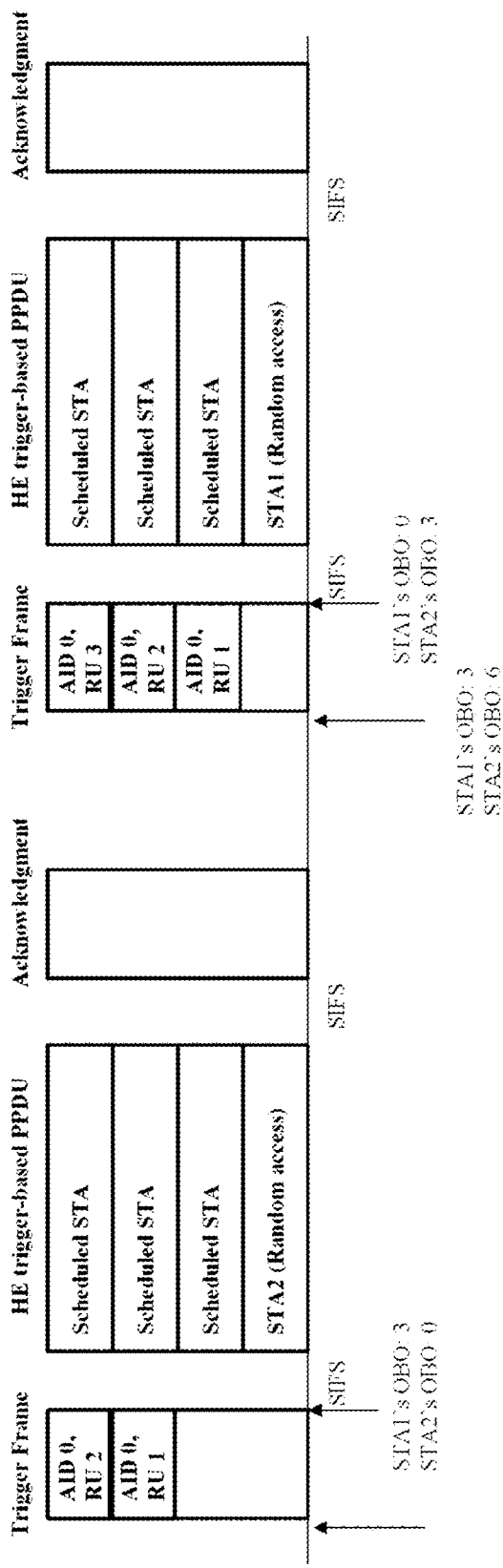
FIG. 9 shows the random access operation of a wireless communication terminal according to an embodiment of the present invention.

FIG. 9 shows the random access operation of a wireless communication terminal according to an embodiment of the present invention.

The wireless communication terminal may perform an OFDMA random access operation through the following operations. The wireless communication terminal selects an arbitrary integer within the OFDMA contention window (OCW). Specifically, the wireless communication terminal may select a random integer in a range from 0 to a value equal to or smaller than the OCW. In this case, the OCW may be equal to or greater than the OCW minimum value OCWmin, or may be equal to or less than the OCW maximum value OCWmax, which is a positive integer. The wireless communication terminal sets the selected number to an OFDMA random access backoff (OBO) counter. The wireless communication terminal may receive the trigger frame and decrement the OBO counter based on the RU which the trigger frame indicates for the random access. Specifically, the wireless communication terminal may receive the trigger frame and decrement the OBO counter by the number of RUs in which the trigger frame indicates the random access. When the OBO counter is 0 or the OBO counter reaches 0, the wireless communication terminal may randomly select any one of the RUs indicated for the random access and attempt transmission through the selected RU. In this case, the wireless communication terminal may determine whether the selected RU is idle, and may transmit a pending frame for a base wireless communication terminal to the base wireless communication terminal through the selected RU when the selected RU is idle. In addition, when the wireless communication terminal determines that the corresponding RU is determined to be busy by either a physical carrier sense or a virtual carrier sense, the wireless communication terminal may determine that the corresponding RU is busy. The physical carrier sense may include a Clear Channel Assessment (CCA). In addition, the physical carrier sense may include an energy detection (ED). When it is determined that the RU selected by the wireless communication terminal is busy, the wireless communication terminal may maintain the OBO counter as 0 without transmitting a pending frame to the base wireless communication.

The wireless communication terminal may set OCWmin and OCWmax according to the OBO-related parameter value signaled by the base wireless communication terminal associated with the wireless communication terminal. Also, when the wireless communication terminal attempts random access for the first time, the wireless communication terminal receives the OBO-related parameter signaled by the base wireless communication terminal, or the wireless communication terminal succeeds in transmission through the random access, the wireless communication terminal may be allowed to initialize the OBO procedure. In this case, the initialization of the OBO procedure may include at least one of the initialization of the OBO counter and the initialization of the OCW. Further, when the wireless communication terminal initializes the OCW, the wireless communication terminal may set the OCW to OCWmin. When the transmission through the random access of the wireless communication terminal fails, the wireless communication terminal may update the value of OCW to (2×OCW+1). In this case, the wireless communication terminal selects a random integer in the updated OCW, and sets the random integer selected as the OBO counter. Further, when the value of the OCW reaches OCWmax, the wireless communication terminal may maintain the OCW as OCWmax even if the transmission through the random access of the wireless communication terminal fails.

In the embodiment of FIG. 9, the OBO counter of the first station STA1 is 5 and the OBO counter of the second station STA2 is 1. The AP transmits a trigger frame that triggers a random access for the first RU RU 1 and the second RU RU 2. Since the number of RUs allocated for random access is 2, the first station STA1 decrements the OBO counter by 2 and sets the OBO counter to 3, and the second station STA2 sets the OBO counter to 0. Since the OBO counter of the second station STA2 becomes 0, the second station STA2 randomly selects any one of the first RU RU 1 and the second RU RU 2 allocated for random access and attempts transmission. After SIFS from when the second station STA2 receives the trigger frame, the second station STA2 transmits the TB PPDU to the AP through the randomly selected RU. The AP receives the TB PPDU from the second station STA2. After SIFS from when the AP receives the TB PPDU, the AP transmits an ACK for the frame transmitted by the second station to the second station.

The second station STA2 whose transmission for the AP is successfully sets OCW to OCWmin and selects an arbitrary number within the set OCW. In this case, the second station STA2 selects 6 and sets 6 as the OBO counter. The AP transmits a trigger frame that triggers a random access to the first RU RU 1, the second RU RU 2, and the third RU RU 3. Since the number of RUs allocated for random access is 3, the first station STA1 decrements the OBO counter by 3 and sets it to 0, and the second station STA2 decrements the OBO counter by 3 and sets it to 3. Since the OBO counter of the first station STA1 becomes 0, the first station STA1 arbitrarily selects any one of the first RU RU 1, the second RU RU 2, and the third RU RU 3, in which a trigger is allocated for random access, and attempts transmission. After SIFS from when the first station STA1 receives the trigger frame, the first station STA1 transmits the TB PPDU to the AP through the arbitrarily selected RU. The AP receives the TB PPDU from the first station STA1. After SIFS from when the AP receives the TB PPDU, the AP transmits an ACK for the frame transmitted by the first station to the first station.

As described above, the wireless communication terminal may set OCWmin and OCWmax according to the OBO-related parameter value signaled by the base wireless communication terminal associated with the wireless communication terminal. Specifically, the wireless communication terminal may receive an element including an OBO-related parameter value from a base wireless communication terminal associated with the wireless communication terminal. In this case, the element may be referred to as a UL OFDMA-based Random Access (UORA) parameter set element. A specific format of the UORA parameter set element will be described with reference to FIG. 10.

Figure 10:
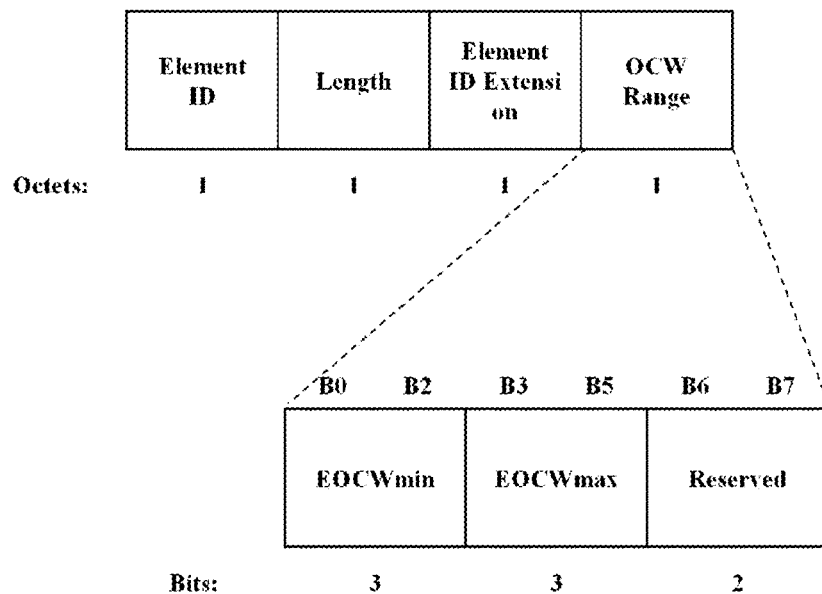
FIG. 10 shows a specific format of the UORA parameter set element according to an embodiment of the present invention.

FIG. 10 shows a specific format of the UORA parameter set element according to an embodiment of the present invention.

The UORA parameter set element may include an Element ID field, a Length field, an Element ID Extension field, and an OCW Range field. The Element ID field indicates an element identifier that identifies the UORA parameter set element. The Length field indicates the length of the UORA element. The Element ID Extension field indicates an extension ID that is combined with an element ID to make an extended ID of the UORA parameter set element. The OCW Range field indicates information on the range of the OCW.

The OCW Range field may include information on OCWmin and OCWmax. Specifically, the OCW Range field may include an EOCWmin field, an EOCWmax field, and a Reserved field. In this case, the wireless communication terminal may set the OCWmin according to the value indicated by the EOCWmin field. In a specific embodiment, the wireless communication terminal may set OCWmin to 2EOCWmin−1. Further, the wireless communication terminal may set OCWmax according to the value indicated by the EOCWmax field. In a specific embodiment, the wireless communication terminal may set OCWmax to 2EOCWmax−1.

The wireless communication terminal may set OCWmin and OCWmax according to the most recently received UORA parameter set element. In addition, the wireless communication terminal may set OCWmin and OCWmax according to the most recently received UORA parameter set element regardless of the Access Category (AC) of the traffic to be transmitted. The base wireless communication terminal may transmit a UORA parameter set element using a beacon frame. Also, the base wireless communication terminal may transmit a UORA parameter set element using a probe response frame.

The specific format of the UORA parameter set element may be the same as that in FIG. 10.

When there are a plurality of physical access points in one network, due to the management frames transmitted by the plurality of access points, the time for the frame for data transmission to occupy the channel may be very short. Therefore, one base wireless communication terminal can operate a plurality of BSSs in network. This will be described with reference to FIG. 11.

Figure 11:
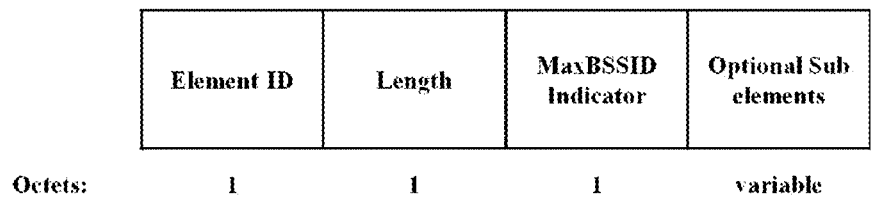
FIG. 11 shows a specific format of a multiple BSSID element according to an embodiment of the present invention.

FIG. 11 shows a specific format of a multiple BSSID element according to an embodiment of the present invention.

The base wireless communication terminal may transmit one management frame to signal information on a plurality of BSSs. Specifically, the base wireless communication terminal transmits one management frame to signal information on each BSS corresponding to a plurality of BSS identifiers (BSSIDs) included in a multiple BSSID set. The multiple BSSID set is a set of BSSIDs corresponding to each of a plurality of BSSs classified into one group. When the base wireless communication terminal uses multiple BSSID sets, since the wireless communication terminal transmits one management frame and signals information on a plurality of BSSs, it may increase the amount of time that a data frame can occupy a channel. In a specific embodiment, the wireless communication terminal may set the reference BSSID representing the multiple BSSID set to the BSS information indicated by the management frame, and insert information on a multiple BSSID set into the management frame. The information on the multiple BSSID set may include information related to the maximum number of the plurality of BSSIDs included in the multiple BSSID set. In this case, the reference BSSID may be a BSSID that is a reference when identifying the BSSID included in the multiple BSSID set. Specifically, the information on the multiple BSSID set may be the multiple BSSID elements in FIG. 11. In this case, the information on the multiple BSSID set may include sub-elements.

The multiple BSSID element may include an Element ID field. The Element ID field is an identifier indicating a multiple BSSID element. In addition, the multiple BSSID element may include a Length field. The Length field is a field indicating the length of multiple BSSID elements. In addition, the multiple BSSID element may indicate a Max BSSID indicator field. In this case, the Max BSSID indicator field may indicate information related to the maximum number of BSSIDs that a multiple BSSID set may include. Specifically, when the value indicated by the Max BSSID indicator field is n, the maximum number of BSSIDs that a multiple BSSID set may include is $2^n$. In this case, the maximum number of BSSIDs is the number including the reference BSSID.

In addition, the multiple BSSID element may include an Optional Subelements field. The Optional Subelements may include information on the BSS indicated by the nontransmitted BSSID. The nontransmitted BSSID indicates the BSSID included in the multiple BSSID set in addition to the reference BSSID. Specifically, the Optional Subelements field may include a nontransmitted BSSID profile, which is information on the BSS indicated by the nontransmitted BSSID. The Optional Subelements field may include only information on the BSS indicated by some nontransmitted BSSIDs. In this case, the wireless communication terminal may obtain information on the BSS indicated by the remaining nontransmitted BSSID based on the beacon frame or the probe response frame.

The information on the BSS indicated by the nontransmitted BSSID may be an element to be included in the nontransmitted BSSID Capability element and the beacon frame body. Specifically, the element that may be included in the beacon frame body may be at least one of an SSID, a multiple BSSID-index sub-element, and an FMD Descriptor element. In addition, the same information as the BSS information indicated by the reference BSSID among the information on the BSS indicating the nontransmitted BSSID may be omitted. Specifically, at least one of a Timestamp and Beacon Interval field indicated by a Nontransmitted BSSID, a DSSS Parameter Set, an IBSS Parameter Set, Country, Channel Switch Announcement, Extended Channel Switch Announcement, Wide Bandwidth Channel Switch, Transmit Power Envelope, Supported Operating Classes, IBSS DFS, ERP Information, HT Capabilities, HT Operation, VHT Capabilities, and a VHT Operation element may be the same as the BSS indicated by the reference BSSID.

In addition, the Optional Subelement field may include a vendor specific element.

A wireless communication terminal receiving a management frame including information on a multiple BSSID set may obtain information on a multiple BSSID set from a management frame. In this case, the wireless communication terminal may obtain the BSSID included in the multiple BSSID set based on the information on the multiple BSSID set and the reference BSSID. Specifically, the wireless communication terminal can obtain the BSSID included in the multiple BSSID set through the following equation.

$$BSSID(i)=BSSID\_A|BSSID\_B$$

In this case, BSSID_A is a BSSID in which (48−n) Most Significant Bit (MSB) values are equal to (48−n) MSB values of the reference BSSID and n Least Significant Bit (LSB) values are 0. Also, BSSID_B is a BSSID in which (48−n) MSB values are 0, and the n LSB values are the remaining value (mod) when dividing the sum of n LSBs and i of the reference BSSID by $2^n$.

In addition, the base wireless communication terminal may signal information on multiple BSSID sets using the Operation element. The Operation element may include a MaxBSSID Indicator field and a Tx BSSID Indicator field. The MaxBSSID Indicator field may indicate the same information as the MAX BSSID Indicator field of multiple BSSID elements. Therefore, the wireless communication terminal may obtain the BSSID of the BSS in which the management frame is transmitted by using the MaxBSSID Indicator field in the same manner as the method of obtaining the BSSID of the BSS in which the management frame is transmitted using the MAX BSSID Indicator field of the multiple BSSID element. The Tx BSSID Indicator field indicates whether the BSS to which the management frame including the Operation element is transmitted corresponds to the nontransmitted BSSID. Specifically, when the Tx BSSID Indicator field is 1, the BSS in which the management frame including the Operation element is transmitted corresponds to the transmitted BSSID. When the Tx BSSID Indicator field is 0, the BSS in which the management frame including the Operation element is transmitted corresponds to the nontransmitted BSSID.

In addition, the wireless communication terminal may signal information on a capability related to a multiple BSSID set using the Capabilities element of the management frame. Specifically, the wireless communication terminal may transmit the Rx Control Frame to MultiBSS field using the Capabilities element of the management frame. The Rx Control Frame to MultiBSS field may indicate whether the frame transmitted from the transmitted BSSID may be received when the wireless communication terminal is associated with the BSS corresponding to the nontransmitted BSSID. Specifically, the Rx Control Frame to MultiBSS field may indicate whether the control frame transmitted from the transmitted BSSID may be received when the wireless communication terminal is associated with the BSS corresponding to the nontransmitted BSSID.

When the BSS including the wireless communication terminal corresponds to the multiple BSSID set, the OFDMA random access operation of the wireless communication terminal is an issue. The reason is because the BSS included in the multiple BSSID set is a formally different BSS but due to the purpose of using multiple BSSID sets, in the operation of the specific wireless communication terminal, the BSSs included in the multiple BSSID set may be treated as the identical BSS (Intra-BSS). Also, the reason is because the trigger frame transmitted from the transmitted BSSID can trigger the uplink transmission of the wireless communication terminal included in the BSS corresponding to the nontransmitted BSSID. Specifically, there is a problem in the operation of the wireless communication terminal relating to the OBO-related parameter setting, the OBO procedure initialization, the OBO counter decrementing operation, and the RU selection for random access.

When the BSS of the wireless communication terminal is included in the multiple BSSID set and the wireless communication terminal is associated with the BSS corresponding to the nontransmitted BSSID, the wireless communication terminal may set the OBO-related parameters based on the UORA parameter set transmitted by the transmitted BSSID. When the BSS of the wireless communication terminal is included in the multiple BSSID set and the wireless communication terminal is associated with the BSS corresponding to the nontransmitted BSSID, the wireless communication terminal may update the OCWmin and OCWmax according to the UORA parameter set transmitted by the transmitted BSSID. In this embodiment, the UORA parameter set may not be included in the nontransmitted BSSID Profile. In addition, the UORA parameter set may be commonly applied to at least one other BSS included in the multiple BSSID set. Accordingly, when the BSS of the wireless communication terminal is included in the multiple BSSID set and the wireless communication terminal is associated with the BSS corresponding to the nontransmitted BSSID, the wireless communication terminal may set the OBO-related parameter according to the UORA parameter set transmitted by the transmitted BSSID. In addition, when the BSS of the wireless communication terminal is included in the multiple BSSID set and the wireless communication terminal is associated with the BSS corresponding to the nontransmitted BSSID, the nontransmitted BSSID Profile subelement corresponding to the BSS associated with the wireless communication terminal may not include the UORA parameter set element. In such a way, when the nontransmitted BSSID Profile subelement does not include a UORA parameter set element, the wireless communication terminal may set the OBO-related parameter according to the UORA parameter set transmitted by the transmitted BSSID.

When the base wireless communication terminal transmits the management frame in the BSS corresponding to the transmitted BSSID, the base wireless communication terminal can signal the OBO-related parameters to be used by the wireless communication terminals of the plurality of BSSs corresponding to the multiple BSSID sets using the UORA parameter set transmitted by the transmitted BSSID. Also, when the base wireless communication terminal transmits the management frame in the BSS corresponding to the transmitted BSSID, the base wireless communication terminal may signal the OBO-related parameters separately from other BSSs of the multiple BSSID set to the wireless communication terminals of the BSS corresponding to the nontransmitted BSSID using the nontransmitted BSSID profile subelement. Through these embodiments, the base wireless communication terminal can efficiently signal the OBO-related parameters to a plurality of wireless communication terminals included in the BSS corresponding to the multiple BSSID set.

As described above, when the wireless communication terminal is signaled with information on the OBO-related parameter from the base wireless communication terminal, the wireless communication terminal may initialize the OBO procedure. Accordingly, if the BSS of the wireless communication terminal is included in the multiple BSSID set and the wireless communication terminal is associated with the BSS corresponding to the nontransmitted BSSID, when the wireless communication terminal receives the UORA parameter set transmitted by the transmitted BSSID, the wireless communication terminal may initialize the OBO procedure. If the BSS of the wireless communication terminal is included in the multiple BSSID set and the wireless communication terminal is associated with the BSS corresponding to the nontransmitted BSSID, when the wireless communication terminal receives the UORA parameter set transmitted by the transmitted BSSID, the wireless communication terminal may initiate the OBO procedure. In addition, when the BSS of the wireless communication terminal is included in the multiple BSSID set and the wireless communication terminal is associated with the BSS corresponding to the nontransmitted BSSID, the nontransmitted BSSID Profile subelement corresponding to the BSS associated with the wireless communication terminal may not include the UORA parameter set element. In this case, the wireless communication terminal may initiate the OBO procedure. In a specific embodiment, when the wireless communication terminal initiates the OBO procedure, the wireless communication terminal may set the OCW to OCWmin and randomly select the OBO counter within the OCW.

If the transmitter address TA of the trigger frame is the BSSID of the associated BSS, the wireless communication terminal may decrement the OBO counter based on the RU indicated by the trigger frame. Therefore, even when the BSS of the wireless communication terminal is included in the multiple BSSID set, the wireless communication terminal can decrement the OBO counter based on the RU indicated by the trigger frame when the transmitter address TA of the trigger frame is the BSSID of the BSS associated with the wireless communication terminal. Specifically, when the BSS of the wireless communication terminal is included in the multiple BSSID set and the transmitter address of the trigger frame is a transmitted BSSID, the wireless communication terminal associated with the BSS having the nontransmitted BSSID may not decrement it based on the RU indicated by the corresponding trigger frame. In addition, when the BSS of the wireless communication terminal is included in the multiple BSSID set and the transmitter address of the trigger frame is a nontransmitted BSSID, the wireless communication terminal associated with the BSS having the transmitted BSSID may not decrement it based on the RU indicated by the corresponding trigger frame.

In another specific embodiment, when the transmitter address of the trigger frame is a transmitted BSSID, the wireless communication terminal associated with the BSS having a nontransmitted BSSID may allow to decrement the OBO counter based on the trigger frame. However, in this embodiment, the fairness with the wireless communication terminal associated with the BSS having a transmitted BSSID may be a problem. Also, when the receiver address of the trigger frame is the BSSID included in the multiple BSSID set, the wireless communication terminal associated with the BSS included in the multiple BSSID set may allow to decrement the OBO counter based on the trigger frame. In this embodiment, since the wireless communication terminal associated with the BSS corresponding to the transmitted BSSID can decrement the OBO counter based on the trigger frame that can not trigger the wireless communication terminal, the fairness with the random access operation of the wireless communication terminals unassociated with the BSS corresponding to the multiple BSSID set may be a problem. Also, only if the transmitter address of the trigger frame is a transmitted BSSID and the trigger frame triggers the transmission to the wireless communication terminal associated with the nontransmitted BSSID, it may be allowed that the wireless communication terminal associated with the BSSID decrement the OBO counter based on the trigger frame. In order to confirm whether the trigger frame which transmitted address is the transmitted BSSID triggers the transmission to the wireless communication terminal associated with the nontransmitted BSSID, the wireless communication terminal may be required to decode the User Info field. Therefore, this embodiment may increase the complexity of the random access operation of the wireless communication terminal.

The specific operation of the wireless communication terminal relating to the OBO-related parameter setting, the OBO procedure initialization, the OBO counter decrementing operation, and the RU selection for random access will be described in detail with reference to FIG. 12.

Figure 12:
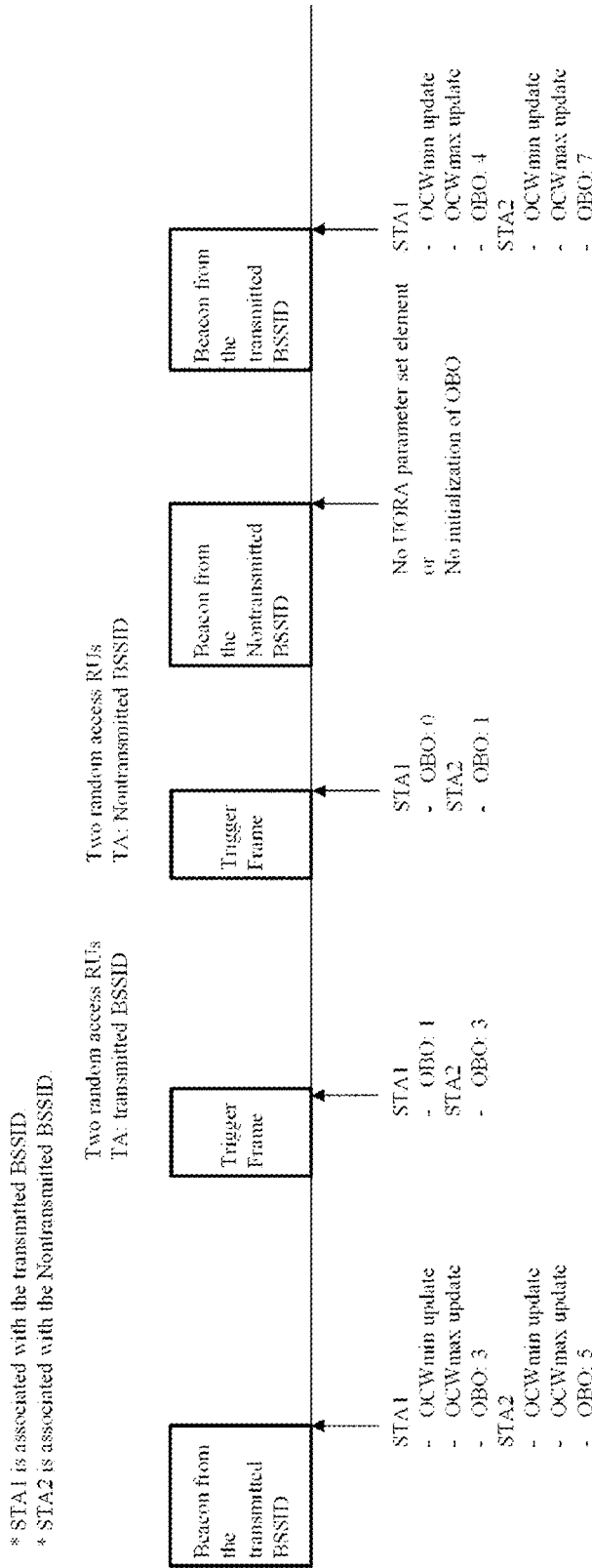
FIGS. 12 to 13 show a random access operation of a wireless communication terminal associated with multiple BSSID sets according to an embodiment of the present invention.
Figure 13:
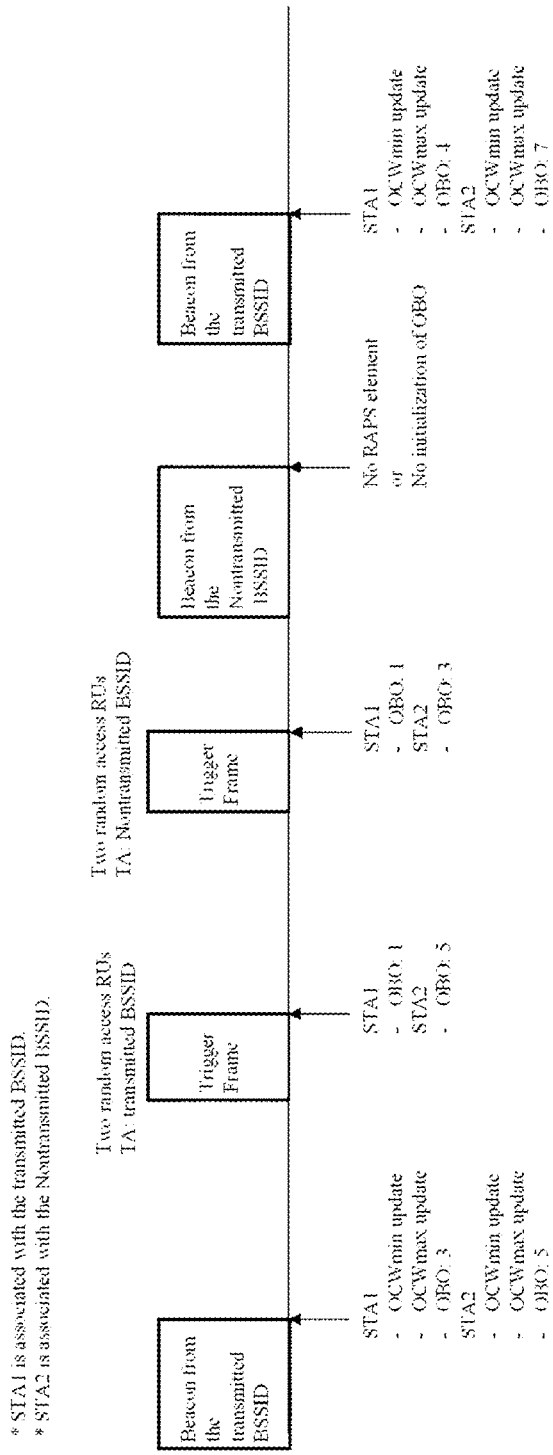

FIGS. 12 to 13 show a random access operation of a wireless communication terminal associated with multiple BSSID sets according to an embodiment of the present invention.

In the embodiment of FIG. 12, the first station STA1 is associated with a BSS corresponding to a transmitted BSSID of a multiple BSSID set. The second station STA2 is associated with a BSS corresponding to the nontransmitted BSSID of the multiple BSSID set. The first station STA1 and the second station STA2 receive the beacon frame transmitted from the transmitted BSSID. In this case, the first station STA1 and the second station STA2 update OCWmin and OCWmax according to the UORA parameter set element included in the beacon frame. In a specific embodiment, since the UORA parameter set of the beacon frame is advertised by the transmitted BSSID and is not included in the nontransmitted BSSID profile sub-element, the second station STA2 may update OCWmin and OCWmax according to the UORA parameter set element.

In addition, since the first station STA1 and the second station STA2 receive information on the OBO-related parameters from the base wireless communication terminal, the first station STA1 and the second station STA2 initialize the OBO procedure. Specifically, the first station STA1 and the second station STA2 randomly select an OBO counter within the OCW. The first station STA1 selects 3, and the second station STA2 selects 5.

The first station STA1 and the second station STA2 receive a trigger frame having a transmitted BSSID as a transmitter address TA. In this case, the trigger frame indicates two RUs allocated for random access. In the embodiment of FIG. 12, it is assumed that a wireless communication terminal associated with a BSS included in a multiple BSSID set can decrement an OBO counter based on a trigger frame having a BSSID included in a multiple BSSID set as a transmitter address. Therefore, the first station STA1 sets the OBO counter to 1 by decrementing the OBO counter by 2 according to the trigger frame, and the second station STA2 associated with the BSS corresponding to the nontransmitted BSSID decrements the OBO counter by 2 according to the trigger frame and sets the OBO counter to 3.

The first station STA1 and the second station STA2 receive a trigger frame having a nontransmitted BSSID as a transmitter address TA. In this case, the trigger frame indicates two RUs allocated for random access. The first station STA1 decrements the OBO counter by 2 according to the trigger frame to set the OBO counter to 0 and randomly selects one of the two RUs indicating that the trigger frame is allocated for random access and attempts to perform transmission. The second station STA2 associated with the BSS corresponding to the nontransmitted BSSID decrements the OBO counter by 2 according to the trigger frame to set the OBO counter to 1.

If the first station STA1 and the second station STA2 receive a beacon frame that does not include a UORA parameter set element, the first station STA1 and the second station STA2 maintain the existing OBO procedure. The first station STA1 and the second station STA2 receive the beacon frame transmitted from the transmitted BSSID. In this case, the beacon frame includes a UORA parameter set element. Accordingly, the first station STA1 and the second station STA2 update OCWmin and OCWmax according to the UORA parameter set element included in the beacon frame and initialize the OBO procedure.

The OBO counter decrementing operation described with reference to FIG. 12 can complicate the random access operation of the wireless communication terminal as described above, and may cause a problem of the fairness with other wireless communication terminals. Therefore, as shown in FIG. 13, even when the BSS of the wireless communication terminal is included in the multiple BSSID set, the wireless communication terminal can decrement the OBO counter based on the RU indicated by the trigger frame when the transmitter address TA of the trigger frame is the BSSID of the BSS associated with the wireless communication terminal.

In the embodiment of FIG. 13, the descriptions on the same operation and situation as those of the embodiment of FIG. 12 will be omitted. The first station STA1 and the second station STA2 receive a trigger frame having a transmitted BSSID as a transmitter address TA. In this case, the trigger frame indicates two RUs allocated for random access. The first station STA1 associated with the BSS corresponding to the transmitted BSSID decrements the OBO counter by 2 according to the trigger frame to set the OBO counter to 1. Since the second station STA2 is associated with the BSS corresponding to the nontransmitted BSSID, the second station STA2 maintains the OBO counter as 5.

In addition, the first station STA1 and the second station STA2 receive a trigger frame having a nontransmitted BSSID as a transmitter address TA. In this case, the trigger frame indicates two RUs allocated for random access. Since the first station STA1 is associated with the BSS corresponding to the transmitted BSSID, the first station STA1 maintains the OBO counter as 1. The second station STA2 associated with the BSS corresponding to the nontransmitted BSSID decrements the OBO counter by 2 to set the OBO counter to 3.

Even if the trigger frame triggers the random access, when the capability of the wireless communication terminal does not support the uplink transmission condition indicated by the trigger frame, even when the OBO counter reaches 0, the wireless communication terminal can not perform random access. For example, when the wireless communication terminal does not support transmission of the frequency bandwidth of the RU which is indicated as an RU allocated for the random access, the corresponding wireless communication terminal can not perform random access to the corresponding RU. Therefore, a random access operation considering the capability of the wireless communication terminal is required.

When the wireless communication terminal receives the trigger frame, the wireless communication terminal can decrement the OBO counter according to the capability of the wireless communication terminal. Specifically, when the wireless communication terminal receives the trigger frame, the wireless communication terminal may decrement the OBO counter based on the RU allocated for the random access and the capability of the wireless communication terminal. In a specific embodiment, the wireless communication terminal may decrement the OBO counter by the number of RUs, through which the wireless communication terminal is capable of transmitting the TB PPDU according to the capability of the wireless communication terminal, among the RUs allocated for the random access. As described above, an RU allocated for random access may be indicated by a trigger frame. In addition, the wireless communication terminal may determine whether the TB PPDU can be transmitted through the RU based on the transmission condition indicated by the trigger frame.

Further, when the OBO counter reaches 0, the wireless communication terminal may select the RU according to the capability of the wireless communication terminal. In a specific embodiment, when the OBO counter reaches 0, the wireless communication terminal may randomly select any one of the RUs, which are allocated for the random access and in which the wireless communication terminal is capable of transmitting the TB PPDU according to the capability of the wireless communication terminal.

When the OBO counter reaches 0, the wireless communication terminal may defer the random access and maintain the OBO counter. Specifically, when data corresponding to the response length indicated by the trigger frame is not buffered in the wireless communication terminal, the wireless communication terminal may defer the random access and maintain the OBO counter as 0. In this case, the wireless communication terminal may perform random access in response to the next trigger frame that triggers the random access. In addition, if there is no RU through which the wireless communication terminal is capable of transmitting the TB PPDU according to the capability of the wireless communication terminal among the RUs allocated for the random access, the wireless communication terminal may maintain the OBO counter as 0. In this case, the wireless communication terminal may perform random access in response to the next trigger frame that triggers the random access.

Also, the capabilities of the wireless communication terminal may include the capability of the wireless communication terminal related to at least one of the bandwidth through which transmission is supported, Modulation & Coding Scheme (MCS), Dual Carrier Modulation (DCM), the number of spatial streams, the length of Guard Interval (GI), the Long Training Field (LTF) type, the space-time block coding (STBC), transmission power, and length of the padding field. The length of the padding field may indicate the length of the padding field included in the TB PPDU. The specific operation of the wireless communication terminal will be described with reference to FIG. 14 to FIG. 21.

FIG. 14 shows types of RUs and subcarrier indexes that may be used when transmitting a PPDU which bandwidth is 20 Mhz according to an embodiment of the present invention. FIG. 15 shows types of RUs and subcarrier indexes that may be used when transmitting a PPDU which bandwidth is 40 Mhz according to an embodiment of the present invention. FIG. 16 shows types of RUs and subcarrier indexes that may be used when transmitting a PPDU which bandwidth is 80 Mhz bandwidth according to an embodiment of the present invention.

As described above, the RU may indicate that a plurality of subcarriers that may be useable for uplink and downlink transmission are grouped according to the size of the frequency band.

The wireless communication terminal according to an embodiment of the present invention can perform uplink transmission or downlink transmission using at least one of an RU (26-tone RU) using 26 subcarriers, an RU (52-tone RU) using 52 subcarriers, an RU (106-tone RU) using 106 subcarriers, an RU (242-tone RU) using 242 subcarriers, an RU (484-tone RU) using 484 subcarriers, an RU (996-tone RU) using 996 subcarriers, and an RU (2*996-tone RU) using 1992 subcarriers. Specifically, the wireless communication terminal can transmit the HE MU PPDU or the HE trigger-based PPDU through the OFDMA using the designated RU. In this case, when the frequency bandwidth of the PPDU is any one of 20 Mhz, 40 Mhz, 80 Mhz, 160 MHz, and 80+80 Mhz, the wireless communication terminal can transmit the PPDU using any one of the 26-tone RU, the 52-tone RU, the 106-tone RU, and the 242-tone RU. In addition, when the frequency bandwidth of the PPDU is any one of 40 Mhz, 80 Mhz, 160 MHz, and 80+80 Mhz, the wireless communication terminal can transmit the PPDU using the 484-tone RU. In addition, when the frequency bandwidth of the PPDU is any one of 80 Mhz, 160 MHz, and 80+80 Mhz, the wireless communication terminal can use the 996-tone RU. In addition, when the frequency bandwidth of the PPDU is any one of 160 MHz and 80+80 MHz, the wireless communication terminal can transmit the PPDU using the 2*996-tone RU.

Also, the wireless communication terminal can transmit the HE Single User (SU) PPDU using the designated RU. In this case, if the frequency bandwidth of the HE SU PPDU is 20 Mhz, the wireless communication terminal can transmit the HE SU PPDU using the 242-tone RU. Also, if the frequency bandwidth of the HE SU PPDU is 40 Mhz, the wireless communication terminal can transmit the HE SU PPDU using the 484-tone RU. Also, if the frequency bandwidth of the HE SU PPDU is 80 Mhz, the wireless communication terminal can transmit the HE SU PPDU using the 996-tone RU. Also, if the frequency bandwidth of the HE SU PPDU is 160 MHz or 80+80 Mhz, the wireless communication terminal can transmit the HE SU PPDU using the 2*996-tone RU.

The 26-tone RU may include 24 subcarriers for transmitting data and 2 subcarriers for transmitting pilot signals. The specific position of the 26-tone RU may be the same as those as shown in FIGS. 14, 15, and 16. When the frequency bandwidth of the PPDU transmitted by the wireless communication terminal is a 160 MHz or 80+80 Mhz PPDU, the 26-tone RU transmitted through each 80 Mhz frequency band may be the same as that shown in FIG. 15. The 52-tone RU may include 48 subcarriers for transmitting data and 4 subcarriers for transmitting pilot signals. The specific position of the 52-tone RU may be the same as those shown in FIGS. 14, 15, and 16. When the frequency bandwidth of the PPDU transmitted by the wireless communication terminal is a 160 MHz or 80+80 Mhz PPDU, the 52-tone RU transmitted through each 80 Mhz frequency band may be the same as that shown in FIG. 15.

The 106-tone RU may include 102 subcarriers for transmitting data and 4 subcarriers for transmitting pilot signals. The specific position of the 106-tone RU may be the same as those shown in FIGS. 14, 15, and 16. When the frequency bandwidth of the PPDU transmitted by the wireless communication terminal uses a 160 MHz or 80+80 Mhz PPDU, the 106-tone RU transmitted through each 80 Mhz frequency band may be the same as that shown in FIG. 15. The 242-tone RU may include 234 subcarriers for transmitting data and 8 subcarriers for transmitting pilot signals. The specific position of the 242-tone RU may be the same as those shown in FIGS. 14, 15, and 16. When the frequency bandwidth of the PPDU transmitted by the wireless communication terminal is a 160 MHz or 80+80 Mhz PPDU, the 242-tone RU transmitted through each 80 Mhz frequency band may be the same as that shown in FIG. 15.

The 484-tone RU may include 468 subcarriers for transmitting data and 16 subcarriers for transmitting pilot signals. The specific position of the 484-tone RU may be the same as those shown in FIGS. 15 and 16. When the frequency bandwidth of the PPDU transmitted by the wireless communication terminal is a 160 MHz or 80+80 Mhz PPDU, the 484-tone RU transmitted through each 80 Mhz frequency band may be the same as that shown in FIG. 15. The 996-tone RU may include 980 subcarriers for transmitting data and 16 subcarriers for transmitting pilot signals. The specific position of the 996-tone RU may be the same as that shown in FIG. 15. When the frequency bandwidth of the PPDU transmitted by the wireless communication terminal is a 160 MHz or 80+80 Mhz PPDU, the 996-tone RU transmitted through each 80 Mhz frequency band may be the same as that shown in FIG. 15. When a wireless communication terminal transmits a PPDU having a bandwidth of 160 MHz or 80+80 Mhz, the subcarriers included in the 996-tone RU are located at [−1012: −515, −509: −12] and [12: 509, 515: 1012]. In this case, [x: y] represents the subcarrier indices x to y. Therefore, even when using the 2*996-tone RU, the wireless communication terminal uses the subcarriers located in the subcarrier indexes of [−1012: −515, −509: −12] and [12: 509, 515: 1012].

If the wireless communication terminal transmits an HE MU PPDU or HE trigger-based PPDU having a frequency bandwidth of 20 Mhz and the PPDU includes two or more RUs, the wireless communication terminal may transmit seven Direct Current (DC) subcarriers at [−3: 3]. When a wireless communication terminal transmits a HE SU PPDU having a frequency bandwidth of 20 Mhz using a 242-tone RU, the wireless communication terminal may transmit three DC subcarriers at [−1: 1]. When a wireless communication terminal transmits a HE SU PPDU having a frequency bandwidth of 40 MHz using a 484-tone RU, the wireless communication terminal may transmit five DC subcarriers at [−2: 2]. If the wireless communication terminal transmits an HE MU PPDU or HE trigger-based PPDU having a frequency bandwidth of 80 Mhz and the PPDU includes two or more RUs, the wireless communication terminal may transmit seven DC subcarriers at [−3: 3]. When a wireless communication terminal transmits a HE SU PPDU having a frequency bandwidth of 80 Mhz using a 996-tone RU, the wireless communication terminal may transmit five DC subcarriers at [−2: 2]. When a wireless communication terminal transmits a PPDU having a bandwidth of 160 MHz or 80+80 MHz, the wireless communication terminal may transmit the DC subcarrier to the same position as that in the case of transmitting the HE SU PPDU having the frequency bandwidth of 80 Mhz in each 80 Mhz band using the 996-tone RU.

When a wireless communication terminal transmits a PPDU having a 20 Mhz frequency bandwidth, the wireless communication terminal may transmit eleven guard subcarriers to [−128: −123] and [123: 127]. When a wireless communication terminal transmits a PPDU having a 40 Mhz frequency bandwidth, the wireless communication terminal may transmit 23 guard subcarriers to [−256: −245] and [245: 255]. When a wireless communication terminal transmits a PPDU having an 80 Mhz frequency bandwidth, the wireless communication terminal can transmit 23 guard subcarriers to [−512: −501] and [501: 511]. When a wireless communication terminal transmits a PPDU having a 160 MHz or 80+80 Mhz frequency bandwidth, the wireless communication terminal may transmit the guard subcarriers used in transmitting the PPDU having the 80 Mhz frequency bandwidth to both ends.

FIG. 17 shows an encoding value used for indicating an RU in an RU Allocation subfield of a trigger frame according to an embodiment of the present invention.

The RU Allocation subfield indicates the RU to be used for transmission by the wireless communication terminal triggered by the trigger frame. The RU Allocation subfield may be an 8-bit field. In this case, one bit of the RU Allocation subfield, for example, B12, may indicate whether the RU indicated by the RU Allocation subfield is in a primary 80 Mhz channel or a non-primary 80 Mhz channel. The primary channel represents the frequency band that is the basis of the frequency band extension. Also, the primary channel may refer to a contiguous frequency band that includes a frequency band having a 20 Mhz frequency bandwidth, which is the basis of frequency band extension. Also, when the RU has a frequency bandwidth of 80 Mhz or less, 7 bits of the RU Allocation subfield, e.g., B19-B13, indicate which RU is indicated in 80 Mhz. Also, when the RU has a frequency bandwidth equal to or wider than 80 Mhz, the 7 bits of the RU Allocation subfield, e.g., B19-B13, indicate which RU is indicated in a frequency bandwidth equal to or wider than 80 Mhz. The specific value of the RU Allocation field may be the same as that in FIG. 17.

Specifically, in the case of a PPDU having a frequency bandwidth of 20 Mhz, 40 MHz or 80 Mhz, B12 may be set to 0. In addition, in the case of the 2*996-tone RU, B12 may be set to 1. Moreover, B19-B13 may also be set as follows.

When the wireless communication terminal transmits a PPDU having a frequency bandwidth of 20 Mhz, the wireless communication terminal may designate the RU index of FIG. 14 in B19-B13 according to ascending order. When the value of B19-B13 is 0000000, the RU Allocation subfield may indicate the 26-tone RU 1. When the value of B19-B13 is 0001000, the RU Allocation subfield may indicate the 26-tone RU 9. The value of B19-B13 may not use 0001001 to 0100100. When the value of B19-B13 is 0100101, the RU Allocation subfield may indicate the 52-tone RU 1. When the value of B19-B13 is 0101000, the RU Allocation subfield may indicate the 52-tone RU 4. The value of B19-B13 may not use 0101001 to 0110100. When the value of B19-B13 is 0110101, the RU Allocation subfield may indicate the 106-tone RU 1. When the value of B19-B13 is 0110110, the RU Allocation subfield may indicate the 106-tone RU 2. The value of B19-B13 may not use 0110111 to 0111100. When the value of B19-B13 is 0111101, the RU Allocation subfield may indicate the 242-tone RU 1. The value of B19-B13 may not use 0111110 to 1000000.

When the wireless communication terminal transmits a PPDU having a frequency bandwidth of 40 Mhz, the wireless communication terminal may designate the RU index of FIG. 15 in B19-B13 according to ascending order. When the value of B19-B13 is 0000000, the RU Allocation subfield may indicate 26-tone RU 1. When the value of B19-B13 is 0010001, the RU Allocation subfield may indicate the 26-tone RU 18. The value of B19-B13 may not use 0010010 to 0100100. When the value of B19-B13 is 0100101, the RU Allocation subfield may indicate the 52-tone RU 1. When the value of B19-B13 is 0101100, the RU Allocation subfield may indicate the 52-tone RU 8. The value of B19-B13 may not use 0101101 to 0110100. The value of B19-B13 may be designated for the 106-tone, 242-tone and 484-tone RUs according to the rules such as the 26-tone RU and the 52-tone RU.

When the wireless communication terminal transmits a PPDU having a frequency bandwidth of 80 Mhz, 160 MHz, and 80+80 Mhz, the wireless communication terminal may designate the RU index of FIG. 12 in B19-B13 according to ascending order. When the value of B19-B13 is 0000000, the RU Allocation subfield may indicate the 26-tone RU 1. When the value of B19-B13 is 0100100, the RU Allocation subfield may indicate the 26-tone RU 37. When the value of B19-B13 is 0100101, the RU Allocation subfield may indicate the 52-tone RU 1. If the value of B19-B13 is 0110100, the value of the RU Allocation subfield may indicate the 52-tone RU 16. The value of B19-B13 may be designated for the 106-tone, 242-tone, 484-tone, and 996-tone RUs according to the rules such as the 26-tone RU and the 52-tone RU. When the wireless communication terminal transmits a 160 MHz or 80+80 Mhz PPDU and the value of B19-B13 is 1000100, the RU Allocation subfield may indicate a 2*996-tone RU.

The wireless communication terminal can support transmission and reception of PPDUs which frequency bandwidth is equal to or narrower than a certain size. For example, the wireless communication terminal may only support transmission and reception of PPDUs which bandwidth is 20 Mhz. In addition, the wireless communication terminal may support transmission and reception of PPDUs which frequency bandwidth is 80 MHz or less. In such a way, when the wireless communication terminal only supports transmission and reception of PPDUs which frequency bandwidth is equal to or narrower than a certain size, the wireless communication terminal may decrement the OBO counter based on the number of RUs included in the frequency bandwidth which is equal to or narrower than a certain size among the RUs allocated for the random access. In this case, the RU allocated for the random access may be indicated by the trigger frame. Further, the wireless communication terminal decrements the OBO counter when receiving the trigger frame. Specifically, when the wireless communication terminal only supports transmission and reception of PPDUs which frequency bandwidth is equal to or narrower than a certain size, the wireless communication terminal may decrement the OBO counter based on the number of RUs included in the primary channel which frequency bandwidth is equal to or narrower than a certain size among the RUs allocated for the random access. The wireless communication terminal may not support the non-primary channel because it is difficult to switch the channel within a certain time. In this case, the non-primary channel may refer to a channel other than the primary channel. For example, when the wireless communication terminal only supports transmission and reception of PPDUs which frequency bandwidth is equal to or narrower than 20 Mhz, the wireless communication terminal may decrement the OBO counter based on the number of RUs in which the B19-B13 value of the RU Allocation subfield is 0000000 to 0001000 or 0100101 to 0101000 or 0110101 to 0110110 or 0111101 among the RUs allocated for random access. In another specific embodiment, when the wireless communication terminal only supports transmission and reception of PPDUs having a frequency bandwidth which is equal to or narrower than a certain size, the wireless communication terminal may decrement the OBO counter based on the number of RUs included in the frequency bandwidth which is equal to or narrower than a certain size among the RUs allocated for the random access irrespective of whether the RU is included in the primary channel. For example, when the wireless communication terminal only supports PPDU transmission and reception with a frequency bandwidth equal to or narrower than 20 Mhz or less, the wireless communication terminal may decrement the OBO counter based on the number of RUs in which the B19-B13 value of the RU Allocation subfield is less than or equal to 1000000 among the RUs allocated for random access.

In addition, when the OBO counter reaches 0 and the wireless communication terminal only supports transmission and reception of PPDUs which frequency bandwidth is equal to or narrower than a certain size, the wireless communication terminal may randomly select any one of the RUs allocated for the random access and included in the frequency bandwidth which is equal to or narrower than a certain size. In this case, the wireless communication terminal may attempt transmission through the selected RU. The RU allocated for the random access may be indicated by the trigger frame as described above. When there is no frequency bandwidth equal to or narrower than a certain size among the RUs allocated for the random access, the wireless communication terminal may maintain the OBO counter without attempting transmission. In this case, the wireless communication terminal may attempt random access in response to the next trigger frame transmitted. In this embodiment, when the wireless communication terminal decrements the OBO counter, the wireless communication terminal may not consider the capability of the wireless communication terminal. Specifically, when the wireless communication terminal decrement the OBO counter regardless of whether the RU is included in a frequency bandwidth of a certain size or less, the wireless communication terminal may randomly select any one of the RUs allocated for the random access and included in the frequency bandwidth of a certain size or less when the OBO counter reaches 0.

Also, in a specific embodiment, the wireless communication terminal may randomly select any one of the RUs allocated for the random access and the RUs included in the primary channel which bandwidth is equal to or narrower than a certain size. The wireless communication terminal may not support the non-primary channel because it is difficult to switch the channel within a certain time. For example, when the wireless communication terminal only supports transmission and reception of PPDUs which frequency bandwidth is equal to or narrower than 20 Mhz, the wireless communication terminal can arbitrarily select any one of the RUs allocated for the random access and the RUs in which the B19-B13 value of the RU Allocation subfield corresponding to the corresponding RU is 0000000 to 0001000 or 0100101 to 0101000 or 0110101 to 0110110 or 0111101. In another specific embodiment, when the wireless communication terminal only supports transmission and reception of PPDUs which frequency bandwidth is equal to or narrower than a certain size, the wireless communication terminal may randomly select any one of the RUs allocated for the random access irrespective of whether the RU is included in the primary channel and included in the frequency bandwidth of a certain size or less. For example, when the wireless communication terminal only supports PPDU transmission and reception with a frequency bandwidth equal to or narrower than 20 Mhz, the wireless communication terminal can arbitrarily select any one of the RUs allocated for the random access, in which the B19-B13 value of the RU Allocation subfield corresponding to the corresponding RU is 1000000 or less.

Figure 18:
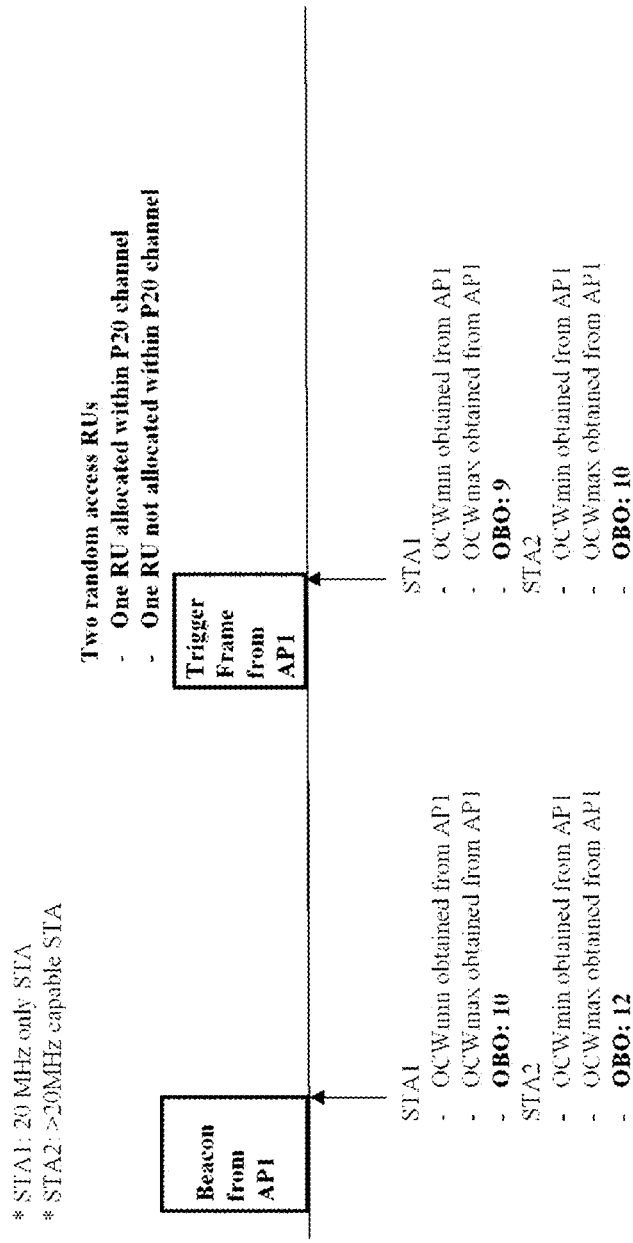
FIGS. 18 to 19 show operations in which a wireless communication terminal supporting only a PPDU having a bandwidth of 20 Mhz performs random access according to an embodiment of the present invention.
Figure 19:
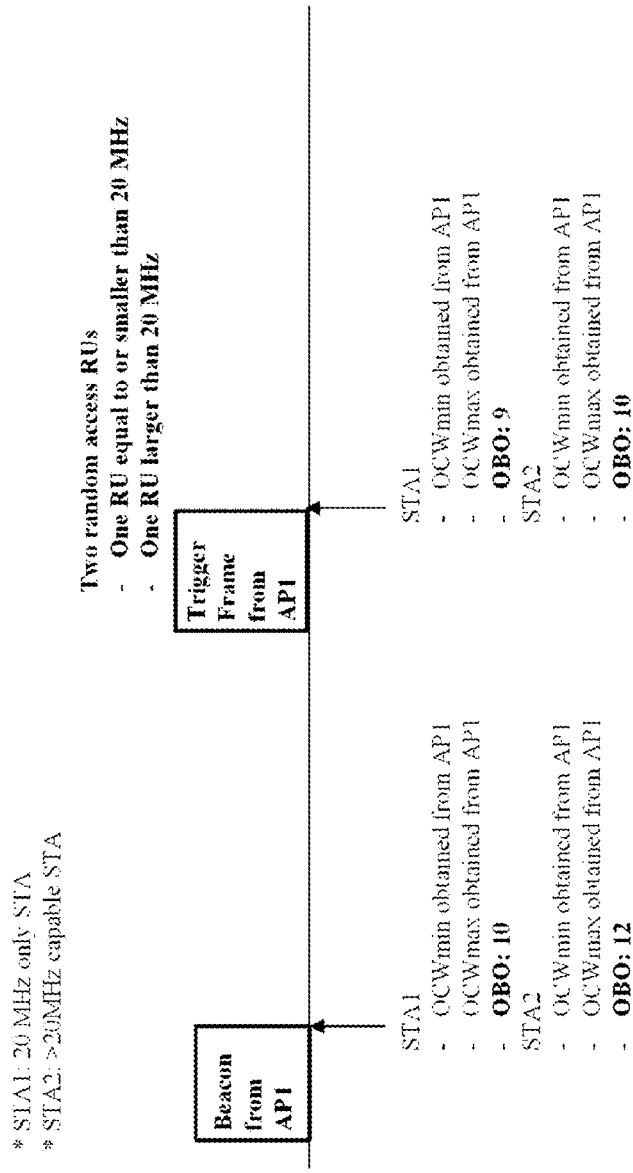

FIGS. 18 to 19 show operations in which a wireless communication terminal supporting only a PPDU which bandwidth is 20 Mhz performs random access according to an embodiment of the present invention.

Figure 20:
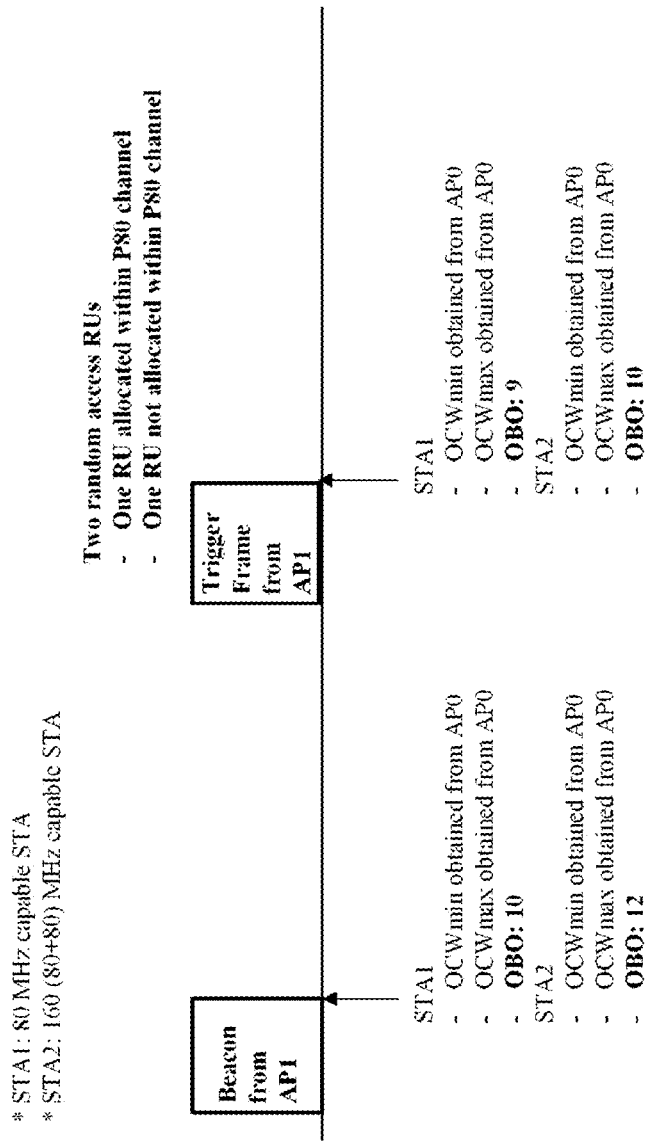
FIGS. 20 to 21 show operations in which a wireless communication terminal supporting only a PPDU having a bandwidth of 80 Mhz or less performs random access according to an embodiment of the present invention.

In the embodiments of FIGS. 18 to 21, the wireless communication terminal decrement the OBO counter based on the frequency bandwidth that the wireless communication terminal supports. In the embodiment of FIGS. 18 and 20, when the RU allocated for the random access is included in the primary channel which frequency bandwidth is equal to or narrower than a certain size, the wireless communication terminal decrements the OBO counter based on the corresponding RU.

In the embodiment of FIG. 18, the first station STA1 only supports a frequency band equal to or narrower than 20 Mhz. The second station STA2 supports a frequency band equal to or wider than 20 Mhz. The first station STA1 and the second station STA2 receive a beacon frame from the first AP AP1. The first station STA1 and the second station STA2 obtain the UORA parameter set element from the beacon frame and initialize the OBO procedure. Specifically, the first station STA1 sets OCWmin and OCWmax according to the UORA parameter set element, and initializes the OCW. The first station STA1 randomly selects 10 in the OCW and sets the OBO counter to 10. In addition, the second station STA2 sets OCWmin and OCWmax according to the UORA parameter set element, and initializes the OCW. The second station STA2 arbitrarily selects 12 in the OCW and sets the OBO counter to 12.

The first station STA1 and the second station STA2 receive a trigger frame from the first AP AP1. In this case, the trigger frame indicates two RUs with RUs allocated for random access. One RU is included in the primary channel with a 20 Mhz frequency bandwidth and the other RU is not included in the primary channel with a 20 Mhz frequency bandwidth. Since the first station STA1 only supports a frequency bandwidth equal to or narrower than 20 Mhz, the first station STA1 decrements the OBO counter by 1 and sets the OBO counter to 9. Since the second station STA2 also supports a frequency bandwidth equal to or wider than 20 Mhz, the second station STA2 decrements the OBO counter by 2 and sets the OBO counter to 10.

In the embodiment of FIG. 19, the first station STA1 supports only a frequency band equal to or narrower than 20 MHz, and the second station STA2 supports a frequency band equal to or wider than 20 Mhz, as in the embodiment of FIG. 18. Description of operations of the first station STA1 and the second station STA2, which are the same as those in the embodiment of FIG. 18, will be omitted.

The first station STA1 and the second station STA2 receive a trigger frame from the first AP AP1. In this case, the trigger frame indicates two RUs with RUs allocated for random access. One RU has a frequency bandwidth equal to or narrower than 20 Mhz, and the other RU has a frequency bandwidth wider than 20 Mhz. Since the first station STA1 only supports a frequency bandwidth equal to or narrower than 20 Mhz, the first station STA1 decrements the OBO counter by 1 and sets the OBO counter to 9. Since the second station STA2 also supports a frequency bandwidth equal to or wider than 20 Mhz, the second station STA2 decrements the OBO counter by 2 and sets the OBO counter to 10.

Figure 21:
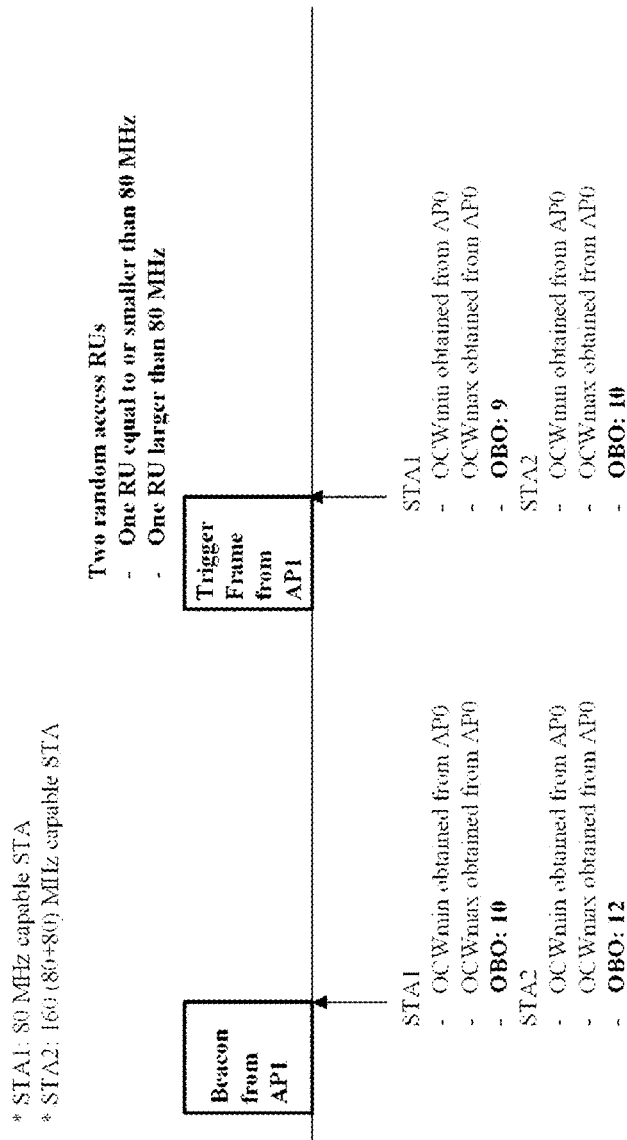

FIGS. 20 to 21 show operations in which a wireless communication terminal supporting only a PPDU which bandwidth is equal to or narrower than 80 Mhz performs random access according to an embodiment of the present invention.

In the embodiment of FIG. 20, the first station STA1 supports only a frequency band equal to or narrower than 80 Mhz, and the second station STA2 supports a frequency band (160 MHz, 80+80 Mhz) equal to or wider than 80 Mhz. Description of operations of the first station STA1 and the second station STA2, which are the same as those in the embodiment of FIGS. 18 to 19, will be omitted.

The first station STA1 and the second station STA2 receive a trigger frame from the first AP AP1. In this case, the trigger frame indicates two RUs with RUs allocated for random access. One RU is included in the primary channel with an 80 Mhz frequency bandwidth and the other RU is not included in the primary channel with an 80 Mhz frequency bandwidth. Since the first station STA1 only supports a frequency bandwidth equal to or narrower than 80 Mhz, the first station STA1 decrements the OBO counter by 1 and sets the OBO counter to 9. Since the second station STA2 also supports a frequency bandwidth equal to or wider than 80 Mhz, the second station STA2 decrements the OBO counter by 2 and sets the OBO counter to 10.

In the embodiment of FIG. 21, the first station STA1 supports only a frequency band of 80 Mhz or less, and the second station STA2 supports a frequency band (160 MHz, 80+80 Mhz) equal to or wider than 80 Mhz as in the embodiment of FIG. 20. Description of operations of the first station STA1 and the second station STA2, which are the same as those in the embodiment of FIGS. 18 to 20, will be omitted.

The first station STA1 and the second station STA2 receive a trigger frame from the first AP AP1. In this case, the trigger frame indicates two RUs with RUs allocated for random access. One RU has a frequency bandwidth equal to or narrower than 80 Mhz, and the other RU has a frequency bandwidth wider than 80 Mhz. Since the first station STA1 only supports a frequency bandwidth equal to or narrower than 80 Mhz, the first station STA1 decrements the OBO counter by 1 and sets the OBO counter to 9. Since the second station STA2 also supports a frequency bandwidth equal to or wider than 20 Mhz, the second station STA2 decrements the OBO counter by 2 and sets the OBO counter to 10.

In the above-described random access operation of the wireless communication terminal, the wireless communication terminal receives the information on the OBO-related parameters from the base wireless communication terminal associated with the wireless communication terminal and sets the OBO-related parameters according to the received information. Specifically, the UORA parameter set element is received from the base wireless communication terminal associated with the wireless communication terminal and the OBO-related parameter is set based on the UORA parameter set element. A wireless communication terminal unassociated with a base wireless communication terminal can perform random access based on a trigger frame transmitted by the base wireless communication terminal. In such a case, a method of setting the OBO-related parameters and a method of initializing an OBO procedure by an unassociated wireless communication terminal become problematic. This will be described in detail with reference to FIGS. 22 to 25. If there is no additional description in this specification, an unassociated wireless communication terminal may represent a wireless communication terminal unassociated with any base wireless communication terminal.

Figure 22:
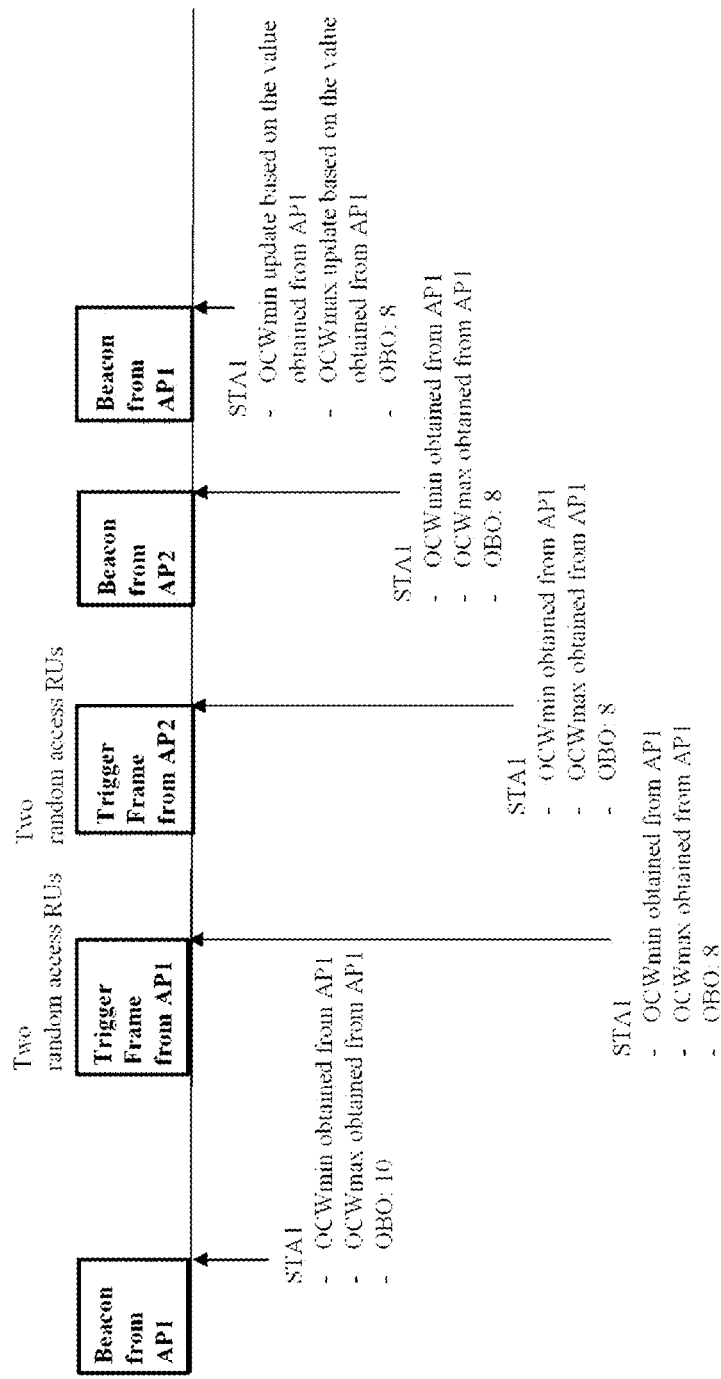
FIG. 22 shows the random access operation of an unassociated wireless communication terminal according to an embodiment of the present invention.

FIG. 22 shows the random access operation of an unassociated wireless communication terminal according to an embodiment of the present invention.

When the wireless communication terminal receives the trigger frame triggering the random access of the wireless communication terminal from the base wireless communication terminal unassociated with the wireless communication terminal, the wireless communication terminal may start the OBO procedure based on the information on the OBO-related parameters transmitted by the corresponding base wireless communication terminal. Specifically, the wireless communication terminal may receive the UORA parameter set element from the wireless communication terminal unassociated with the base wireless communication terminal. In this case, when the wireless communication terminal receives the trigger frame triggering the random access of the wireless communication terminal from the corresponding base wireless communication terminal, the wireless communication terminal may set the OCWmin and OCWmax according to the UORA parameter set element and start the OBO procedure.

When a wireless communication terminal receives a trigger frame triggering a random access of a wireless communication terminal from a wireless communication terminal different from the base wireless communication terminal transmitting the UORA parameter set element, the wireless communication terminal may not perform the OBO-related procedure according to the received UORA parameter set element. Specifically, when a wireless communication terminal receives a trigger frame triggering a random access of a wireless communication terminal from a wireless communication terminal different from the base wireless communication terminal transmitting the UORA parameter set element, the wireless communication terminal may not decrement the OBO counter based on the trigger frame. For this, the wireless communication terminal may compare the identifier of the base wireless communication terminal transmitting the UORA parameter set element with the identifier of the base wireless communication terminal transmitting the trigger frame. In this case, the identifier of the base wireless communication terminal may be a MAC address or a BSSID. In the above-described embodiments, the trigger frame for triggering the random access may be a trigger frame for triggering the random access of the unassociated wireless communication terminal.

In addition, when a wireless communication terminal receives a new UORA parameter set element from a wireless communication terminal different from a base wireless communication terminal transmitting a UORA parameter set element, the wireless communication terminal may not initialize the OBO procedure based on the newly received UORA parameter set element. In this case, the initialization of the OBO procedure includes at least one of OBO counter initialization and OCW initialization. In addition, when a wireless communication terminal receives a new UORA parameter set element from a wireless communication terminal different from a base wireless communication terminal transmitting a UORA parameter set element, the wireless communication terminal may not set the OBO-related parameter based on the newly received UORA parameter set element. In this case, setting of the OBO-related parameter may include at least one of OCWmin setting and OCWmax setting. For this, the wireless communication terminal may compare the identifier of the base wireless communication terminal transmitting the UORA parameter set element with the identifier of the base wireless communication terminal transmitting a new UORA parameter set element. In this case, the identifier of the base wireless communication terminal may be a MAC address or a BSSID. Through this embodiment, it is possible to prevent the unassociated wireless communication terminal from initiating the OBO procedure continuously or performing random access while damaging the fairness with the other wireless communication terminals.

In the embodiment of FIG. 22, the first station STA1 is a wireless communication terminal unassociated with any base wireless communication terminal. The first station STA1 receives the beacon frame from the first AP AP1 and obtains the UORA parameter set element from the received beacon frame. The first station STA1 sets an OBO-related parameter according to the obtained UORA parameter set element, and initializes the OBO procedure. Specifically, the first station STA1 sets OCWmin and OCWmax according to the obtained UORA parameter set element, and selects an arbitrary integer in the OCW. In this case, the arbitrarily selected integer is 10, and the first station STA1 sets the OBO counter to 10.

The first station STA1 receives a trigger frame indicating two RUs allocated for random access from the first AP AP1. In this case, the first station STA1 decrements the OBO counter by 2 and sets the OBO counter to 8.

The first station STA1 receives a trigger frame indicating two RUs allocated for random access from the second AP AP2. Since the first AP AP1 and the second AP AP2 transmitting the UORA parameter set element used to set the OBO-related parameters have different identifiers, the first station STA1 maintains the OBO counter as it is.

The first station STA1 receives a beacon frame from the second AP AP2, and the received beacon frame includes a UORA parameter set element. Since the first AP AP1 and the second AP AP2 transmitting the UORA parameter set element used to set the OBO-related parameters have different identifiers, the first station STA1 does not update the OBO-related parameters.

The first station STA1 receives the beacon frame from the first AP AP1 and obtains the UORA parameter set element from the received beacon frame. Since the first station STA1 receives the UORA parameter set element again from the first AP AP1 transmitting the UORA parameter set element used for setting the OBO related parameter, the first station STA1 updates the OBO-related parameter according to the newly received UORA parameter set element.

According to the embodiment described with reference to FIG. 22, the unassociated wireless communication terminal may not participate in the random access triggered by the base wireless communication terminal other than the base wireless communication terminal that received the first UORA parameter set element. Therefore, a method for solving this is needed.

Figure 23:
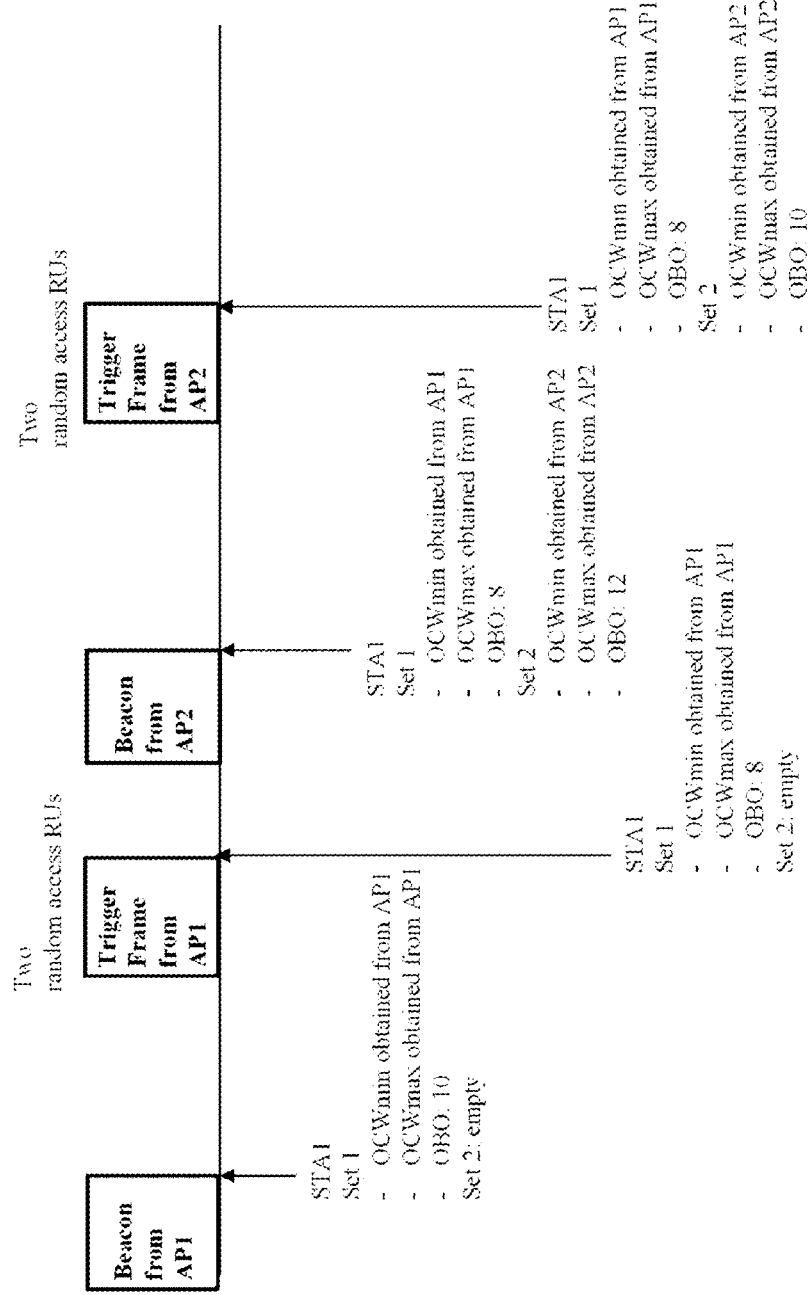
FIG. 23 shows the random access operation of an unassociated wireless communication terminal according to an embodiment of the present invention.

FIG. 23 shows the random access operation of an associated wireless communication terminal according to an embodiment of the present invention.

When the unassociated wireless communication terminal performs the OBO procedure for the first base wireless communication terminal and performs the OBO procedure for the second base wireless communication terminal, the unassociated wireless communication terminal may initiate the OBO procedure. Specifically, the unassociated wireless communication terminal may maintain the OBO-related parameters and the OBO procedure for each base wireless communication terminal. In a specific embodiment, the unassociated wireless communication terminal may set an OBO-related parameter for each base wireless communication terminal. Specifically, the unassociated wireless communication terminal may set the OBO-related parameters for each base wireless communication terminal based on the information on the OBO-related parameters received from each base wireless communication terminal. In a specific embodiment, when the wireless communication terminal receives the UORA parameter set element from any one of the base wireless communication terminals, the wireless communication terminal may update the OBO-related parameters for the corresponding UORA parameter set element. In this case, the OBO-related parameter may be at least one of OCWmin and OCWmax.

Also, the unassociated wireless communication terminal may initialize the OBO procedure for each base wireless communication terminal. Specifically, the unassociated wireless communication terminal may maintain the OBO counter for each base wireless communication terminal. In a specific embodiment, when an unassociated wireless communication terminal receives a trigger frame triggering a random access from any one base wireless communication terminal, the unassociated wireless communication terminal can decrement the OBO counter for the base wireless communication terminal based on the number of RUs for random access indicated by the corresponding trigger frame.

In the embodiment of FIG. 23, the first station STA1 is a wireless communication terminal unassociated with any base wireless communication terminal. The first station STA1 receives the beacon frame from the first AP AP1 and obtains the UORA parameter set element from the received beacon frame. The first station STA1 sets an OBO-related parameter Set 1 for the first AP AP1 according to the obtained UORA parameter set element, and initializes the OBO procedure. Specifically, the first station STA1 sets OCWmin and OCWmax for the first AP AP1 according to the obtained UORA parameter set element, and selects a random integer in the OCW for the first AP AP1. In this case, the randomly selected integer is 10, and the first station STA1 sets the OBO counter for the first AP AP1 to 10.

The first station STA1 receives a trigger frame indicating two RUs allocated for random access from the first AP AP1. In this case, the first station STA1 decrements the OBO counter for the first AP AP1 by 2 and sets the OBO counter for the first AP AP1 to 8.

The first station STA1 receives the beacon frame from the second AP AP2 and obtains the UORA parameter set element from the received beacon frame. Since the first AP AP1 and the second AP AP2 transmitting the UORA parameter set element used to set the OBO-related parameters have different identifiers, the first station STA1 sets the OBO-related parameter Set 2 for the second AP AP2 according to the obtained UORA parameter set element and initializes the OBO procedure for the second AP AP2. Specifically, the first station STA1 sets OCWmin and OCWmax for the second AP AP2 according to the obtained UORA parameter set element, and selects a random integer in the OCW for the second AP AP2. In this case, the randomly selected integer is 12, and the first station STA1 sets the OBO counter for the second AP AP2 to 12. In this case, the first station STA1 does not update the OBO-related parameters for the first AP AP1 and does not initialize the OBO procedure.

The first station STA1 receives a trigger frame indicating two RUs allocated for random access from the second AP AP2. In this case, the first station STA1 decrements the OBO counter for the second AP AP2 by 2 and sets the OBO counter for the second AP AP2 to 10. In this case, the first station STA1 maintains the OBO counter for the first AP AP1 as 8 as it is.

According to the embodiment of FIGS. 22 to 23, when the wireless communication terminal does not receive information on the OBO-related parameters from the base wireless communication terminal, the wireless communication terminal can not participate in the random access. Therefore, operations of the wireless communication terminal are necessary to solve such a problem.

Figure 24:
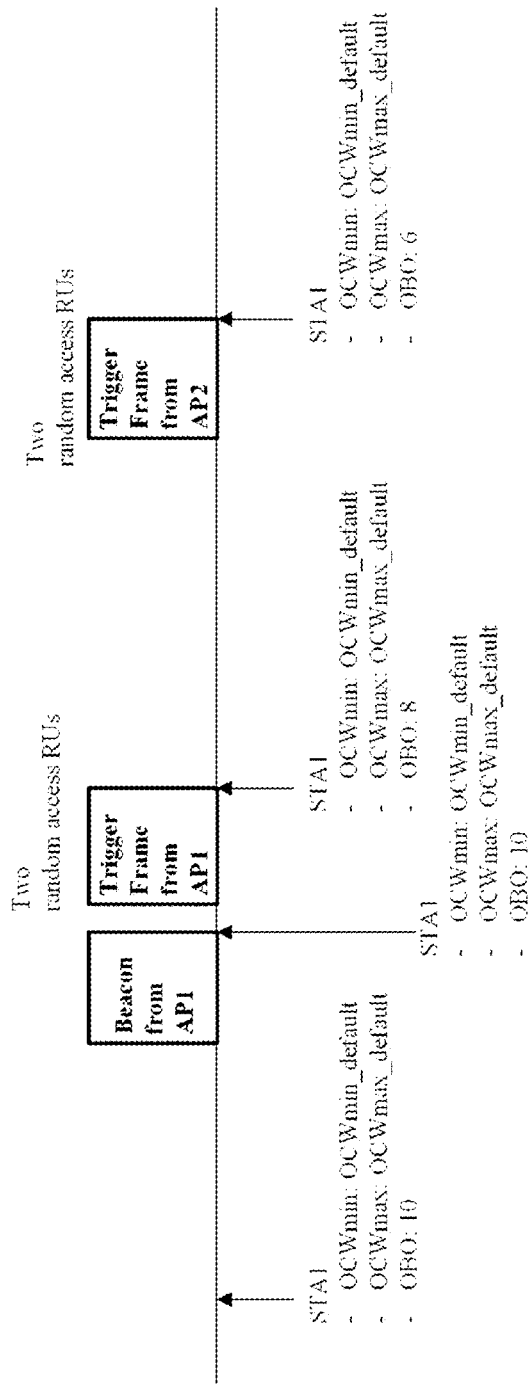
FIG. 24 shows the random access operation of an unassociated wireless communication terminal according to an embodiment of the present invention.

FIG. 24 shows the random access operation of an associated wireless communication terminal according to an embodiment of the present invention.

The unassociated wireless communication terminal may perform random access using default values predefined for each OBO-related parameter. Specifically, the unassociated wireless communication terminal may set a predetermined value as a default value of OCWmin in OCWmin. Further, the unassociated wireless communication terminal may set a predetermined value as a default value of OCWmax in OCWmax. In this case, the value predetermined as the default value of OCWmin may not be a value designated by the base wireless communication terminal. In addition, the value predetermined as the default value of OCWmax may not be a value designated by the base wireless communication terminal. Specifically, when the unassociated wireless communication terminal does not receive information on the OBO-related parameters from the base wireless communication terminal, the unassociated wireless communication terminal may use a predetermined default value for each OBO-related parameter. In this case, when the unassociated wireless communication terminal receives information on the OBO-related parameters from the base wireless communication terminal, the unassociated wireless communication terminal may set the OBO-related parameters according to the information on the OBO-related parameters.

In a specific embodiment, when an unassociated wireless communication terminal uses a predetermined default value for each OBO-related parameter, even if the unassociated wireless communication terminal receives information on the OBO-related parameters from the base wireless communication terminal, the OBO-related parameters may not be set according to the information on the OBO-related parameters. In a specific embodiment, when an unassociated wireless communication terminal uses a predetermined default value for each OBO-related parameter, performs random access to the first base wireless communication terminal, and performs random access to the second base wireless communication terminal, the unassociated wireless communication terminal may not initiate the OBO procedure. For example, when an unassociated wireless communication terminal uses a predetermined default value for each OBO-related parameter, performs random access to the first base wireless communication terminal, and performs random access to the second base wireless communication terminal, the unassociated wireless communication terminal may use the OBO counter value used in the OBO procedure for the first base wireless communication terminal in the random access of the second base wireless communication terminal.

In the embodiment of FIG. 24, when the UORA parameter set element is not received from the base wireless communication terminal, the first station STA1 sets OCWmin to a default value of OCWmin and sets OCWmax to an OCWmax value. In this case, the first station STA1 initiates the OBO procedure and selects 10 as a random integer within the OCW. The first station STA1 sets the randomly selected 10 as the OBO count.

The first station STA1 receives the beacon frame from the first AP AP1 and obtains the UORA parameter set element from the beacon frame. The first station STA1 does not initialize the OBO procedure but maintains the value of the OBO-related parameter as it is.

The first station STA1 receives a trigger frame indicating two RUs allocated for random access from the first AP AP1. In this case, the first station STA1 decrements the OBO counter by 2 and sets the OBO counter to 8.

In addition, the first station STA1 receives a trigger frame indicating two RUs allocated for random access from the second AP AP2. In this case, the first station STA1 decrements the OBO counter by 2 and sets the OBO counter to 6.

Figure 25:
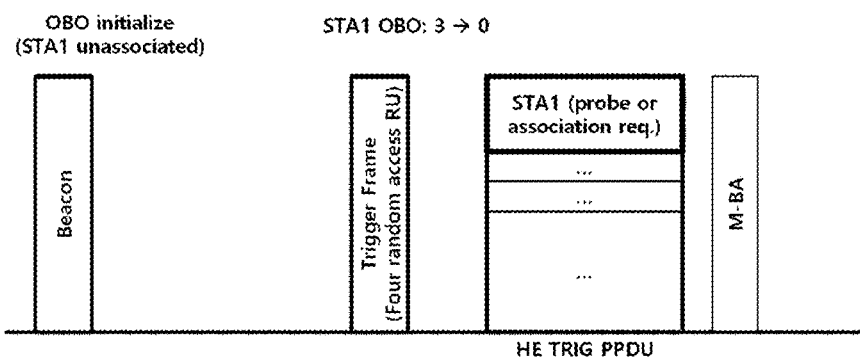
FIG. 25 shows the random access operation of an unassociated wireless communication terminal according to an embodiment of the present invention.

FIG. 25 shows the random access operation of an associated wireless communication terminal according to an embodiment of the present invention.

The unassociated wireless communication terminal may transmit the management frame by randomly accessing the base wireless communication terminal. Specifically, the unassociated wireless communication terminal may transmit at least one of a probe request frame, an authentication request frame, and an association request frame by randomly accessing the base wireless communication terminal. When a wireless communication terminal transmits a trigger-based PPDU in response to a trigger frame, the wireless communication terminal may perform transmission in the format of Aggregate-MAC Protocol Data Unit (A-MPDU) according to a MAC padding rule. However, since the probe request frame, the authentication request frame, and the association request frame are MAC Management Protocol Data Units (MMPDUs) that do not request an immediate response, transmission using A-MPDU may not be allowed. In this case, an immediate response may indicate that a response is transmitted within a predetermined period within one transmission opportunity (TXOP). The predetermined period may be an SIFS. It may be allowed to aggregate MMPDUs to the A-MPDU to transmit the A-MPDU in order for transmission through the random access of the unassociated wireless communication terminal. In this case, the MMPDU may include at least one of a probe request frame, an authentication request frame, an association request frame, and a reassociation request frame. Specifically, among the contexts of the contents of the A-MPDU, the transmission of the MMPDU may be included in a context including data that does not request an immediate response. In a specific embodiment, a probe request frame, an authentication request frame, and an association request frame may be regulated with the type of MPDU that can be combined in the context of data that does not require an immediate response among the contexts of the contents of A-MPDU. In yet another specific embodiment, the context for the content of the A-MPDU may be defined. Specifically, it may be regulated that the context for the association procedure is set, the A-MPDUs defined in the context for the association procedure do not require an immediate response, and a QoS Null frame or an Action No ACK frame can be aggregated with the MMPDU. For example, it may be regulated that the A-MPDUs defined in the context for the association procedure do not require an immediate response and a QoS Null frame or an Action No ACK frame is allowed to be aggregated with a probe request frame, an authentication request frame, or an association request frame.

In the embodiment of FIG. 25, the unassociated first station STA1 receives a beacon frame from the AP. The first station STA1 obtains the UORA parameter set element from the beacon frame and initializes the OBO procedure according to the obtained UORA parameter set element. The first station STA1 sets the OBO counter to 3. The first station STA1 receives a trigger frame indicating four RUs allocated for random access from the AP. The first station STA1 decrements the OBO counter to 0 based on the trigger frame. Therefore, the first station STA1 transmits a trigger-based PPDU (HE TRIG PPDU) including the A-MPDU to which the probe request frame or the association request frame is aggregated to the AP through the RU allocated for the random access. The AP transmits a Multi-STA BlockAck (M-BA) for a plurality of stations.

When the wireless communication terminal performing the random access is scheduled to transmit the uplink transmission by the trigger frame, the operation of the wireless communication terminal will be described with reference to FIG. 26.

Figure 26:
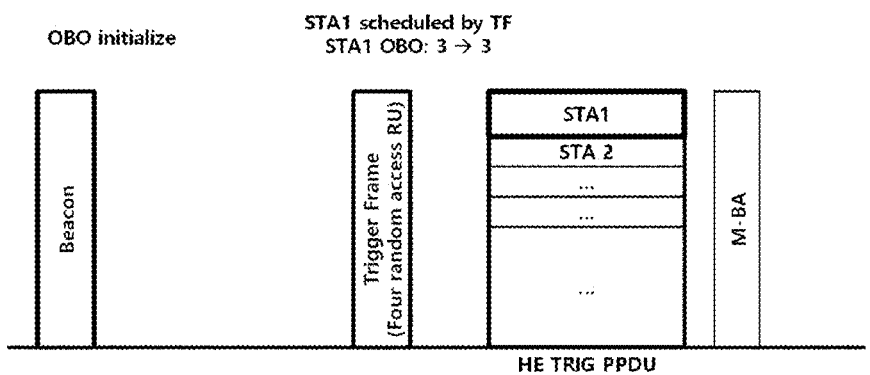
FIG. 26 shows a random access operation of a wireless communication terminal when a wireless communication terminal according to an embodiment of the present invention schedules uplink transmission by a trigger frame.

FIG. 26 shows a random access operation of a wireless communication terminal when a wireless communication terminal according to an embodiment of the present invention schedules uplink transmission by a trigger frame.

When a wireless communication terminal performing random access is scheduled for uplink transmission by a trigger frame, whether the corresponding wireless communication terminal can decrement the OBO counter based on the RU allocated for the random access indicated by the trigger frame may be a problem. Even when a wireless communication terminal performing random access is scheduled for uplink transmission by a trigger frame, if the OBO counter is decremented based on the RU allocated for the random access indicated by the trigger frame, the corresponding wireless communication terminal may have an excessively higher priority than the other wireless communication terminals. Therefore, the equality between wireless communication terminals can be violated. When a wireless communication terminal performing random access is scheduled for uplink transmission by a trigger frame, the corresponding wireless communication terminal can maintain the OBO counter regardless of the number of RUs allocated for the random access indicated by the trigger frame.

The trigger frame may indicate that carrier sensing is required when a wireless communication terminal scheduled for uplink transmission by the trigger frame performs uplink transmission. In this case, when it is determined that the RU to be used for uplink transmission is busy based on a result of the carrier sensing, the corresponding wireless communication terminal may not attempt uplink transmission. Specifically, the trigger frame may indicate that carrier sensing is required when a wireless communication terminal scheduled for uplink transmission by the trigger frame performs uplink transmission using the CS required field. Also, the carrier sensing may include an Energy Detect (ED). When it is determined by the carrier sensing that the RU to be used for uplink transmission is busy, the random access operation of the wireless communication terminal scheduled for the uplink transmission by the trigger frame is a problem. This is because uplink transmission is indicated by the trigger frame but the corresponding wireless communication terminal does not perform the uplink transmission.

When the trigger frame schedules uplink the transmission of a wireless communication terminal performing random access and indicates that uplink transmission requires carrier sensing, a wireless communication terminal performing random access may operate as follows. When it is determined by the carrier sensing that the RU to be used for uplink transmission is busy, the wireless communication terminal performing the random access may decrement the OBO counter based on the RU allocated for the random access indicated by the trigger frame. Specifically, the wireless communication terminal performing the random access may decrement the OBO counter by the number of RUs allocated for the random access indicated by the trigger frame. Also, when it is determined by the carrier sensing that the RU to be used for uplink transmission is busy, even if the OBO counter is 0 or the OBO counter reaches 0, the wireless communication terminal performing the random access may maintain the OBO counter as 0 and may not attempt uplink transmission. In another specific embodiment, when it is determined by the carrier sensing that the RU to be used for uplink transmission is busy and the OBO counter is 0 or the OBO counter reaches 0, the wireless communication terminal performing the random access may randomly select any one of the RUs allocated for the random access and attempt uplink transmission.

In the embodiment of FIG. 26, the first station STA1 receives a beacon frame from the AP. The first station STA1 obtains the UORA parameter set element from the beacon frame and initializes the OBO procedure according to the obtained UORA parameter set element. The first station STA1 sets the OBO counter to 3. The first station STA1 receives a trigger frame indicating the four RUs allocated for the random access and scheduling the uplink transmission of the first station STA1 from the AP. Since the trigger frame schedules the uplink transmission of the first station STA1, the first station STA1 maintains the OBO counter as it is. Also, the first station STA1 transmits the TB PPDU (HE TRIG PPDU) according to the information indicated by the trigger frame to the AP. The AP transmits a Multi-STA BlockAck (M-BA) for a plurality of stations.

In the above-described embodiments, it is described that the wireless communication terminal can obtain information on the OBO counter from the beacon frame. In such a way, the wireless communication terminal can obtain information on the BSS from the beacon frame. Also, the base wireless communication terminal may periodically transmit a beacon frame to signal information on the BSS. A specific transmission method for the beacon frame will be described with reference to FIG. 27 to FIG. 35.

Figure 27:
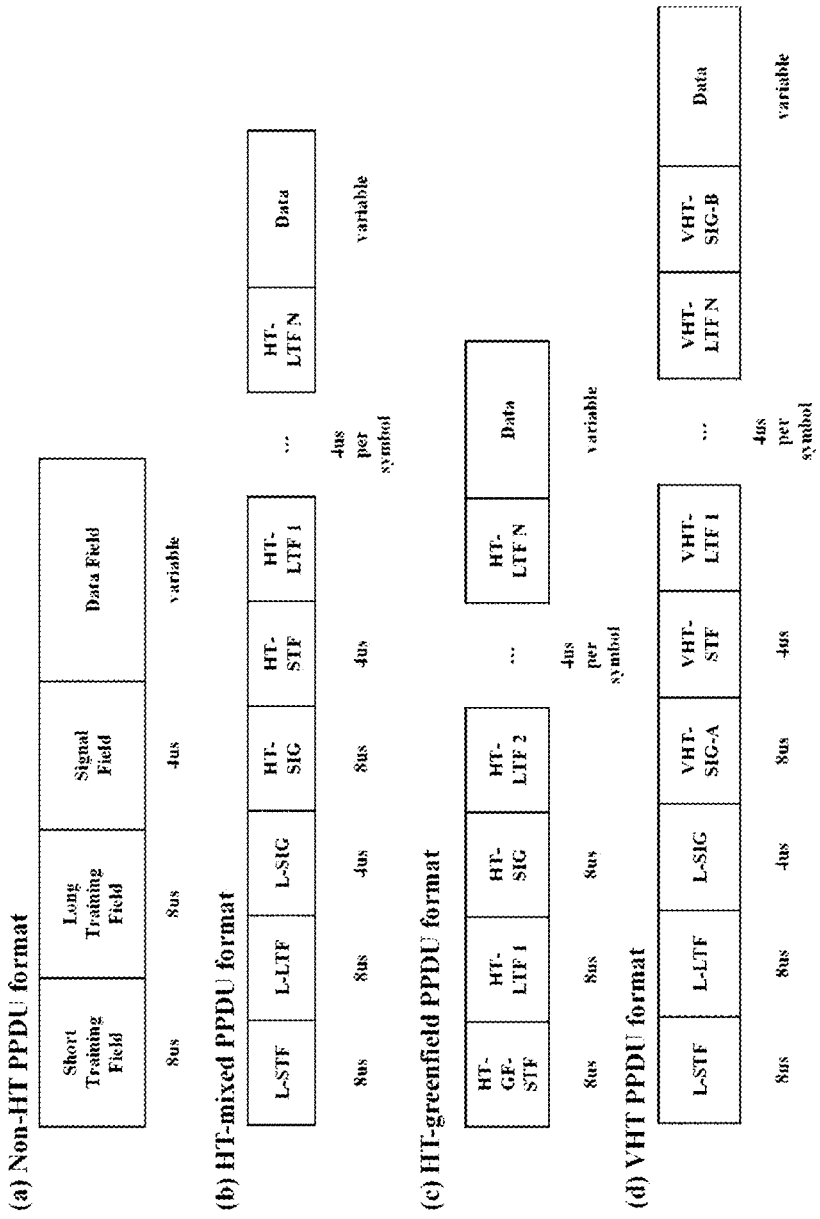
FIG. 27 shows a legacy PPDU format according to an embodiment of the present invention.

FIG. 27 shows a legacy PPDU format according to an embodiment of the present invention.

The types of legacy PPDUs that can be transmitted by the legacy wireless communication terminal may include at least one of Non-HT PPDU, HT-mixed PPDU, HT-greenfield PPDU, and VHT PPDU.

FIG. 27(a) shows the format of a non-HT PPDU. The Non-HT PPDU format includes a Short Training field including a relatively short training signal, a Long Training field including a relatively long training signal, a Signal field including signaling information, and a Data field including a payload of the PPDU. FIG. 27(b) shows the format of the HT-mixed PPDU. The HT-mixed PPDU includes L-STF, L-LTF and L-SIG fields for legacy wireless communication terminals that do not support HT-mixed PPDUs. In addition, the HT-mixed PPDU includes an HT-SIG field including signaling information, an HT-STF including a relatively short training signal, at least one HT-LTF including a relatively long training signal, and a Data field including a payload of the PPDU. FIG. 27(c) shows the format of the HT-greenfield PPDU. The HT-greenfield PPDU includes an HT-GF-STF including a relatively short training signal and an HT-SIG field including signaling information, at least one HT-LTF including a relatively long training signal, and a Data field including a payload of the PPDU. FIG. 27(d) shows the format of the VHT PPDU. The VHT PPDU includes L-STF, L-LTF and L-SIG fields for legacy wireless communication terminals that do not support VHT PPDU. In addition, the VH PPDU includes a VHT-SIG-A field including signaling information, a VHT-STF including a relatively short training signal, at least one VHT-LTF including a relatively long training signal, and a Data field including a payload of the PPDU. In addition, the VHT PPDU may include a VHT-SIG-B field for signaling additional information.

Figure 28:
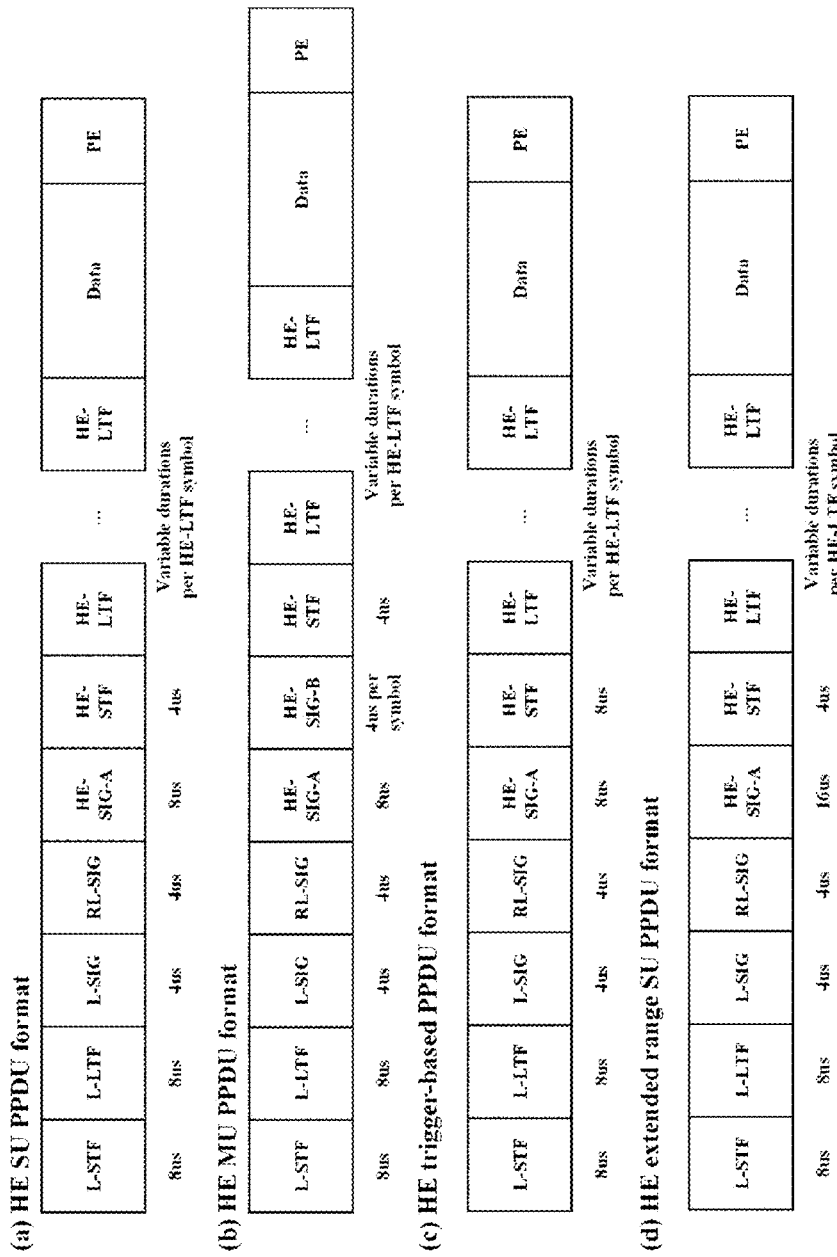
FIG. 28 shows a non-legacy PPDU format according to an embodiment of the present invention.

FIG. 28 shows a non-legacy PPDU format according to an embodiment of the present invention.

A wireless communication terminal according to an embodiment of the present invention may support one or more non-legacy PPDU formats. Also, the wireless communication terminal according to the embodiment of the present invention may select and use any one of a plurality of non-legacy PPDU formats according to the use and purpose of transmitting the PPDU. Specifically, the wireless communication terminal can support at least one of HE SU PPDU, HE MU PPDU, HE extended range SU PPDU, and HE trigger-based PPDU. The HE-SIG-A field and the HE-SIG-B field of the non-legacy PPDU may be referred to as a Pre-HE modulated field. In addition, the HE-STF, HE-LTF, and Date fields of the non-legacy PPDU may be referred to as HE modulated fields. The Pre-HE modulated fields and HE modulated fields can be modulated with different numerology.

FIG. 28(a) shows the format of the HE SU PPDU. The wireless communication terminal may use the HE SU PPDU for single user (SU) transmission. The HE SU PPDU may include L-STF, L-LTF and L-SIG fields for legacy wireless communication terminals. Also, the HE SU PPDU includes a RL-SIG for signaling a non-legacy PPDU, a HE-SIG-A field including signaling information, a HE-STF including a relatively short training signal, at least one HE-LTF including a relatively long training signal, and a Data field including a payload of the PPDU. In addition, the HE SU PPDU may include a Packet Extension (PE) field for securing processing time. The duration of the PE field may be determined by the TXVECTOR parameter PE_DURATION. HE SU PPDU can deliver one PSDU.

FIG. 28(b) shows the format of the HE MU PPDU. The wireless communication terminal may use the HE MU PPDU for transmission to one or more users. In this case, the wireless communication terminal may not use the HE MU PPDU in response to the trigger. The HE MU PPDU has a format similar to that of the HE SU PPDU and may further include an HE-SIG-B field as compared to the HE SU PPDU. The HE-SIG-B field includes information for Multi User (MU) transmission. The HE MU PPDU may deliver more than one PSDU.

FIG. 28(c) shows the format of the HE trigger-based PPDU. In the embodiments described above, a TB PPDU may refer to an HE trigger-based PPDU. The wireless communication terminal may use the HE trigger-based PPDU for the response to the trigger frame or the UL MU Response Scheduling A-Control field. HE trigger-based PPDUs may include HE-STFs including longer durations than that of the HE SU PPDU format.

FIG. 28(d) shows the format of the HE extended range SU PPDU. The wireless communication terminal may use the HE extended range SU PPDU for extended range transmission. The HE extended range SU PPDU has a format similar to the HE SU PPDU, and the duration of the HE-SIG-A field of the HE extended range SU PPDU is twice the duration of the HE-SIG-A field of the HE SU PPDU. The wireless communication terminal can perform transmission using four symbols. For example, four symbols can be transmitted in the HE-SIG-A field of the HE extended range SU PPDU. The four symbols used to transmit the HE-SIG-A field may be symbols that are repeated in the time domain. The four symbols transmitting the HE-SIG-A field are referred to as HE-SIG-A1, HE-SIG-A2, HE-SIG-A3 and HE-SIG-A4 in time order. In this case, HE-SIG-A1 and HE-SIG-A2 may transmit the same signal, and HE-SIG-A3 and HE-SIG-A4 may transmit the same signal. Also, when transmitting the HE extended range SU PPDU, the wireless communication terminal may boost the transmission power by 3 dB compared to the case of transmitting L-STF and L-LTF of other non-legacy PPDUs. Also, when transmitting four extra tones (subcarrier index k=−28, −27, 27, and 28) of the L-SIG field and the RL-SIG field, the wireless communication terminal may boost the transmission power by 3 dB compared to when transmitting L-STF and L-LTF of other non-legacy PPDUs. Through these operations, the wireless communication terminal can increase the reception probability of the HE extended range SU PPDU.

Figure 29:
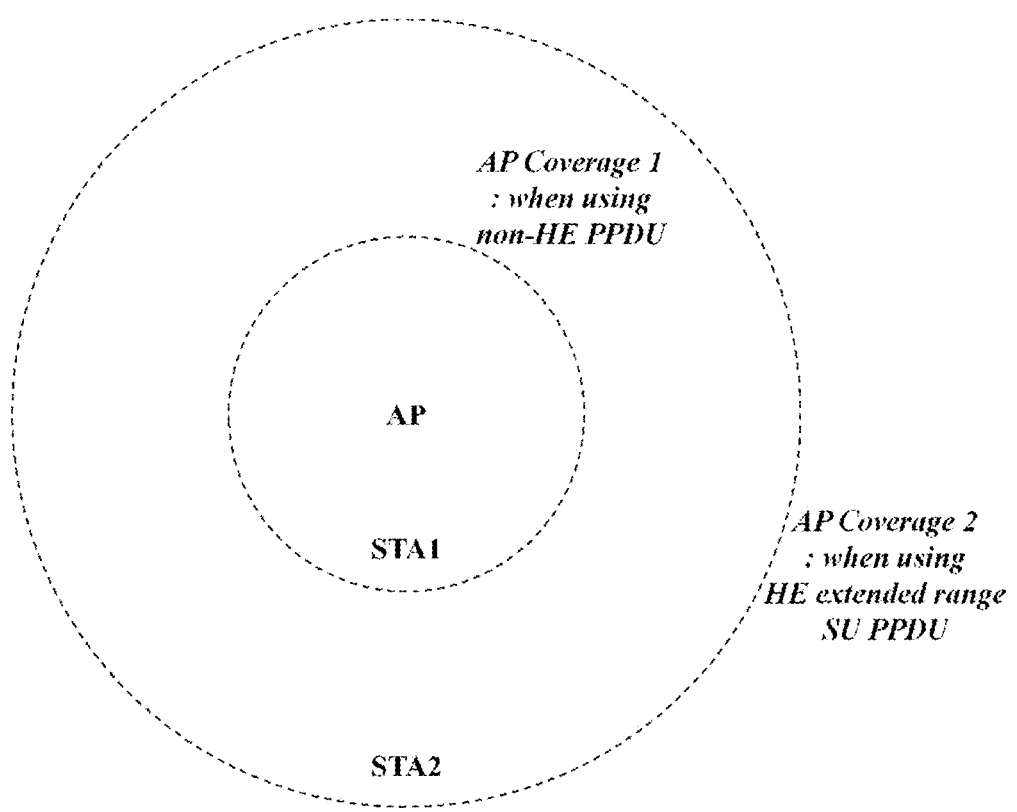
FIG. 29 shows the coverage of the HE extended range SU PPDU and the transmission coverage of the legacy PPDU according to the embodiment of the present invention.

FIG. 29 shows the coverage of the HE extended range SU PPDU and the transmission coverage of the legacy PPDU according to the embodiment of the present invention.

As described with reference to FIG. 28, when transmitting the HE extended range SU PPDU, the wireless communication terminal performs various operations for long distance transmission. Therefore, the transmission coverage of the HE extended range SU PPDU is wider than the transmission coverage of the legacy PPDU. Due to this, even a wireless communication terminal that can receive the HE extended range SU PPDU may not receive the legacy PPDU format. For example, in the situation shown in FIG. 29, the transmission coverage of the HE extended range SU PPDU is wider than that of the legacy PPDU (non-HE PPDU). Therefore, the first station STA1 may receive both the legacy PPDU (non-HE PPDU) and the HE extended range SU PPDU. The second station STA2 may receive only the HE extended range SU PPDU without receiving the legacy PPDU (non-HE PPDU). When there is information to be transmitted through the legacy PPDU format, the wireless communication terminal located outside the coverage of the legacy PPDU format can not use the information. The wireless communication terminal may use the legacy PPDU format to transmit the beacon frame. Although the wireless communication terminals located outside the coverage of the legacy PPDU format can communicate with the base wireless communication terminal using the HE extended range SU PPDU, it can not receive the BSS information and thus, can not communicate with the base wireless communication terminal. Therefore, the base wireless communication terminal may transmit the dual beacon frame. This will be described with reference to FIG. 30.

Figure 30:
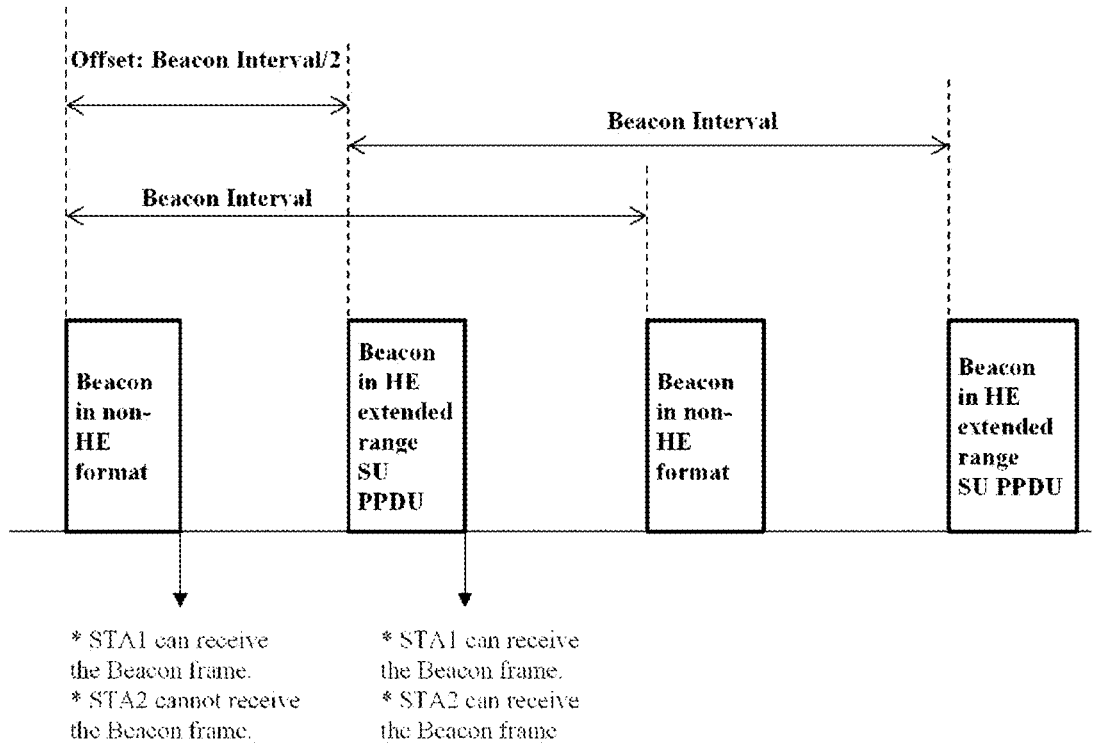
FIG. 30 shows a dual beacon transmission operation of the base wireless communication terminal according to an embodiment of the present invention.

FIG. 30 shows a dual beacon transmission operation of the base wireless communication terminal according to an embodiment of the present invention.

The base wireless communication terminal may transmit a beacon frame using a plurality of PPDU formats. Specifically, the base wireless communication terminal may transmit a beacon frame using two PPDU formats having different transmission coverage. The wireless communication terminal may transmit the beacon frame using the legacy PPDU format and transmit the beacon frame using the PPDU format for wide range transmission. In this case, the PPDU format for wide range transmission may be the HE extended range SU PPDU described above. Through this operation, the base wireless communication terminal may increase the possibility that the wireless communication terminal around the base wireless communication terminal receives the beacon frame. For convenience of explanation, the fact that a base wireless communication terminal transmits a beacon frame using two PPDU formats having different transmission coverage is referred to as a dual beacon.

The base wireless communication terminal may transmit a beacon frame based on a predetermined period. In this case, a time point at which the base wireless communication terminal attempts to transmit the beacon frame may be referred to as a target beacon transmission time (TBTT). The TBTT may be continued at predetermined time intervals. In this case, the predetermined time interval may be referred to as a beacon interval. When the channel on which the base wireless communication terminal transmits a beacon frame is busy, the base wireless communication terminal may attempt to transmit a beacon frame again after a scheduled time. For example, when the channel on which the base wireless communication terminal transmits a beacon frame is idle, the base wireless communication terminal may transmit a beacon frame.

The base wireless communication terminal may attempt to transmit the legacy PPDU including the beacon frame in the TBTT and attempt to transmit the PPDU for wide range transmission including the beacon frame after a predetermined time from the TBTT. At this point, the predetermined time may be half of the time interval between TBTTs. For example, the TBTT of the beacon frame included in the legacy PPDU may be a timing synchronization function (TSF) value 0, and the TBTT of the beacon frame included in the legacy PPDU may be repeated for each beacon interval. The TBTT of the beacon frame included in the PPDU for wide range transmission may be a time point at which the half of the beacon interval from the TSF value 0 elapses. In addition, the TBTT of the beacon frame included in the PPDU for wide range transmission may be also repeated for each beacon interval.

The base wireless communication terminal may signal whether to use the dual beacon using the Operation element. In this case, the Operation element may be an HE Operation element. In addition, each of the beacon frames transmitted through different PPDU formats may include different types of signaling information. Specifically, each of the beacon frames transmitted through different PPDU formats may include different types of elements.

In the embodiment of FIG. 30, the base wireless communication terminal attempts to transmit a legacy PPDU including a beacon frame in a TBTT for a legacy PPDU including a beacon frame. The base wireless communication terminal transmits a legacy PPDU including a beacon frame, and the first station STA1 receives a legacy PPDU including a beacon frame. The second station STA2, which is farther from the base wireless communication terminal than the first station STA1, does not receive the legacy PPDU including the beacon frame.

At the time point that elapses by the half of the beacon interval of the legacy PPDU including the beacon frame from the TBTT for the legacy PPDU including the beacon frame, the base wireless communication terminal attempts to transmit the HE extended range SU PPDU including the beacon frame. The base wireless communication terminal transmits the HE extended range SU PPDU including the beacon frame and the first station STA1 and the second station STA2 receive the HE extended range SU PPDU including the beacon frame.

At the time point that elapses by the beacon interval from the TBTT for the legacy PPDU including the beacon frame, the base wireless communication terminal attempts to transmit a legacy PPDU including a beacon frame. At the time point that elapses by half of the beacon interval from this time, the base wireless communication terminal attempts to transmit the HE extended range SU PPDU including the beacon frame.

The base wireless communication terminal may signal information on a specific time point using the TBTT described above. For example, the base wireless communication terminal may signal the change start time point of the BSS color, which is an identifier indicating the BSS, using the TBTT. This will be described in more detail with reference to FIG. 31.

Figure 31:
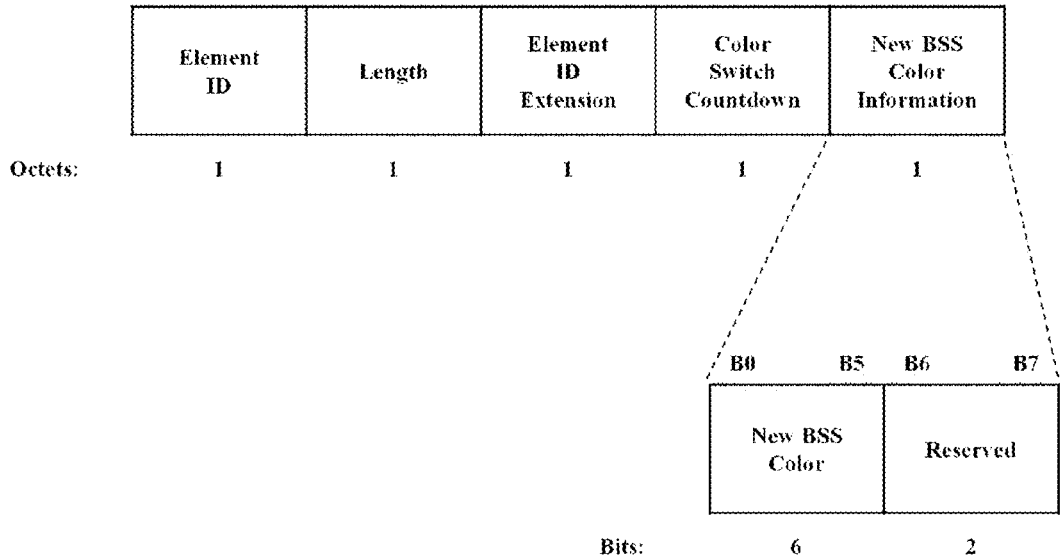
FIG. 31 shows a format of a BSS Color Change Announcement element according to an embodiment of the present invention.

FIG. 31 shows a format of a BSS Color Change Announcement element according to an embodiment of the present invention.

The base wireless communication terminal may transmit a beacon frame including a BSS Color Change Announcement element to notify a change in BSS color and a new BSS color value. In this case, the BSS Color Change Announcement element may include a field indicating a time point at which the BSS color is changed. In addition, the BSS Color Change Announcement element may include a field indicating the value of the changed BSS Color. For example, the BSS Color Change Announcement element may include a Color Switch Countdown field. The Color Switch Countdown field may indicate the number of TBTTs remaining until the BSS color change time point. The BSS Color Change Announcement element may include a New BSS Color Information field. The New BSS Color Information field may indicate a new BSS color value to be used as the BSS color of the corresponding BSS. The New BSS Color Information field may include the New BSS Color subfield, and the New BSS Color subfield may represent the value of the new BSS color to be used as the BSS color of the corresponding BSS. The specific format of the BSS Color Change Announcement element may be the same as that shown in FIG. 31.

For convenience of explanation, the TBTT in which the Color Switch Countdown value reaches 0 and the BSS color is changed is referred to as a BSS Color change TBTT. Before reaching the BSS Color change TBTT, the base wireless communication terminal inserts the BSS color value before the BSS change into the BSS Color subfield of the HE Operation element. In addition, when reaching the BSS Color change TBTT, the base wireless communication terminal sets the BSS Color Disabled subfield of the HE Operation element to 0, inserts the changed value of BSS color into the BSS Color subfield of the HE Operation element, and starts using the changed value of the BSS color. In addition, the wireless communication terminal receiving the BSS Color Change Announcement element may use the changed value of BSS color from the BSS Color change TBTT. In this case, the wireless communication terminal obtained the changed value of the BSS color from the BSS Color Change Announcement element.

In order for all wireless communication terminals in the BSS to use the same BSS color value, the base wireless communication terminal and the wireless communication terminal can operate as follows. The base wireless communication terminal transmitting the BSS Color Change Announcement element may use the previous BSS color value until the BSS Color change TBTT is reached, and use the changed value of the BSS Color after the BSS Color change TBTT. Also, until the base wireless communication terminal transmitting the BSS Color Change Announcement element reaches the BSS Color change TBTT, it may not be allowed to change the BSS Color change TBTT indicated by the BSS Color Change Announcement element. When the base wireless communication terminal uses the dual beacon, the BSS color change time point can be determined differently according to the format of the PPDU that the wireless communication terminal can receive. This will be described with reference to FIG. 32.

Figure 32:
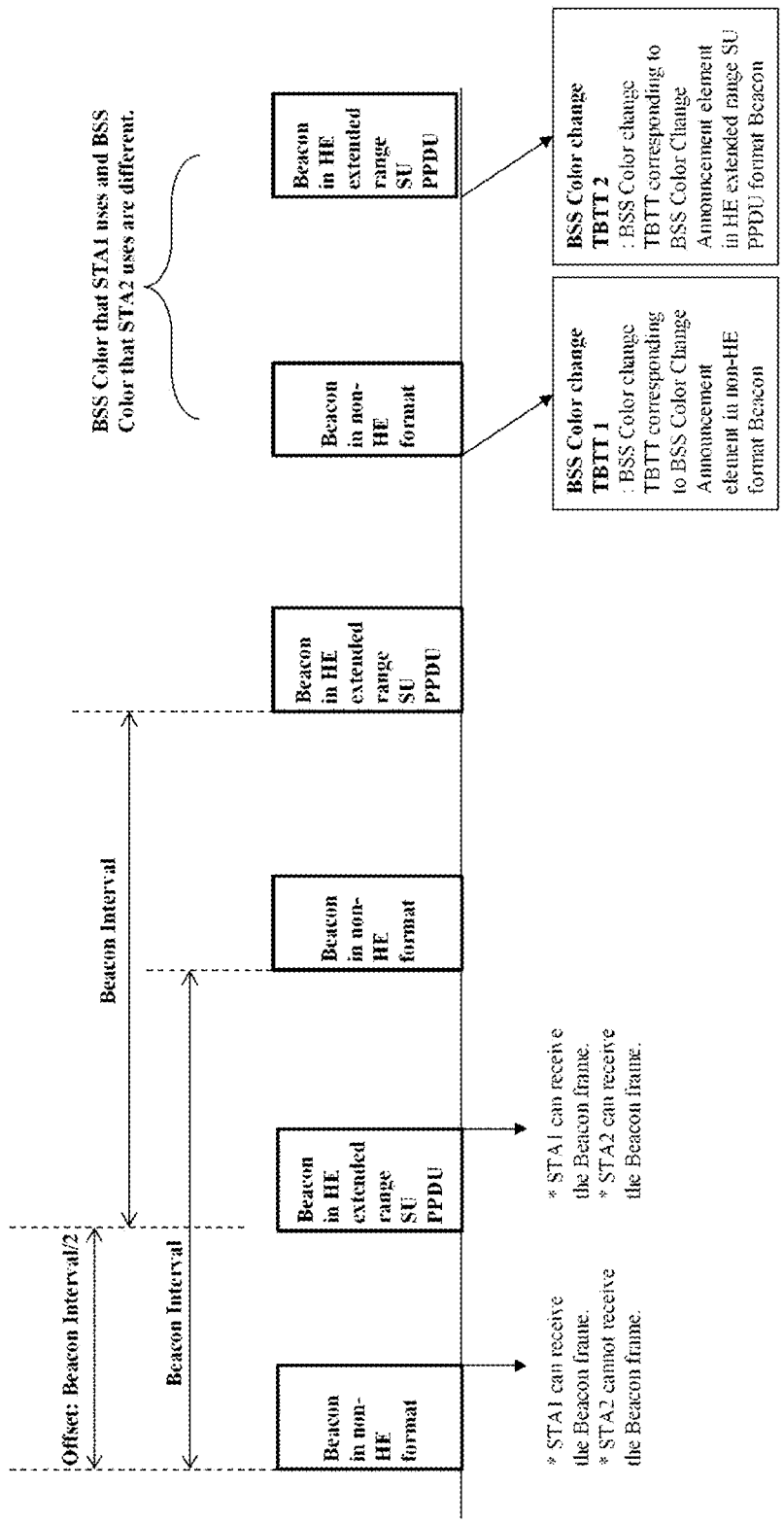
FIG. 32 shows a BSS color changing operation of a base wireless communication terminal when the base wireless communication terminal uses dual beacons according to an embodiment of the present invention.

FIG. 32 shows a BSS color changing operation of a base wireless communication terminal when the base wireless communication terminal uses dual beacons according to an embodiment of the present invention.

Due to the distance between the wireless communication terminal and the base wireless communication terminal, the wireless communication terminal may receive only one kind of PPDU format among the PPDU formats used for dual beacons. In this case, the wireless communication terminal receiving only one PPDU format of the PPDU format used for the dual beacon may determine the BSS Color change TBTT differently from the wireless communication terminal receiving all the PPDU formats used for the dual beacon. Specifically, since the wireless communication terminal may not recognize the transmission of the beacon frame included in the PPDU format that the wireless communication terminal may not receive, the number of TBTTs remaining until the BSS color change may not be accurately determined. In addition, a wireless communication terminal receiving all of the PPDU formats used for dual beacons can confuse how to set the TBTT criteria in determining the BSS Color change TBTT. For example, a wireless communication terminal receiving all of the PPDU formats used for a dual beacon may have a difficulty in determining whether the value indicated by the Countdown field indicates a TBTT of all kinds of PPDU format including a beacon frame or only a TBTT of a specific kind of PPDU format including a beacon frame.

In the embodiment of FIG. 32, the base wireless communication terminal attempts to transmit a legacy PPDU including a beacon frame in a TBTT for a legacy PPDU including a beacon frame. The base wireless communication terminal transmits a legacy PPDU including a beacon frame, and the first station STA1 receives a legacy PPDU including a beacon frame. The second station STA2, which is farther from the base wireless communication terminal than the first station STA1, does not receive the legacy PPDU including the beacon frame.

At the time point that elapses by the half of the beacon interval of the legacy PPDU including the beacon frame from the TBTT for the legacy PPDU including the beacon frame, the base wireless communication terminal attempts to transmit the HE extended range SU PPDU including the beacon frame. The base wireless communication terminal transmits the HE extended range SU PPDU including the beacon frame and the first station STA1 and the second station STA2 receive the HE extended range SU PPDU including the beacon frame.

In this case, the beacon frame included in the legacy PPDU signals the BSS Color change TBTT based on the TBTT of the beacon frame included in the legacy PPDU. The beacon frame included in the legacy PPDU may signal the remaining TBTT count until the first time point (BSS Color change TBTT 1) at which the BSS color is changed and the legacy PPDU including the first beacon frame is transmitted. The beacon frame included in the PPDU for wide range transmission signals the BSS Color change TBTT based on the TBTT of the beacon frame included in the PPDU for wide range transmission. The beacon frame included in the PPDU for wide range transmission can signal the remaining TBTT count until the second time point (BSS Color change TBTT 2) at which the BSS color is changed and the PPDU for wide range transmission including the first beacon frame is transmitted. Since the first station STA1 can receive two types of PPDU formats including beacon frames, it may not determine at which time point among the first time point (BSS Color change TBTT 1) or the second time point (BSS Color change TBTT 2) the BSS color changes. Also, the second station STA2 does not receive information on the first time point (BSS Color change TBTT1). Therefore, the BSS color change time points of the first station STA1 and the second station STA2 may be different. As a result, interference may occur because of wireless communication terminals included in the same BSS and using different BSS color values.

The wireless communication terminal may perform operations other than the BSS color change operation based on the TBTT. For example, the wireless communication terminal may receive a UORA parameter element set in relation to random access in the TBTT and perform an operation according to the reception of the UORA parameter element set. The operation according to the reception of the UORA parameter element set may include at least one of OBO related parameter setting and OBO procedure initialization. As a result, when the base wireless communication terminal uses the dual beacon, there may be a problem that the time point at which the wireless communication terminal receives the UORA parameter element set in relation to the random access and performs the operation according to the reception of the UORA parameter element set becomes unclear. In addition, a wireless communication terminal located relatively close to the base wireless communication terminal may receive a UORA parameter element set more frequently than a wireless communication terminal located relatively far from the base wireless communication terminal. Accordingly, a wireless communication terminal located relatively close to the base wireless communication terminal may perform an OBO procedure more frequently than a wireless communication terminal located relatively far from the base wireless communication terminal. As a result, equality between wireless communication terminals for random access may be a problem. For convenience of explanation, an operation in which a wireless communication terminal determines an operation execution time point based on a TBTT is referred to as a TBTT-based operation. An embodiment in which the wireless communication terminal can perform the TBTT-based operation without any problem even when the base wireless communication terminal uses the dual beacon will be described with reference to FIG. 33 to FIG. 34.

Figure 33:
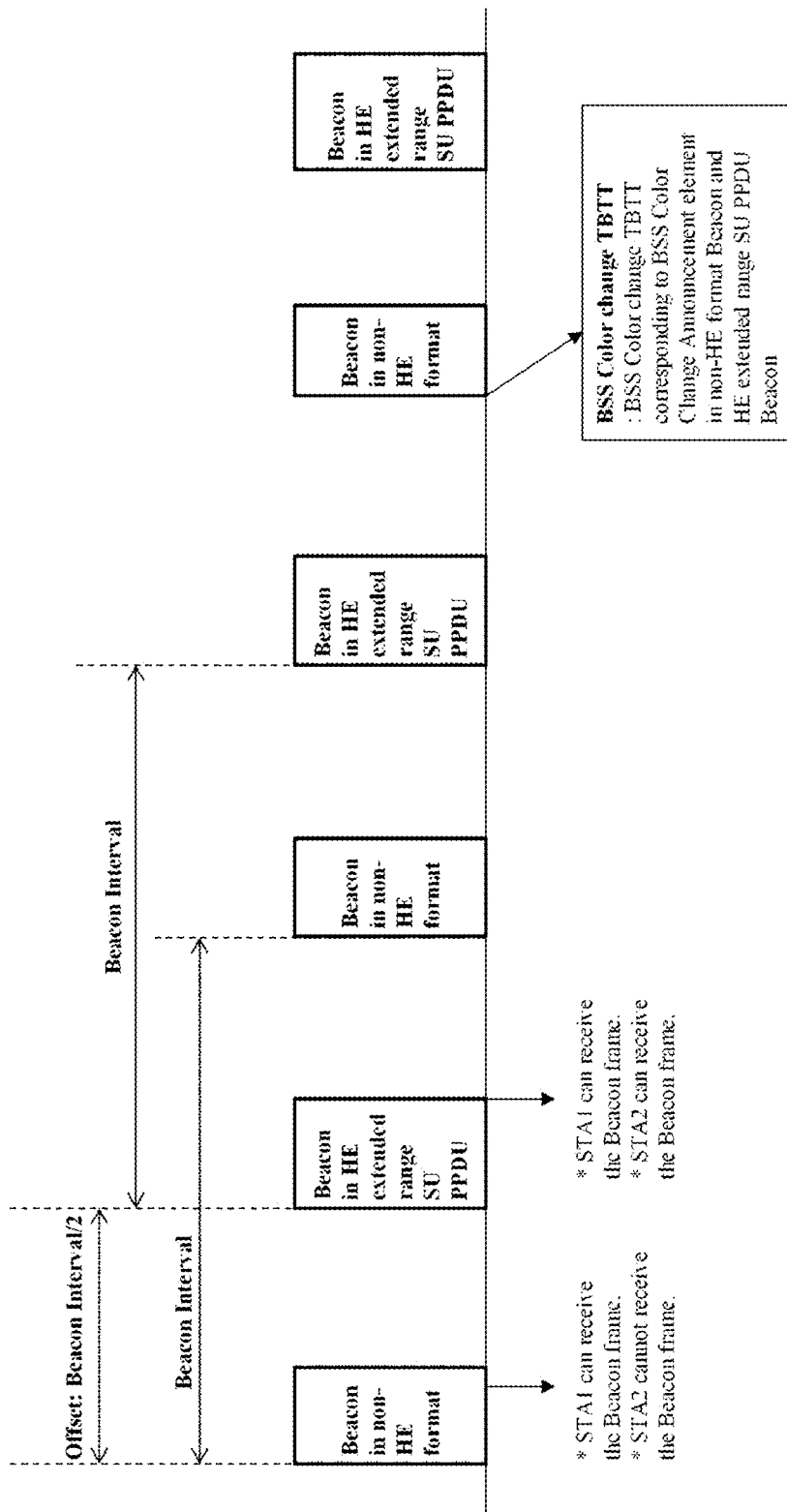
FIG. 33 shows a BSS color changing operation of a base wireless communication terminal when the base wireless communication terminal uses dual beacons according to another embodiment of the present invention.

FIG. 33 shows a BSS color changing operation of a base wireless communication terminal when the base wireless communication terminal uses dual beacons according to another embodiment of the present invention.

When the base wireless communication terminal uses dual beacons, the wireless communication terminal may perform a TBTT-based operation in a TBTT of a beacon frame included in one PPDU format and may not perform a TBTT-based operation in a TBTT of a beacon frame included in another PPDU format. Specifically, the wireless communication terminal may perform a TBTT-based operation on the TBTT of the beacon frame included in the legacy PPDU and may not perform the TBTT-based operation on the TBTT of the beacon frame included in the PPDU for wide range transmission. In another specific embodiment, specifically, the wireless communication terminal may perform the TBTT-based operation on the TBTT of the beacon frame included in the PPDU for wide range transmission without performing the TBTT-based operation on the TBTT of the beacon frame included in the legacy PPDU. For convenience of explanation, the format of the PPDU including the beacon frame transmitted at the TBTT at which the wireless communication terminal performs the TBTT-based operation is referred to as a reference PPDU format. Beacons included in the PPDU format other than the reference PPDU format may also signal information related to the TBTT reference operation. In this case, the information related to the TBTT reference operation signaled by the beacon included in the reference PPDU format and the information related to the TBTT reference operation signaled by the beacon included in the PPDU format other than the reference PPDU format may indicate the same information.

In such an embodiment, the BSS Color Change Announcement element may indicate the same BSS color change time point regardless of the format of the PPDU including the BSS Color Change Announcement element. Also, the Color Switch Countdown field may indicate the number of times the reference PPDU format including the remaining beacon frame is transmitted before the BSS color is changed. If the Color Switch Countdown field included in the PPDU format other than the reference PPDU format is 0, the Color Switch Countdown field may indicate that the BSS color is changed when the reference PPDU format including the beacon frame is transmitted. For example, when the wireless communication terminal changes the BSS color in the TBTT of the beacon frame included in the legacy PPDU, the Color Switch Countdown field may indicate the number of times of transmitting a legacy PPDU including a remaining beacon frame before the BSS color is changed. In this case, when the Color Switch Countdown field of the beacon frame included in the PPDU for wide range transmission indicates 0, the wireless communication terminal may determine that the BSS color is changed at the TBTT of the beacon frame included in the legacy PPDU transmitted after the corresponding beacon frame. Also, when the Color Switch Countdown field of the beacon frame included in the legacy PPDU indicates 0, the wireless communication terminal may determine that the BSS color is changed at the TBTT of the corresponding beacon frame.

In another specific embodiment, when the wireless communication terminal changes the BSS color in the TBTT of the beacon frame included in the PPDU for wide range transmission, the Color Switch Countdown field may indicate the number of times the PPDU for wide range transmission including the remaining beacon frame is transmitted before the BSS color is changed. In this case, when the Color Switch Countdown field of the beacon frame included in the legacy PPDU indicates 0, the wireless communication terminal can determine that the BSS color is changed in the TBTT of the beacon frame included in the PPDU for wide range transmission transmitted after the corresponding beacon frame. Also, when the Color Switch Countdown field of the beacon frame included in the PPDU for wide range transmission indicates 0, the wireless communication terminal can determine that the BSS color is changed in the TBTT of the corresponding beacon frame.

In the embodiment of FIG. 33, the BSS color is changed at the TBTT of the beacon frame included in the legacy PPDU (non-HE format). Therefore, both the beacon frame included in the HE extended range SU PPDU and the beacon frame included in the legacy PPDU (non-HE format) signal the TBTT of the beacon frame included in the legacy PPDU (non-HE format) as the BSS color change time point. Therefore, the first station STA1 and the second station STA2 can change the BSS color based on the same time point. Among the operations of the base wireless communication terminal, the first station STA1, and the second station STA2, the description of the same operation as that in the embodiment of FIG. 31 is omitted.

In another specific embodiment, the wireless communication terminal may update the OBO-related parameter based on the UORA parameter set element in the TBTT of the beacon frame included in the PPDU for wide range transmission, and may not update the OBO-related parameter based on the UORA parameter set element in the TBTT of the beacon frame included in the legacy PPDU. Also, the wireless communication terminal may initialize the OBO procedure based on the UORA parameter set element in the TBTT of the beacon frame included in the PPDU for wide range transmission, and may not initialize the OBO procedure based on the UORA parameter set element in the TBTT of the beacon frame included in the legacy PPDU.

Figure 34:
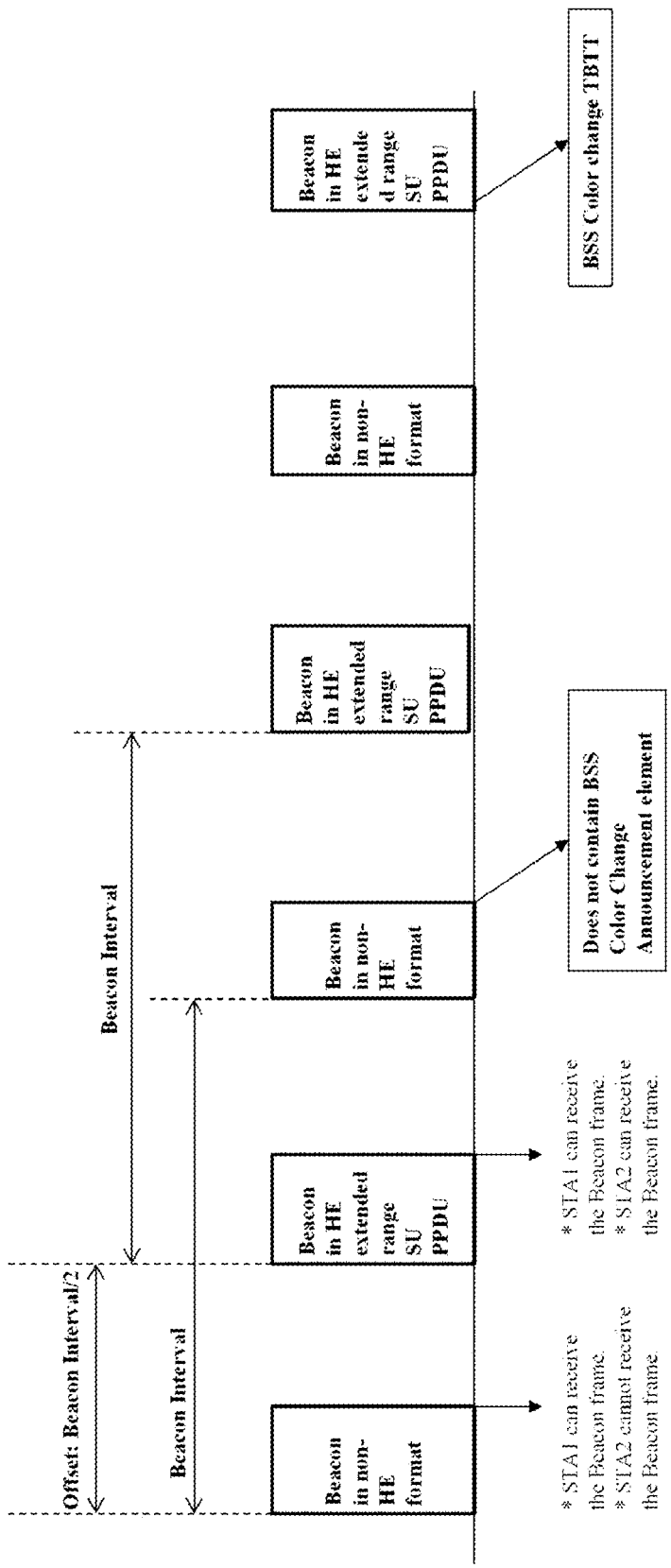
FIG. 34 shows a BSS color changing operation of a base wireless communication terminal when the base wireless communication terminal uses dual beacons according to another embodiment of the present invention.

FIG. 34 shows a BSS color changing operation of a base wireless communication terminal when the base wireless communication terminal uses dual beacons according to another embodiment of the present invention.

When the base wireless communication terminal uses dual beacons, the base communication terminal may signal information related to the TBTT-based operation through a beacon frame included in one PPDU format, and may not signal information related to TBTT-based operation through beacon frames included in other types of PPDU formats. Specifically, the base wireless communication terminal may signal information related to the TBTT-based operation through the beacon frame included in the legacy PPDU, and may not signal information related to the TBTT based operation through the beacon frame included in the PPDU for wide range transmission. Also in these embodiments, the reference PPDU format described with reference to FIG. 33 may be designated. The reference PPDU format may be a PPDU format that includes a beacon signaling information related to the TBTT based operation. In addition, the PPDU format including a beacon signaling information related to the TBTT-based operation may be a format of a PPDU having a wider transmission coverage than other PPDU formats. This is because as the transmission coverage of the PPDU format, which includes beacons signaling information related to TBTT-based operations, is wider, more wireless communication terminals can receive information related to TBTT based operation.

In a specific embodiment, the base wireless communication terminal may signal the BSS Color Change Announcement element through the beacon frame included in the PPDU for wide range transmission and may not signal the BSS Color Change Announcement element through the beacon frame included in the legacy PPDU. Even in this embodiment, the reference PPDU format may be designated. Specifically, the reference PPDU format may be a PPDU for wide range transmission.

In the embodiment of FIG. 34, the base wireless communication terminal transmits the BSS Color Change Announcement element through the beacon frame included in the HE extended range SU PPDU and does not transmit the BSS Color Change Announcement element through the beacon frame included in the legacy PPDU (non-HE format). Also, the BSS color is changed based on the TBTT of the beacon frame included in the HE extended range SU PPDU. Among the operations of the base wireless communication terminal, the first station STA1, and the second station STA2, the description of the same operation as that in the embodiment of FIG. 31 is omitted.

In another specific embodiment, the base wireless communication terminal may transmit the UORA parameter set element through the beacon frame included in the PPDU for wide range transmission and may not transmit the UORA parameter set element through the beacon frame included in the legacy PPDU.

The base wireless communication terminal may transmit the beacon frame using the STBC. In this case, the transmitted beacon frame may be referred to as an STBC beacon frame. When the base wireless communication terminal uses both the STBC beacon frame and the beacon frame included in the HE extended range SU PPDU, the transmission time point of the STBC beacon frame and the transmission time point of the HE extended range SU PPDU may overlap. Also, it may be difficult for the wireless communication terminal receiving the beacon frame to determine which beacon frame is transmitted at which time point. Therefore, the base wireless communication terminal may not operate the STBC beacon frame and the beacon frame included in the HE extended range SU PPDU together. For example, when the base wireless communication terminal uses the beacon frame included in the HE extended range SU PPDU, the base wireless communication terminal may not use the STBC beacon frame. Further, when the base wireless communication terminal starts using the beacon frame included in the HE extended range SU PPDU, the base wireless communication terminal may stop using the STBC beacon frame.

The base wireless communication terminal may indicate whether to use the STBC beacon frame using the Dual Beacon field of the HT Operation element. Also, the base wireless communication terminal may indicate whether to use the beacon frame included in the HE extended range SU PPDU using the Dual Beacon field of the HT Operation element. When the Dual Beacon field of the HT Operation element signals that any one of the STBC beacon frame and the beacon frame included in the HE extended range SU PPDU is used, the Dual Beacon field of the HT Operation element may indicate that other beacon frames are not used. For example, when the Dual Beacon field of the HE Operation element indicates that the STBC beacon frame is used, the Dual Beacon field of the HE Operation element may indicate that the beacon frame included in the HE extended range SU PPDU is not used. Therefore, when the Dual Beacon field of the HE Operation element is 1, the Dual Beacon field of the HE Operation element may indicate that the STBC beacon frame is not used.

The wireless communication terminal may transmit one MPDU or Aggregate-MPDU (A-MPDU) as a physical layer service data unit (PSDU) of the PPDU. In this case, the wireless communication terminal can aggregate a plurality of MPDUs to generate one Aggregate-MAC Protocol Data Unit (A-MPDU). The wireless communication terminal can increase the transmission efficiency by transmitting the A-MPDU instead of dividing the plurality of MPDUs into a plurality of PPDUs and transmitting the plurality of PPDUs. A specific format of the A-MPDU will be described with reference to FIG. 35.

Figure 35:
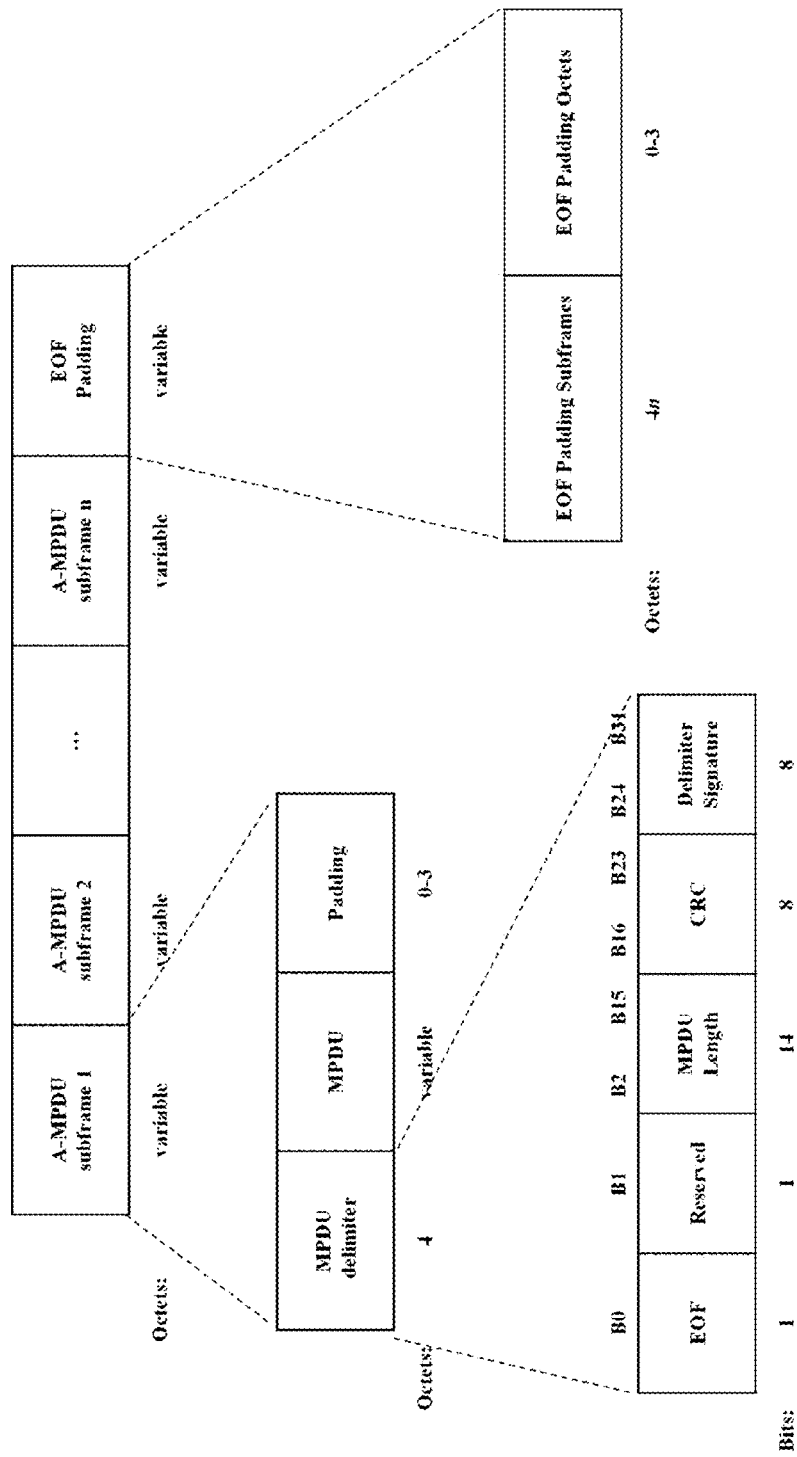
FIG. 35 shows a format of an A-MPDU according to an embodiment of the present invention.

FIG. 35 shows a format of an A-MPDU according to an embodiment of the present invention.

The A-MPDU may include the sequence of one or more A-MPDU subframes and an EOF Padding. The boundary between A-MPDU subframes may be distinguished by the MPDU delimiter field. The MPDU may follow the MPDU delimiter field. When the A-MPDU subframe is not the last A-MPDU subframe, the A-MPDU subframe may include Padding Octets. The wireless communication terminal may set padding octets so that the length of each A-MPDU subframe is a multiple of 4 octets. The length of the Padding subfield included in the last A-MPDU subframe may be 0 to 3 octets.

The length of the MPDU delimiter field may be 4 octets. The specific format of the MPDU delimiter field may be the same as that shown in FIG. 35. In this case, the MPDU delimiter field may be a format of an MPDU delimiter field transmitted by the non-DMG wireless communication terminal. The MPDU delimiter field may include at least one of an EOF subfield, a Reserved subfield, an MPDU Length subfield, a CRC subfield, and a Delimiter Signature subfield. The EOF subfield may be a 1-bit field. The wireless communication terminal sets the MPDU Length subfield of the A-MPDU subframe to 0 and sets the EOF subfield to 1, thereby indicating that the corresponding A-MPDU subframe is the EOF padding subframe. In addition, the wireless communication terminal sets the EOF subfield to 1 and sets the MPDU Length subfield to a non-zero value to indicate that the corresponding A-MPDU subframe is a VHT single MPDU or a single MPDU (S-MPDU). The VHT single MPDU or single MPDU is the only one MPDU in the corresponding A-MPDU. The wireless communication terminal may set the EOF field to 0 in other cases. The MPDU Length subfield may indicate the length of the MPDU including the A-MPDU subframe in octet units. When the A-MPDU subframe does not include an MPDU, the wireless communication terminal sets the MPDU Length field to 0. The CRC subfield may include a CRC value for 16 bits included in the MPDU delimiter field. The CRC field may be an 8-bit field. The Delimiter Signature subfield may include a value set to identify the MPDU delimiter. In this case, the set value may be 0x4E.

The length of the EOF Padding field may be variable. The EOF Padding field may include an EOF Padding subframe and EOF Padding Octets. The EOF Padding field may optionally include one or more EOF Padding subframes. The MPDU delimiter field may include an MPDU Length field and an EOF field. The wireless communication terminal sets the MPDU Length subfield of the A-MPDU subframe to 0 and sets the EOF subfield to 1, thereby indicating that the corresponding A-MPDU subframe is the EOF padding subframe. The length of the EOF Padding Octets subfield may be 0 to 3 octets.

As described above, the wireless communication terminal may signal information on the A-MPDU subframe through the value of the EOF field. In this case, the wireless communication terminal may configure the A-MPDU according to the following rules.

The A-MPDU subframe in which the EOF subfield is set to 0 in the A-MPDU is not located after the A-MPDU subframe in which the EOF subfield is set to 1.

The A-MPDU subframe in which the EOF subfield is set to 1 and the MPDU Length subfield is set to 0 in the A-MPDU is not located before the A-MPDU subframe including the VHT single MPDU.

In addition, the wireless communication terminal may set a predetermined value in the EOF subfield and solicit an immediate response to the MPDU included in the A-MPDU. Specifically, the wireless communication terminal transmitting the PPDU solicit an immediate response by setting the Ack Policy field of the QoS data frame or the QoS Null frame, transmitting a specific type of frame (for example, an Action frame, a BAR frame, or an MU-BAR frame), or setting a the EOF subfield to predetermined value when a frame is transmitted through an A-MPDU or a multi-TID A-MPDU.

The Multi-TID A-MPDU represents an MPDU generated by associating a plurality of MPDUs having different traffic identifiers (TIDs). Specifically, the multi-TID A-MPDU may be an A-MPDU including a plurality of QoS Data frames having different TIDs. The wireless communication terminal may solicit a specific type of response to the MPDU included in the A-MPDU subframe using the values of the subfields of the MPDU delimiter field included in the Multi-TID A-MPDU. Specifically, when the wireless communication terminal generates the Multi-TID A-MPDU, the wireless communication terminal may set the MPDU Length subfield of the MPDU delimiter field to a non-zero value and set the value of the EOF subfield to 0 to solicit an immediate ACK frame transmission for the QoS data frame or action frame included in the A-MPDU subframe corresponding to the MPDU delimiter field. In addition, the wireless communication terminal may set a plurality of noncontiguous MPDU delimiter fields in which the EOF subfield is 1 and the MPDU Length field has a non-zero value, to solicit an ACK for an MPDU included in each of a plurality of MPDU delimiter fields. In addition, the wireless communication terminal may set a plurality of noncontiguous MPDU delimiter fields in which the EOF subfield is 0 and the MPDU Length field has a non-zero value to solicit a BlockAck for an MPDU included in each of a plurality of MPDU delimiter fields. The wireless communication terminal may aggregate A-MPDUs by combining an A-MPDU subframe including the MPDU delimiter field in which the EOF subfield is 1 and the MPDU Length subfield is not 0 and an A-MPDU subframe including the MPDU delimiter field in which the EOF subfield is 0 and the MPDU Length subfield is not 0. In addition, the wireless communication terminal may non-contiguously aggregate A-MPDU subframes having the same TID to generate a Multi-TID A-MPDU.

The wireless communication terminal receiving the Multi-TID A-MPDU may transmit the Multi-STA BlockAck in response to the Multi-TID A-MPDU. In this case, the Multi-STA BlockAck may include the following Per STA Info field.

The Per STA Info field indicating the ACK for successful reception of the MPDU corresponding to the MPDU Length field in which the EOF subfield value is 1 has a non-zero length (In this case, the TID value of the MPDU may indicate the TID of the QoS data frame or the QoS null frame. In addition, the TID value of the MPDU may be 15, which represents the action frame.)

The Per STA Info field indicating the BlockAck for successful reception of the MPDU corresponding to the MPDU Length field in which the EOF subfilter value is 0 has a non-zero length (In this case, the TID value of the MPDU may be the TID value of the QoS data frame.)

A specific format of BlockAck will be described with reference to FIG. 36.

Figure 36:
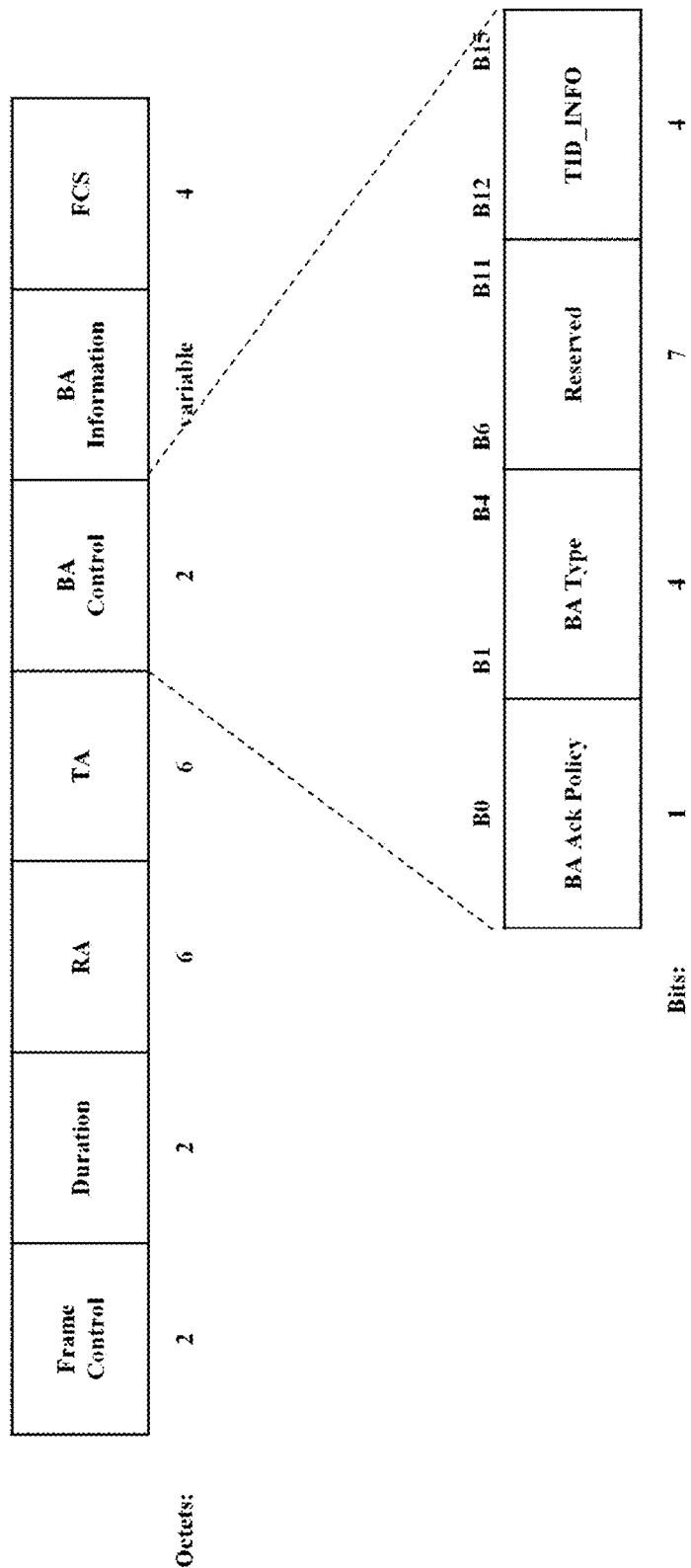
FIG. 36 shows a concrete format of BlockAck according to an embodiment of the present invention.

FIG. 36 shows a concrete format of BlockAck according to an embodiment of the present invention.

The BlockAck frame may include at least one of a Frame Control field, a Duration field, an RA field, a TA field, a BA Control field, a BA Information field, and an FCS field. The Frame Control field, the Duration field, the RA field, and the TA field correspond to a MAC header. When the BlockAck frame is not a Multi-STA BlockAck variant, the wireless communication terminal may set the RA field as the TA field of the frame that solicits the BlockAck frame. Also, when the BlockAck frame is not a Multi-STA BlockAck variant, the wireless communication terminal may set the RA field as the address of the wireless communication terminal transmitting the data/management frame that is an ACK with the BlockAck frame.

When the BlockAck frame is that the Multi-STA BlockAck frame is a Multi-STA BlockAck variant and the value of the AID subfield of the Per STA Info subfield included in the Multi-STA BlockAck variant is two or more, the wireless communication terminal may set the RA field as a broadcast address. When the BlockAck frame is that the Multi-STA BlockAck frame is a Multi-STA BlockAck variant and the value of the AID subfield of the Per STA Info subfield included in the Multi-STA BlockAck variant is one, the wireless communication terminal may set the RA field as the address of the wireless communication terminal requesting the BlockAck or may set it as a broadcast address. When the BlockAck frame is that the Multi-STA BlockAck frame is a Multi-STA BlockAck variant and the value of the AID subfield of the Per STA Info subfield included in the Multi-STA BlockAck variant is one, the wireless communication terminal may set the RA field as the address of the wireless communication terminal requesting the BlockAck or may set it as the address of the wireless communication terminal transmitting the data/management frame that is an ACK with the BlockAck frame. In addition, when the value of the AID subfield of the Per STA Info subfield included in the Multi-STA BlockAck variant is one, a Multi-STA BlockAck variant may include only one AID subfields of Per STA Info subfield or a plurality of the AID subfield of Per STA Info subfields that have the same value.

In addition, the BA Control field may include at least one of a BA Ack Policy subfield, a BA Type subfield, a TID_INFO subfield, and a Reserved subfield, as shown in FIG. 36. The BA Type subfield may include at least one of an existing Multi-TID subfield, Compressed Bitmap subfield, and GCR subfield. Specifically, B1 of the BA type may be the same as the existing Multi-TID subfield. In addition, B2 of the BA Type may be the same as the existing Compressed Bitmap subfield. In addition, B3 of the BA Type may be the same as the existing GCR subfield.

In a specific embodiment, the wireless communication terminal may signal a kind of BlockAck frame using the BA Type subfield. The wireless communication terminal may set the BA Type subfield to a predetermined value to indicate that the BlockAck frame is a Multi-STA BlockAck variant. For example, the wireless communication terminal may set the B1-B4 of the BA Type subfield to 1101 to indicate that the BlockAck frame is a Multi-STA BlockAck variant. The BlockAck frame, which is the Multi-STA BlockAck variant, may be referred to as a Multi-STA BlockAck frame. Also, the wireless communication terminal may indicate using the BA Type subfield whether a BlockAck frame is a Basic BlockAck, a Compressed BlockAck, a GLK-GCR BlockAck, a GCR BlockAck, an Extended Compressed BlockAck, a Multi-TID BlockAck, or a Multi-STA BlockAck.

Also, the information indicated by the TID_INFO subfield may vary according to the BlockAck frame variant type. Specifically, the information indicated by the TID_INFO subfield may vary according to the type of the BlockAck frame. When the BlockAck frame is a Multi-STA BlockAck, the TID_INFO subfield may be a reserved field.

In addition, the information indicated by the BA Information field may vary according to the BlockAck frame variant type. Specifically, when the BlockAck frame is a Multi-STA BlockAck variant, the BA Information field may include one or more Per STA Info subfields of FIG. 37. A specific format of the Per STA Info subfield will be described in detail with reference to FIG. 37. In this specification, receiving an MPDU/frame may refer to the successful reception of an MPDU or frame. Specifically, if the value of the frame check sequence (FCS) obtained based on the received MPDU/frame is equal to the value of the FCS field, the wireless communication terminal may determine that the MPDU/frame is successfully received.

Figure 37:
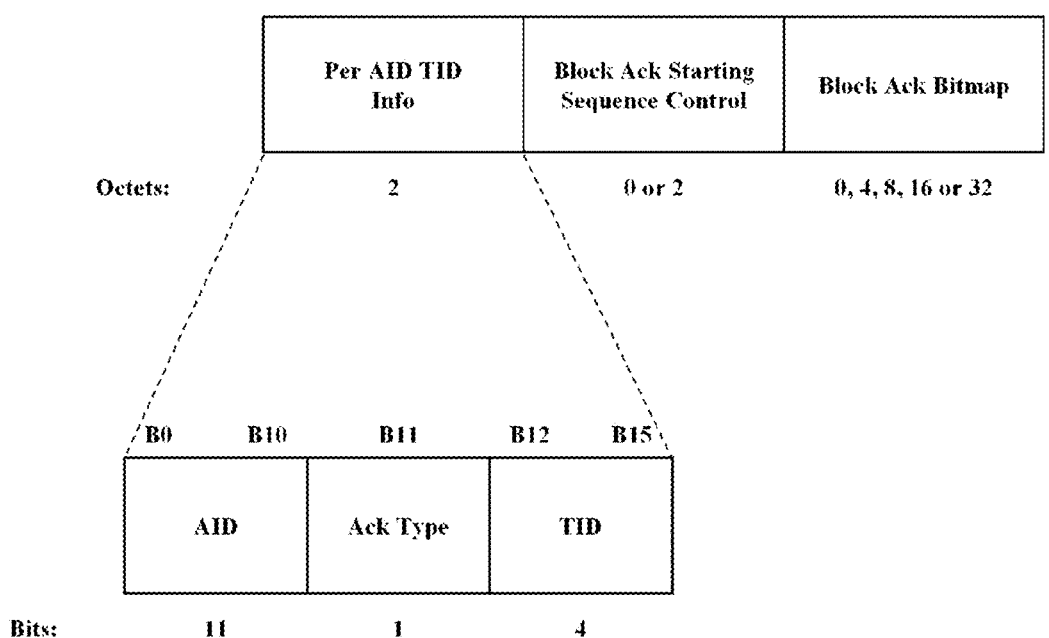
FIG. 37 shows a Per STA Info subfield according to an embodiment of the present invention.

FIG. 37 shows a Per STA Info subfield according to an embodiment of the present invention.

The BA Information field of the Multi-STA BlockAck may include one or more Per STA Info fields.

The Per STA Info subfield may include a Per AID TID Info subfield. The Per AID TID Info subfield may include at least one of an AID subfield, an Ack Type subfield, and a TID subfield. When a Multi-STA BlockAck frame is intended to be transmitted to a wireless communication terminal other than a base wireless communication terminal, the wireless communication terminal may set the AID subfield to 11 LSBs of the AID of the corresponding wireless communication terminal. When a Multi-STA BlockAck frame is intended to be transmitted to a wireless communication terminal other than a base wireless communication terminal, the wireless communication terminal may set the AID subfield to the AID of the corresponding wireless communication terminal. When a Multi-STA BlockAck frame is intended to be transmitted to a base wireless communication terminal, the wireless communication terminal may set the AID subfield to 0.

One Multi-STA BlockAck frame may include a plurality of Per STA Info subfields which the AID subfield having the same value. In this case, the values of the TID subfield of the plurality of Per STA Info subfields may be different from each other.

The TID subfield indicates the TID of the frame that the Per AID TID Info subfield ACKs. When the Per AID TID Info subfield of the Multi-STA BlockAck variant ACKs the management frame, the wireless communication terminal may set the TID subfield to 15.

In addition, the Ack Type subfield may indicate whether a Block Ack Starting Sequence Control subfield and a Block Ack Bitmap subfield is present or not in the Per STA Info subfield corresponding to the Ack Type subfield. This will be described in more detail with reference to FIG. 38.

FIG. 38 shows the context of a Per STA Info subfield according to an embodiment of the present invention.

When the Ack Type subfield is 1 and the value of the TID subfield of the Per AID TID Info subfield is less than or equal to 8 or 15, the Ack Type subfield and the TID subfield may indicate that the Block Ack Starting Sequence Control subfield and the Block Ack Bitmap subfield is not present. In this case, the Per STA Info subfield corresponding to the Ack Type field may ACK that a single MPDU indicated by the TID subfield of the Per AID TID Info subfield is received successfully.

In addition, when the Ack Type subfield is 1 and the value of the TID subfield of the Per AID TID Info subfield is 14, the Ack Type subfield and the TID subfield may indicate that the Block Ack Starting Sequence Control subfield and the Block Ack Bitmap subfield is not present. In this case, the Per STA Info subfield corresponding to the Ack Type field may ACK that all the MPDUs of the A-MPDU including a frame indicated by the TID subfield of the Per AID TID Info subfield are received successfully.

In addition, when the Ack Type subfield is 0, the Ack Type subfield may indicate that a Block Ack Starting Sequence Control subfield and a Block Ack Bitmap subfield is present. In addition, the specific context of the Per STA Info subfield may be the same as that shown in FIG. 38.

A specific method of the wireless communication terminal receiving the Multi-TID A-MPDU to generate the Multi-STA BlockAck frame will be described with reference to FIG. 39 to FIG. 40. For convenience of explanation, the wireless communication terminal transmitting the Multi-TID A-MPDU is referred to as a Multi-TID A-MPDU transmitter and the wireless communication terminal receiving the Multi-TID A-MPDU is referred to as a Multi-TID A-MPDU receiver.

Figure 39:
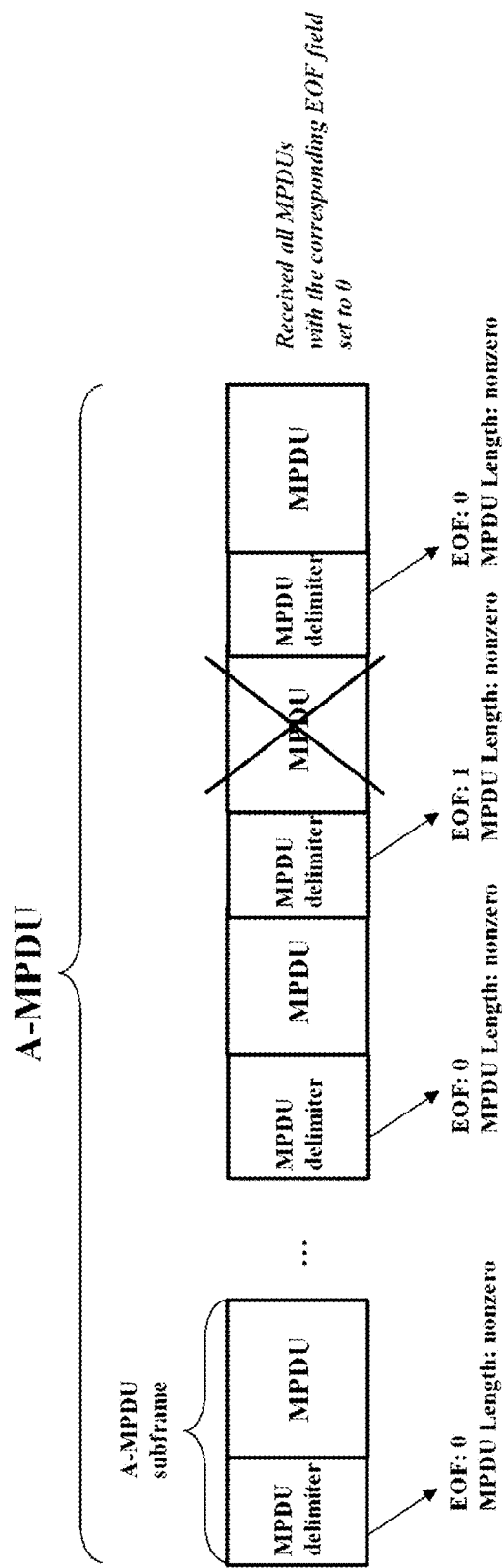
FIGS. 39 to 40 show an A-MPDU configuration according to an embodiment of the present invention.
Figure 40:
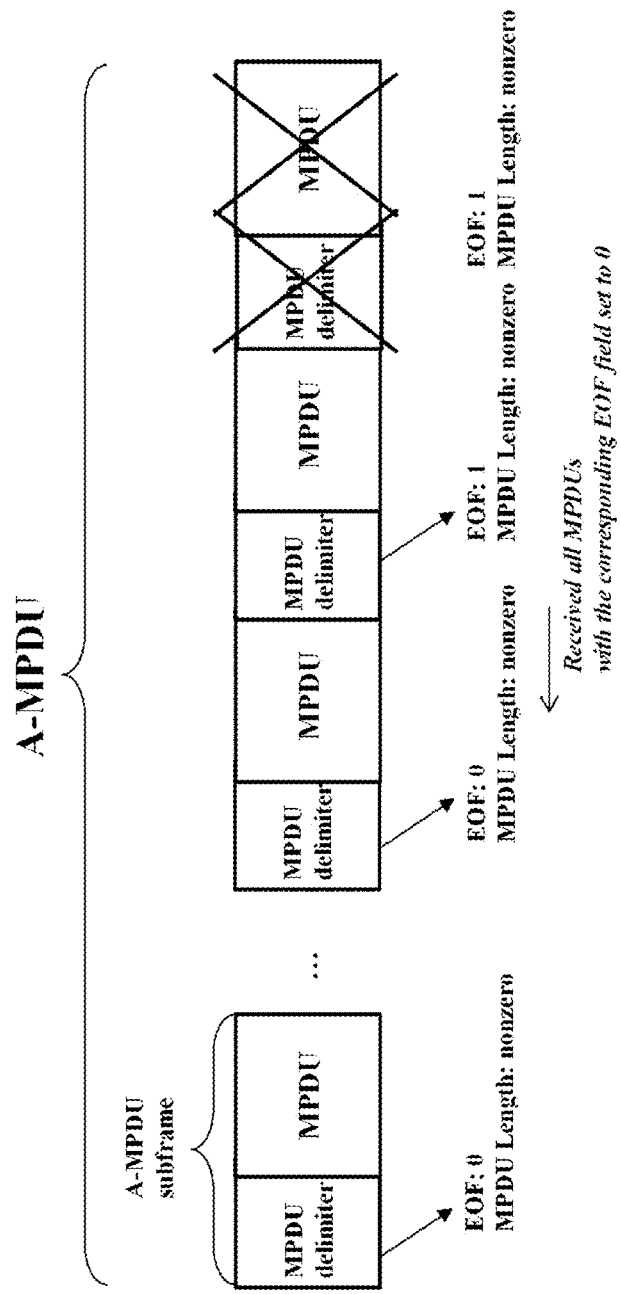

FIGS. 39 to 40 show an A-MPDU configuration according to an embodiment of the present invention.

As described above, the wireless communication terminal may aggregate A-MPDUs by combining the A-MPDU subframe including the MPDU delimiter field in which the EOF subfield is 1 and the MPDU Length subfield is not 0 and the A-MPDU subframe including the MPDU delimiter field in which the EOF subfield is 0 and the MPDU Length subfield is not 0. In addition, the wireless communication terminal may noncontiguously aggregate A-MPDU subframes having the same TID to generate a Multi-TID A-MPDU. When the EOF subfield of the MPDU delimiter field is 1 and the MPDU Length subfield is not 0, the Multi-TID A-MPDU receiver may ACK for the MPDU corresponding to the MPDU delimiter field using the Per AID TID Info field in which the Block Ack Starting Sequence Control field and the Block Ack Bitmap field are omitted. In addition, when the EOF subfield of the MPDU delimiter field is 0 and the MPDU Length subfield is not 0, the Multi-TID A-MPDU receiver may ACK for the MPDU corresponding to the MPDU delimiter field using the Per AID TID Info field including both the Block Ack Starting Sequence Control field and the Block Ack Bitmap field. For an efficient Multi-STA BlockAck frame configuration, when a Multi-TID A-MPDU transmitter generates a Multi-TID A-MPDU, the Multi-TID A-MPDU transmitter may limit the number of MPDUs corresponding to TIDs requesting ACKs other than BlockAck to one MPDU per TID. Specifically, when the Multi-TID A-MPDU transmitter aggregates a Multi-TID A-MPDU, the Multi-TID A-MPDU transmitter may add the MPDU corresponding to the MPDU delimiter field, in which the EOF subfield is 1 and the MPDU Length subfield is not 0, to the Multi-TID A-MPDU, and then may not add an MPDU having the same TID as the TID of the corresponding MPDU to the Multi-TID A-MPDU.

Also, when an MPDU included in any one A-MPDU subframe corresponds to a specific TID among the MPDUs included in the Multi-TID A-MPDU, the Multi-TID A-MPDU transmitter may set the EOF subfield of the A-MPDU subframe to 1. When the MPDU included in any one A-MPDU subframe is the only one MPDU corresponding to a specific TID in which the value of the MPDU Length field is not 0 among the MPDUs included in the Multi-TID A-MPDU, the Multi-TID A-MPDU transmitter may set the EOF subfield of the A-MPDU subframe to 1. Also, when an MPDU included in any one A-MPDU subframe does not correspond to a specific TID among the MPDUs included in the Multi-TID A-MPDU, the Multi-TID A-MPDU transmitter may set the EOF subfield of the A-MPDU subframe to 0. When the MPDU included in any one A-MPDU subframe is not the only one MPDU corresponding to a specific TID in which the value of the MPDU Length field is not 0 among the MPDUs included in the Multi-TID A-MPDU, the Multi-TID A-MPDU transmitter may set the EOF subfield of the A-MPDU subframe to 0.

In a specific embodiment, when a Multi-TID A-MPDU transmitter uses a PPDU of a predetermined format for multi-TID A-MPDU transmission, the Multi-TID A-MPDU transmitter may set the EOF subfield according to the embodiments described above. For example, when the Multi-TID A-MPDU transmitter uses a non-legacy PPDU for transmission of a Multi-TID A-MPDU, the Multi-TID A-MPDU transmitter may set the EOF subfield according to the embodiments described above. In this case, the non-legacy PPDU may represent the PPDU format described with reference to FIG. 28.

The Multi-TID A-MPDU receiver may generate Multi-STA BlockAck frame as follows. When the Multi-TID A-MPDU receiver receives all the MPDUs corresponding to the MPDU delimiter field in which the EOF subfield is 0 and the MPDU Length subfield is not 0, the Multi-TID A-MPDU receiver may determine that all the MPDUs in the Multi-TID A-MPDU that request BlockAck are received. Also, when the EOF subfield of the MPDU delimiter field corresponding to all the MPDUs not received by the multi-TID A-MPDU receiver is 1 and the MPDU Length subfield is not 0, the Multi-TID A-MPDU receiver may determine that all the MPDUs requesting BlockAck, which is included in the Multi-TID A-MPDU, are received. When the EOF subfield of the MPDU delimiter field corresponding to all the MPDUs not received by the multi-TID A-MPDU receiver is 1, the Multi-TID A-MPDU receiver may determine that all the MPDUs requesting BlockAck, which is included in the Multi-TID A-MPDU, are received.

The multi-TID A-MPDU receiver may determine that the EOF subfield of the MPDU delimiter field corresponding to the not-received MPDU is 1 according to the following embodiments. In the A-MPDU, when the A-MPDU subframe in which the EOF subfield is set to 0 is limited to not being located after the A-MPDU subframe in which the EOF subfield is set to 1, the multi-TID A-MPDU receiver may determine that the EOF subfield of the MPDU delimiter field corresponding to the not-received MPDU is 1 according to the following embodiment. When the Multi-TID A-MPDU receiver does not receive the MPDU included in the A-MPDU subframe located behind the A-MPDU subframe including the MPDU delimiter field in which the EOF subfield is 1, the multi-TID A-MPDU receiver may determine that the MPDU corresponding to the MPDU delimiter field in which the EOF subfield is 1 is not received. In another specific embodiment, when the Multi-TID A-MPDU receiver receives the MPDU delimiter field and does not receive the MPDU corresponding to the MPDU delimit field, the Multi-TID A-MPDU receiver may check the value of the EOF subfield of the MPDU delimiter field and determine whether the Multi-TID A-MPDU receiver does not receive the MPDU corresponding to the MPDU delimiter field in which the EOF subfield is 1.

Receiving all the MPDUs included in the Multi-TID A-MPDU and requesting BlockAck may represent receiving all the MPDUs having the TID of the MPDU corresponding to the MPDU delimiter field in which the EOF subfield is 0 and the MPDU Length subfield is not 0 and which are included in the Multi-TID A-MPDU.

When the Multi-TID A-MPDU receiver receives all the MPDUs included in the Multi-TID A-MPDU and requesting BlockAck, the Multi-TID A-MPDU receiver may ACK using the Per AID TID Info field in which the Block Ack Starting Sequence Control field and the Block Ack Bitmap field are omitted with respect to the MPDU corresponding to the MPDU delimiter field in which the EOF subfield is 0 and the MPDU Length subfield is not 0. Specifically, the Multi-TID A-MPDU receiver may ACK using the Per AID TID Info field in which the Ack Type subfield is set to 1 with respect to the MPDU corresponding to the MPDU delimiter field in which the EOF subfield is 0 and the MPDU Length subfield is not 0. In these embodiments, the Multi-TID A-MPDU receiver may set the TID subfield of the Per AID TID Info field to the TID of the received MPDU. In a specific embodiment, the Multi-TID A-MPDU receiver may transmit to the Multi-TID A-MPDU transmitter the Multi-STA BlockAck frame that indicates that the Multi-TID A-MPDU receiver receives all the MPDUs of the TID indicated by the TID subfield of the Per AID TID Info field and includes a Multi-STA BlockAck frame including the Per AID TID Info in which a Block Ack Starting Sequence Control subfield and a Block Ack Bitmap subfield are omitted. In this case, the Per AID TID Info field may further include an indicator indicating that all the MPDUs of the TID indicated by the TID subfield of the Per AID TID Info field are received.

The Multi-TID A-MPDU receiver transmits the generated Multi-STA BlockAck frame to the Multi-TID A-MPDU transmitter. When the value of the TID subfield of the Per AID TID Info field is 0 to 7 and the value of the Ack Type subfield is 1, the Multi-TID transmitter may determine that a Multi-STA BlockAck frame including a Per AID TID Info field is included in a Multi-TID A-MPDU soliciting a Multi-STA BlockAck frame and the Multi-TID receiver receives a single MPDU or all the MPDUs corresponding to the TID indicated by the TID subfield.

In the embodiment of FIG. 39, the MPDUs not received by the Multi-TID A-MPDU receiver are MPDUs corresponding to the MPDU delimiter field in which the EOF subfield is 1 and the MPDU Length subfield is not 0. Accordingly, the Multi-TID A-MPDU receiver ACKs using the Per AID TID Info field in which the Block Ack Starting Sequence Control field and the Block Ack Bitmap field are omitted, with respect to the MPDU corresponding to the MPDU delimiter field in which the EOF subfield is 0 and the MPDU Length subfield is not 0. Specifically, a Multi-TID A-MPDU receiver may transmit to a Multi-TID A-MPDU transmitter a Multi-STA BlockAck including a Block Ack Starting Sequence Control field and a Per AID TID Info field in which a Block Ack Bitmap field is omitted.

In the embodiment of FIG. 40, the A-MPDU subframe in which the EOF subfield is set to 0 in the A-MPDU is limited to not being located after the A-MPDU subframe in which the EOF subfield is set to 1. The Multi-TID A-MPDU receiver does not receive the MPDU delimiter field corresponding to the not-received MPDU. Since the value of the EOF subfield of the MPDU delimiter field corresponding to the MPDU located before the not-received MPDU is 1, the multi-TID A-MPDU receiver may determine that the value of the EOF subfield of the not-received MPDU delimiter field is 1. Accordingly, the Multi-TID A-MPDU receiver may determine that the Multi-TID A-MPDU receiver receives all the MPDUs corresponding to the MPDU delimiter field in which the EOF subfield is 0 and the MPDU Length subfield is not 0. The Multi-TID A-MPDU receiver ACKs using the Per AID TID Info field in which the Block Ack Starting Sequence Control field and the Block Ack Bitmap field are omitted, with respect to the MPDU corresponding to the MPDU delimiter field in which the EOF subfield is 0 and the MPDU Length subfield is not 0. Specifically, a Multi-TID A-MPDU receiver may transmit to a Multi-TID A-MPDU transmitter a Multi-STA BlockAck including a Block Ack Starting Sequence Control field and a Per AID TID Info field in which a Block Ack Bitmap field is omitted.

Figure 41:
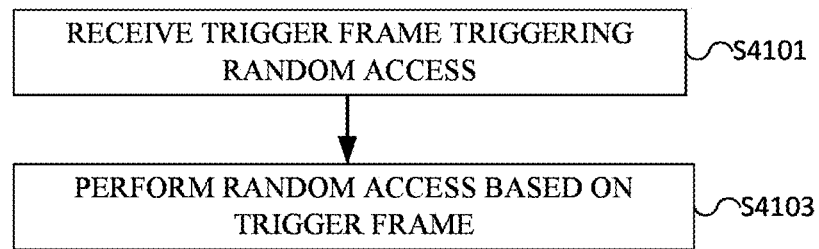
FIG. 41 shows the operation of a wireless communication terminal according to an embodiment of the present invention.

FIG. 41 shows the operation of a wireless communication terminal according to an embodiment of the present invention.

The wireless communication terminal receives the trigger frame triggering the random access (S4101). The wireless communication terminal performs random access based on the trigger frame (S4103). In this case, the wireless communication terminal may perform random access according to the OBO procedure described above. Specifically, the wireless communication terminal may perform random access according to the embodiments described with reference to FIG. 6 to FIG. 26.

The wireless communication terminal may set an integer selected from 0 to a value equal to or smaller than the OFDMA Contention Window (OCW) as a counter for random access. In this case, the counter for random access may be the OBO counter described above. Also, when the wireless communication terminal attempts random access for the first time, the wireless communication terminal receives the OBO related parameter signaled by the base wireless communication terminal, or the wireless communication terminal succeeds in transmission through the random access, the wireless communication terminal may initialize the OBO procedure. The initialization of the OBO procedure may include at least one of initialization of a counter for random access and initialization of OCW. Further, when the wireless communication terminal initializes the OCW, the wireless communication terminal may set the OCW to OCWmin. When the transmission through the random access of the wireless communication terminal fails, the wireless communication terminal may update the value of OCW to (2×OCW+1). In this case, the wireless communication terminal selects a random integer in the updated OCW, and sets the selected integer as a counter for random access. Further, when the value of the OCW reaches OCWmax, the wireless communication terminal may maintain the OCW as OCWmax even if the transmission through the random access of the wireless communication terminal fails.

The trigger frame may indicate random access using one or more RUs allocated for random access. Specifically, the trigger frame may indicate one or more RUs allocated for random access. In this case, the wireless communication terminal may decrement the value of the counter for random access based on one or more RUs allocated for the random access. When the trigger frame indicates the uplink transmission of the wireless communication terminal, the wireless communication terminal may not decrement the value of the counter based on the trigger frame. The specific operation of the wireless communication terminal may be the same as that in the embodiment described with reference to FIG. 26.

In this case, as described above, the RU is a group of a plurality of subcarriers usable for uplink transmission and downlink transmission.

The wireless communication terminal may decrement the value of the counter for random access based on the capabilities of the wireless communication terminal and one or more RUs allocated for random access. When the value of the counter for random access is 0 or reaches 0, the wireless communication terminal may randomly select one or more RUs allocated for random access.

The wireless communication terminal may perform the random access operation according to the capability of the wireless communication terminal. In such a case, the wireless communication terminal may operate as follows.

The wireless communication terminal may decrement the value of the counter for random access by the number of RUs, through which the wireless communication terminal is capable of transmitting the TB PPDU according to the capabilities of the wireless communication terminal, among the one or more RUs allocated for random access. The capabilities of the wireless communication terminal may include capabilities related to the bandwidth through which the wireless communication terminal is capable of performing transmission. In addition, the capability of the wireless communication terminal may include capabilities for the length of the padding field included in the TB PPDU. In addition, the capabilities of the wireless communication terminal may include capabilities for modulation and coding schemes with which the wireless communication terminal is capable of performing transmission. The capability of the wireless communication terminal may include the capacity of the wireless communication terminal related to at least one of Dual Carrier Modulation (DCM), the number of spatial streams, the length of a Guard Interval (GI), a Long Training Field (LTF) type, space-tiem block coding (STBC), and transmission power.

When the value of the counter for random access is 0 or reaches 0, the wireless communication terminal may randomly select any one of the RUs that are allocated for random access and may transmit the TB PPDU according to the capability of the wireless communication terminal.

When there is no RU through which the wireless communication terminal is capable of transmitting the TB PPDU among the one or more RUs allocated for the random access, the wireless communication terminal may maintain the counter for random access as 0. Operations related to the capabilities of the wireless communication terminal may be the same as those of the wireless communication terminal in the embodiments of FIGS. 14 to 21.

The wireless communication terminal may be a wireless communication terminal unassociated with the base wireless communication terminal transmitting the trigger frame. In such a case, the wireless communication terminal may operate as follows.

The wireless communication terminal may set the OCW minimum value, which is a parameter indicating the minimum value of the OCW, to a predetermined value as a default value of the OCW minimum value, and set the OCW maximum value, which is a parameter indicating the maximum value of the OCW, to a predetermined value as a default value of the OCW maximum value. In this case, the value predetermined to the default value of the OCW minimum value and the value predetermined to the default value of the OCW maximum value may not be values designated by the base wireless communication terminal. The OCW minimum value may be OCWmin as described above. In addition, the OCW maximum value may be OCW max described above.

When the wireless communication terminal communicates with the base wireless communication terminal transmitting the trigger frame and the other base wireless communication terminal, the wireless communication terminal may initialize a parameter for random access to another wireless communication terminal. The parameters for random access may include a counter for random access, an OCW minimum value, and an OCW maximum value, which is a parameter indicating the maximum value of the OCW. When the wireless communication terminal communicates with the base wireless communication terminal transmitting the trigger frame, the wireless communication terminal may set the OCW minimum value and the OCW maximum value according to the information received from the base wireless communication terminal transmitting the trigger frame, and when the wireless communication terminal communicates with another base wireless communication terminal, the wireless communication terminal may set the OCW minimum value and the OCW maximum value according to the information received from the other base wireless communication terminals. In this case, the information received by the wireless communication from the base wireless communication terminal transmitting the trigger frame or the base wireless communication terminal may be information on the OBO parameter. Specifically, the information on the OBO parameter may be the UORA parameter set element described above. The wireless communication terminal may maintain the OBO-related parameters and the OBO procedure for each base wireless communication terminal. In a specific embodiment, the wireless communication terminal may set an OBO-related parameter for each base wireless communication terminal. Specifically, the wireless communication terminal may set the OBO-related parameters for each base wireless communication terminal based on the information on the OBO-related parameters received from each base wireless communication terminal. The specific operation of the wireless communication terminal unassociated with the base wireless communication terminal may be the same as that in the embodiment described with reference to FIG. 21 to FIG. 25.

The wireless communication terminal may be a wireless communication terminal associated with the base wireless communication terminal transmitting the trigger frame. Also, the base wireless communication terminal transmitting the trigger frame may belong to a multiple BSSID set. In such a case, the wireless communication terminal may operate as follows.

The OCW minimum value and the OCW maximum value may be set according to information received from other base wireless communication terminals belonging to the multiple BSSID set to which the base wireless communication terminal transmitting the trigger frame belongs. In this case, the other base wireless communication terminal may be a base wireless communication terminal operating a BSS corresponding to a transmitted BSSID of a multiple BSSID set. Further, the wireless communication terminal may not decrement the value of the counter based on the trigger frame transmitted from the other base wireless communication terminal. The other base wireless communication terminal may be a base wireless communication terminal operating a BSS corresponding to a transmitted BSSID of a multiple BSSID set. The information received from the other base wireless communication terminal may not be the information indicated in the signaling field allocated only for the BSS including the wireless communication terminal. Specifically, the signaling field allocated only for the BSS including the wireless communication terminal may indicate the nontransmitted profile described above. In this case, the information may be the UORA parameter set element described above. When a multiple BSSID set is used, the specific operation of the wireless communication terminal may be the same as that in the embodiment described with reference to FIG. 11 to FIG. 13.

The wireless communication terminal may attempt to perform transmission to the base wireless communication terminal using the selected RU. In this case, the wireless communication terminal may determine whether the selected RU is idle, and may transmit a pending frame for a base wireless communication terminal to the base wireless communication terminal through the selected RU when the selected RU is idle. In addition, when the wireless communication terminal determines that the corresponding RU is busy with any one of a physical carrier sense or a virtual carrier sense, the wireless communication terminal determines that the corresponding RU is busy. The physical carrier sense may include a Clear Channel Assessment (CCA). When it is determined that the RU selected by the wireless communication terminal is busy, the wireless communication terminal may maintain the OBO counter as 0 without transmitting a pending frame to the base wireless communication.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal that wirelessly communicates with a base wireless communication terminal, the wireless communication terminal comprising:
a transceiver; and
a processor,
wherein the processor is configured to:
set an integer selected from a range of 0 to a value equal to or smaller than an OFDMA Contention Window (OCW) as a counter for random access,
receive a trigger frame for triggering random access using one or more resource units (RUs) allocated for the random access from the base wireless communication terminal using the transceiver,
decrement a value of the counter based on the one or more RUs allocated for the random access when the trigger frame does not schedule an uplink transmission of the wireless communication terminal, and
attempt transmission to the base wireless communication terminal when the value of the counter is 0 or reaches 0,
wherein the RU is a group of a plurality of subcarriers usable for uplink transmission and downlink transmission.

2. The wireless communication terminal of claim 1, wherein when the wireless communication terminal is a wireless communication terminal unassociated with the base wireless communication terminal,
the processor is configured to:
set an OCW minimum value, which is a parameter indicating a minimum value of an OCW, to a value predetermined as a default value of the OCW minimum value, and
set an OCW maximum value, which is a parameter indicating a maximum value of an OCW, to a value predetermined as a default value of the OCW maximum value,
wherein the value predetermined as the default value of the OCW minimum value and the value predetermined as the default value of the OCW maximum value are not values designated by the base wireless communication terminal.

3. The wireless communication terminal of claim 2, wherein when the wireless communication terminal is a wireless communication terminal unassociated with the base wireless communication terminal and the wireless communication terminal communicates with a different base wireless communication terminal different from the base wireless communication terminal, the processor is configured to initialize a parameter for random access to the different base wireless communication terminal,
wherein the parameter for the random access comprises the counter, an OCW minimum value, which is a parameter indicating a minimum value of the OCW, and an OCW maximum value, which is a parameter indicating a maximum value of the OCW.

4. The wireless communication terminal of claim 3, wherein when the wireless communication terminal is a wireless communication terminal unassociated with the base wireless communication terminal, the processor is configured to:
set the OCW minimum value and the OCW maximum value according to information received from the base wireless communication terminal when the wireless communication terminal communicates with the base wireless communication terminal, and
set the OCW minimum value and the OCW maximum value according to information received from the different base wireless communication terminal when the wireless communication terminal communicates with the different base wireless communication terminal.

5. The wireless communication terminal of claim 4, wherein when the wireless communication terminal is associated to a BSS corresponding to a nontransmitted Basic Service Set Identification (BSSID) of a multiple BSSID set, the processor is configured to set an OCW minimum value, which is a parameter indicating the minimum value of the OCW, and an OCW maximum value, which is a parameter indicating the maximum value of the OCW, according to UL OFDMA-based Random Access (UORA) parameter set element from a BSS corresponding to a transmitted BSSID of the multiple BSSID set,
wherein the UORA parameter set includes a parameter related to the counter.

6. The wireless communication terminal of claim 5, wherein the processor is configured not to decrement the value of the counter based on a trigger frame transmitted from the BSS corresponding to the transmitted BS SID of the multiple BS SID set.

7. The wireless communication terminal of claim 6, wherein the UORA parameter set received from the BSS corresponding to the transmitted BS SID is not a UORA parameter set indicated in a signaling field allocated for a BSS including the wireless communication terminal.

8. A method of operating a wireless communication terminal wirelessly communicating with a base wireless communication terminal, the method comprising:
setting an integer selected from a range of 0 to a value equal to or smaller than an OFDMA Contention Window (OCW) as a counter for random access,
receiving a trigger frame for triggering random access using one or more resource units (RUs) allocated for the random access from the base wireless communication terminal using the transceiver,
decrementing a value of the counter based on the one or more RUs allocated for the random access when the trigger frame does not schedule an uplink transmission of the wireless communication terminal, and
attempting transmission to the base wireless communication terminal when the value of the counter is 0 or reaches 0,
wherein the RU is a group of a plurality of subcarriers usable for uplink transmission and downlink transmission.

9. The method of claim 8, wherein when the wireless communication terminal is a wireless communication terminal unassociated with the base wireless communication terminal, the method further comprises:

setting an OCW minimum value, which is a parameter indicating a minimum value of the OCW, to a value predetermined as a default value of the OCW minimum value, and setting an OCW maximum value, which is a parameter indicating a maximum value of the OCW, to a value predetermined as a default value of the OCW maximum value, wherein the value predetermined as the default value of the OCW minimum value and the value predetermined as the default value of the OCW maximum value are not values designated by the base wireless communication terminal.

10. The method of claim 8, wherein when the wireless communication terminal is a wireless communication terminal unassociated with the base wireless communication terminal and the wireless communication terminal communicates with a different base wireless communication terminal different from the base wireless communication terminal, the method further comprises:

initializing a parameter for random access to the different base wireless communication terminal, wherein the parameter for the random access comprises the counter, an OCW minimum value, which is a parameter indicating a minimum value of the OCW, and an OCW maximum value, which is a parameter indicating a maximum value of the OCW.

11. The method of claim 10, wherein when the wireless communication terminal is a wireless communication terminal unassociated with the base wireless communication terminal, the method further comprises:

setting the OCW minimum value and the OCW maximum value according to information received from the base wireless communication terminal when the wireless communication terminal communicates with the base wireless communication terminal, and setting the OCW minimum value and the OCW maximum value according to information received from the different base wireless communication terminal when the wireless communication terminal communicates with the different base wireless communication terminal.

12. The method of claim 8, wherein when the wireless communication terminal is associated to a BSS corresponding to a nontransmitted Basic Service Set Identification (BSSID) of a multiple BSSID set, the method further comprises:

setting an OCW minimum value, which is a parameter indicating the minimum value of the OCW, and an OCW maximum value, which is a parameter indicating the maximum value of the OCW, according to UL OFDMA-based Random Access (UORA) parameter set element from a BSS corresponding to a transmitted BSSID of the multiple BSSID set, wherein the UORA parameter set includes a parameter related to the counter.

13. The method of claim 12, decrementing a value of the counter based on the one or more RUs allocated for the random access comprises not decrementing the value of the counter based on a trigger frame transmitted from the BSS corresponding to the transmitted BS SID of the multiple BS SID set.

14. The method of claim 13, wherein the UORA parameter set received from the BSS corresponding to the transmitted BSSID is not a UORA parameter set indicated in a signaling field allocated for a BSS including the wireless communication terminal.

\* \* \* \* \*